(12) United States Patent
Fan et al.

(10) Patent No.: US 12,535,654 B2
(45) Date of Patent: Jan. 27, 2026

(54) IMAGING LENS ASSEMBLY AND ELECTRONIC DEVICE

(71) Applicant: LARGAN PRECISION CO., LTD., Taichung (TW)

(72) Inventors: Chen-Wei Fan, Taichung (TW); Ming-Ta Chou, Taichung (TW); Chien-Pang Chang, Taichung (TW); Cheng-Feng Lin, Taichung (TW); Kuo-Chiang Chu, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 805 days.

(21) Appl. No.: 17/854,092

(22) Filed: Jun. 30, 2022

(65) Prior Publication Data

US 2023/0037074 A1 Feb. 2, 2023

Related U.S. Application Data

(60) Provisional application No. 63/219,861, filed on Jul. 9, 2021.

(30) Foreign Application Priority Data

Oct. 29, 2021 (TW) .................................. 110140486

(51) Int. Cl.
*G02B 9/64* (2006.01)
(52) U.S. Cl.
CPC .......... *G02B 9/64* (2013.01); *G02B 2207/101* (2013.01)

(58) Field of Classification Search
CPC ............. G02F 2201/38; G02F 2201/40; G02F 1/133504; G02B 1/113; G02B 1/118
See application file for complete search history.

(56) References Cited

U.S. PATENT DOCUMENTS

| | | | |
|---|---|---|---|
| 9,158,039 B2 | 10/2015 | Okuno et al. |
| 9,158,040 B2 | 10/2015 | Kamiyam et al. |
| 9,405,044 B2 | 8/2016 | Okuno |
| 9,709,704 B2 | 7/2017 | Miyahara et al. |
| 10,025,006 B2 | 7/2018 | Yoshizawa et al. |
| 10,520,647 B2 | 12/2019 | Zhu et al. |

(Continued)

FOREIGN PATENT DOCUMENTS

| | | |
|---|---|---|
| CN | 107533155 B | 5/2019 |
| WO | 2016/170727 A1 | 10/2016 |

*Primary Examiner* — Jonathan Y Jung
(74) *Attorney, Agent, or Firm* — McClure, Qualey & Rodack, LLP

(57) ABSTRACT

An imaging lens assembly includes an imaging lens element assembly, and an optical axis passes through the imaging lens assembly. The imaging lens element assembly includes a plurality of lens elements, and the lens elements includes a first lens element and a second lens element, wherein a refractive index of the first lens element is different from a refractive index of the second lens element. Each of the first lens element and the second lens element includes at least one nanostructure layer and at least one structure connection film. The nanostructure layer is irregularly arranged, the nanostructure layer includes an alumina crystal. The structure connection film is disposed between a surface of the first lens element and the nanostructure layer and between a surface of the second lens element and the nanostructure layer.

25 Claims, 22 Drawing Sheets

(56) References Cited

U.S. PATENT DOCUMENTS

| | | |
|---|---|---|
| 10,527,764 B2 | 1/2020 | Kim et al. |
| 10,539,716 B2 | 1/2020 | Schulz et al. |
| 10,983,253 B2 | 4/2021 | Makino et al. |
| 11,029,514 B2 | 6/2021 | Horvolgyi et al. |
| 2009/0022954 A1* | 1/2009 | Kotani ............... C03C 17/3417 428/148 |
| 2011/0189389 A1* | 8/2011 | Yamada ................. G02B 1/113 427/162 |
| 2012/0171370 A1* | 7/2012 | Nakayama ............... G02B 1/02 427/162 |
| 2012/0200944 A1* | 8/2012 | Teraoka ................... G02B 9/34 359/773 |
| 2012/0305521 A1 | 12/2012 | Hubbard et al. |
| 2020/0310017 A1 | 10/2020 | Yu |
| 2020/0319434 A1* | 10/2020 | Imaoka ................. G02B 15/15 |
| 2021/0003753 A1 | 1/2021 | Kim et al. |
| 2021/0072439 A1 | 3/2021 | Cho et al. |
| 2021/0136264 A1 | 5/2021 | Kim et al. |

\* cited by examiner

130

130

IMAGING LENS ASSEMBLY AND ELECTRONIC DEVICE

RELATED APPLICATIONS

This application claims priority to U.S. Provisional Application Ser. No. 63/219,861, filed Jul. 9, 2021 and Taiwan Application Serial Number 110140486, filed Oct. 29, 2021, which are herein incorporated by references.

BACKGROUND

Technical Field

The present disclosure relates to an imaging lens assembly. More particularly, the present disclosure relates to an imaging lens assembly applicable to portable electronic devices.

Description of Related Art

In recent years, portable electronic devices have developed rapidly. For example, intelligent electronic devices and tablets have been filled in the lives of modern people, and imaging lens assemblies mounted on portable electronic devices have also prospered. As technology advances, the number of the lens elements is gradually increased to seek to the better image quality of the imaging lens assembly. However, increasing the number of the lens elements is prone to generate a plurality of problems, such as the decrease of the transmittance and the reflection of the stray light. Therefore, an imaging lens assembly, which can maintain the image quality, reduces the waste of the costs of the research and development and shorten the schedule of the research and development, needs to be developed.

SUMMARY

According to one aspect of the present disclosure, an imaging lens assembly includes an imaging lens element assembly, and an optical axis passes through the imaging lens assembly. The imaging lens element assembly includes a plurality of lens elements, and the lens elements includes a first lens element and a second lens element, wherein a refractive index of the first lens element is different from a refractive index of the second lens element. Each of the first lens element and the second lens element includes at least one nanostructure layer and at least one structure connection film. The nanostructure layer is irregularly arranged, the nanostructure layer includes an alumina crystal, and a structure dimension of the nanostructure layer is between 98 nm and 420 nm. The structure connection film is disposed between a surface of the first lens element and the nanostructure layer and between a surface of the second lens element and the nanostructure layer, wherein the structure connection film includes at least one silica film, the silica film is directly contacted with a bottom of the nanostructure layer, and a film thickness of the silica film is between 20 nm and 150 nm. The imaging lens assembly has a transmittance decay indicator, and the transmittance decay indicator is corresponding to a number of the lens elements of the imaging lens element assembly and an analog constant of a transmittance decay. When the transmittance decay indicator is Tdi, the number of the lens elements of the imaging lens element assembly is E, the analog constant of the transmittance decay is c, a light of the imaging lens assembly corresponding to a wavelength range between 540 nm and 590 nm has an average transmittance, the average transmittance is $T_{5459}$, and a difference between the refractive index of the first lens element and the refractive index of the second lens element is $\Delta n$, the following conditions are satisfied: $Tdi=[(\pi+c)^2/10]^{2E}$, $c=0.008$; $0.85 \leq Tdi \leq 0.9$; $90\% \leq T_{5459}$; and $0.065 \leq \Delta n \leq 0.82$.

According to one aspect of the present disclosure, an electronic device includes the imaging lens assembly of the aforementioned aspect.

According to one aspect of the present disclosure, an imaging lens assembly includes an imaging lens element assembly, and an optical axis passes through the imaging lens assembly. The imaging lens element assembly includes a plurality of lens elements, and the lens elements includes a first lens element and a second lens element, wherein a refractive index of the first lens element is different from a refractive index of the second lens element. Each of the first lens element and the second lens element includes at least one nanostructure layer and at least one structure connection film. The nanostructure layer is irregularly arranged, the nanostructure layer includes an alumina crystal, and a structure dimension of the nanostructure layer is between 98 nm and 420 nm. The structure connection film is disposed between a surface of the first lens element and the nanostructure layer and between a surface of the second lens element and the nanostructure layer, wherein the structure connection film includes at least one silica film, the silica film is directly contacted with a bottom of the nanostructure layer, and a film thickness of the silica film is between 20 nm and 150 nm. The imaging lens assembly has a transmittance decay indicator, and the transmittance decay indicator is corresponding to a number of the lens elements of the imaging lens element assembly and an analog constant of a transmittance decay. When the transmittance decay indicator is Tdi, the number of the lens elements of the imaging lens element assembly is E, the analog constant of the transmittance decay is c, a light of the imaging lens assembly corresponding to a wavelength range between 540 nm and 590 nm has an average transmittance, the average transmittance is $T_{5459}$, the refractive index of the first lens element is n1, and the refractive index of the second lens element is n2, the following conditions are satisfied: $Tdi=[(\pi+c)^2/10]^{2E}$, $c=0.008$; $0.85 \leq Tdi \leq 0.9$; $90\% \leq T_{5459}$; $n1 > 1.6$; and $n2 < 1.6$.

According to one aspect of the present disclosure, an electronic device includes the imaging lens assembly of the aforementioned aspect.

According to one aspect of the present disclosure, an imaging lens assembly includes an imaging lens element assembly, and an optical axis passes through the imaging lens assembly. The imaging lens element assembly includes a plurality of lens elements, and each of at least three lens elements of the lens elements includes at least one nanostructure layer and at least one structure connection film. The nanostructure layer is irregularly arranged, the nanostructure layer includes an alumina crystal, and a structure dimension of the nanostructure layer is between 98 nm and 420 nm. The structure connection film is disposed between a surface of each of the lens elements and the nanostructure layer, wherein the structure connection film includes at least one silica film, the silica film is directly contacted with a bottom of the nanostructure layer, and a film thickness of the silica film is between 20 nm and 150 nm. The lens elements of the imaging lens element assembly are separated into a first lens group and a second lens group, the first lens group is closer to an object side than the second lens group to the object side, and a number of the lens elements of the first lens group is less than a number of the lens elements of the second lens group. The first lens group closest to an image side includes one of the lens elements being a high refractive index lens element, and an adjacent lens element of the high refractive index lens element at an object-side end is a low refractive index lens element. The second lens group includes the others lens elements of an image-side end of the first lens group, and the second lens group includes at least one of the lens elements being a high refractive index lens element. The imaging lens assembly has a transmittance decay indicator, and the transmittance decay indicator is corresponding to a number of the lens elements of the imaging lens element assembly and an analog constant of a transmittance decay. When the transmittance decay indicator is Tdi, the number of the lens elements of the imaging lens element assembly is E, the analog constant of the transmittance decay is c, a light of the imaging lens assembly corresponding to a wavelength range between 540 nm and 590 nm has an average transmittance, the average transmittance is $T_{5459}$, and a total number of surfaces of object-side surfaces and image-side surfaces of the nanostructure layers disposed on the lens elements is $N_{CS}$, the following conditions are satisfied: $Tdi=[(\pi+c)^2/10]^{2E}$, $c=0.008$; $0.85 \leq Tdi \leq 0.88$; $90\% \leq T_{5459}$; and $0.5 \leq N_{CS}/2E \leq 1$.

According to one aspect of the present disclosure, an electronic device includes the imaging lens assembly of the aforementioned aspect.

According to one aspect of the present disclosure, an imaging lens assembly includes an imaging lens element assembly, and an optical axis passes through the imaging lens assembly. The imaging lens element assembly includes a plurality of lens elements, and each of at least three lens elements of the lens elements includes at least one nanostructure layer and at least one structure connection film. The nanostructure layer is irregularly arranged, the nanostructure layer includes an alumina crystal, and a structure dimension of the nanostructure layer is between 98 nm and 420 nm. The structure connection film is disposed between a surface of each of the lens elements and the nanostructure layer, wherein the structure connection film includes at least one silica film, the silica film is directly contacted with a bottom of the nanostructure layer, and a film thickness of the silica film is between 20 nm and 150 nm. The lens elements of the imaging lens element assembly are separated into a first lens group and a second lens group, the first lens group is closer to an object side than the second lens group to the object side, and a number of the lens elements of the first lens group is less than a number of the lens elements of the second lens group. The first lens group closest to an image side includes one of the lens elements being a high refractive index lens element, and an adjacent lens element of the high refractive index lens element at an object-side end is a low refractive index lens element. The second lens group includes the others lens elements of an image-side end of the first lens group, and the second lens group includes at least one of the lens elements being a high refractive index lens element. The imaging lens assembly has a transmittance decay indicator, and the transmittance decay indicator is corresponding to a number of the lens elements of the imaging lens element assembly and an analog constant of a transmittance decay. When the transmittance decay indicator is Tdi, the number of the lens elements of the imaging lens element assembly is E, the analog constant of the transmittance decay is c, a light of the imaging lens assembly corresponding to a wavelength range between 540 nm and 590 nm has an average transmittance, the average transmittance is $T_{5459}$, and a total number of surfaces of object-side surfaces and image-side surfaces of the nanostructure layers disposed on the lens elements is $N_{CS}$, the following conditions are satisfied: $Tdi=[(\pi+c)^2/10]^{2E}$, $c=0.008$; $0.81 \leq Tdi \leq 0.84$; $87.6\% \leq T_{5459} \leq 92\%$; and $0.59 \leq N_{CS}/2E \leq 1$.

According to one aspect of the present disclosure, an electronic device includes the imaging lens assembly of the aforementioned aspect.

According to one aspect of the present disclosure, an imaging lens assembly includes an imaging lens element assembly, and an optical axis passes through the imaging lens assembly. The imaging lens element assembly includes a plurality of lens elements, and each of at least three lens elements of the lens elements includes at least one nanostructure layer and at least one structure connection film. The nanostructure layer is irregularly arranged, the nanostructure layer includes an alumina crystal, and a structure dimension of the nanostructure layer is between 98 nm and 420 nm. The structure connection film is disposed between a surface of each of the lens elements and the nanostructure layer, wherein the structure connection film includes at least one silica film, the silica film is directly contacted with a bottom of the nanostructure layer, and a film thickness of the silica film is between 20 nm and 150 nm. The lens elements of the imaging lens element assembly are separated into a first lens group and a second lens group, the first lens group is closer to an object side than the second lens group to the object side, and a number of the lens elements of the first lens group is less than a number of the lens elements of the second lens group. The first lens group closest to an image side includes one of the lens elements of a high refractive index lens element, and an adjacent lens element of the high refractive index lens element at an object-side end is a low refractive index lens element. The second lens group includes the others lens elements of an image-side end of the first lens group, and the second lens group includes at least one of the lens elements being a high refractive index lens element. The imaging lens assembly has a transmittance decay indicator, and the transmittance decay indicator is corresponding to a number of the lens elements of the imaging lens element assembly and an analog constant of a transmittance decay. When the transmittance decay indicator is Tdi, the number of the lens elements of the imaging lens element assembly is E, the analog constant of the transmittance decay is c, a light of the imaging lens assembly corresponding to a wavelength range between 540 nm and 590 nm has an average transmittance, the average transmittance is $T_{5459}$, and a total number of surfaces of object-side surfaces and image-side surfaces of the nanostructure layers disposed on the lens elements is $N_{CS}$, the following conditions are satisfied: $Tdi=[(\pi+c)^2/10]^{2E}$, $c=0.008$; $0.78 \leq Tdi \leq 0.80$; $86\% \leq T_{5459} \leq 91\%$; and $0.67 \leq N_{CS}/2E \leq 1$.

According to one aspect of the present disclosure, an electronic device includes the imaging lens assembly of the aforementioned aspect.

DETAILED DESCRIPTION

The present disclosure provides an imaging lens assembly, an optical axis passes through the imaging lens assembly, and the imaging lens assembly includes an imaging lens element assembly. The imaging lens element assembly includes a plurality of lens elements, and the lens elements includes a first lens element and a second lens element, and each of the first lens element and the second lens element includes at least one nanostructure layer and at least one structure connection film. Or, each of at least three lens elements of the lens elements includes at least one nanostructure layer and at least one structure connection film. The nanostructure layer is irregularly arranged, the nanostructure layer includes an alumina crystal, and a structure dimension of the nanostructure layer is between 98 nm and 420 nm. The structure connection film is disposed between a surface of each of the lens elements and the nanostructure layer, wherein the structure connection film includes at least one silica film, the silica film is directly contacted with a bottom of the nanostructure layer, and a film thickness of the silica film is between 20 nm and 150 nm. The imaging lens assembly has a transmittance decay indicator, and the transmittance decay indicator is corresponding to a number of the lens elements of the imaging lens element assembly and an analog constant of a transmittance decay. When the transmittance decay indicator is Tdi, the number of the lens elements of the imaging lens element assembly is E, and the analog constant of the transmittance decay is c, the following condition is satisfied: $Tdi=[(\pi+c)^2/10]^{2E}$, $c=0.008$. The nanostructure layer can be steadied via the structure connection film, so that the nanostructure layer can be disposed on every lens element made of different materials, and the adhesion stability of the nanostructure layer can be enhanced. Further, by disposing the nanostructure layer on the lens elements, the image quality between the imaging lens assemblies is close to the consistency to reduce the setback during switching the imaging lens assemblies of the electronic device.

The nanostructure layer has pores so that the equivalent refractive index of the nanostructure layer is gradually changed towards 1.00. Hence, the variety of the refractive index between the interfaces is reduced, and the possibility of light reflection is reduced. Moreover, the structure connection film can also be a film which is formed by alternately stacking a high-refractive-index layer and a low-refractive-index layer, a top portion of the structure connection film is the silica film directly contacted with the nanostructure layer, and the imaging lens assembly can further include a molded glass. Or, the lens elements can also be Fresnel lens elements or Meta lens elements, but the present disclosure is not limited thereto.

Figure 8A:
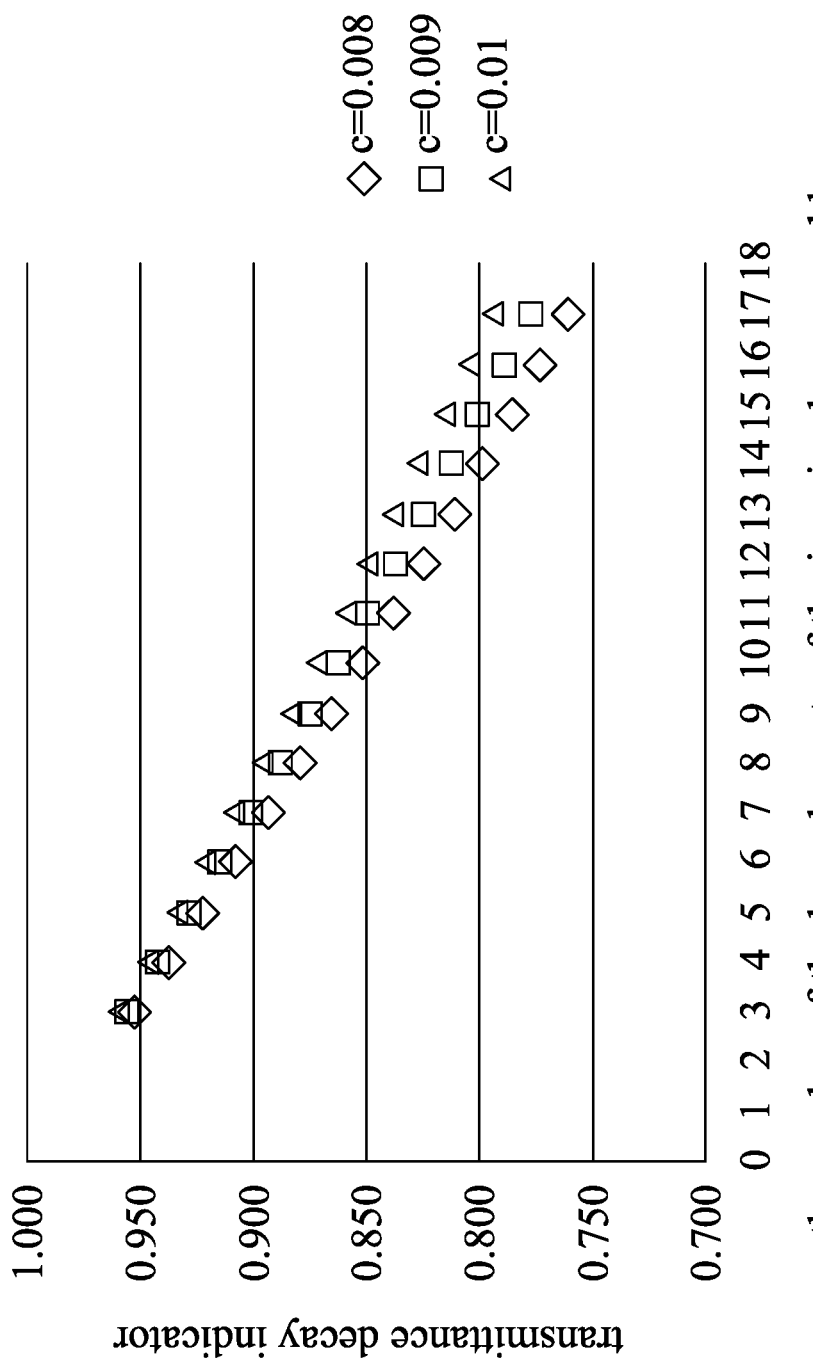
FIG. 8A is a relationship chart between the transmittance decay indicator and the number of the lens elements according to the present disclosure.

Table 1 lists the transmittance decay indicator of the number of the lens elements corresponding to different analog constants of the transmittance decay, and FIG. 8A is a relationship chart between the transmittance decay indicator and the number of the lens elements according to the present disclosure. In Table 1 and FIG. 8A, the analog constant of the transmittance decay is c, and the transmittance decay indicator is Tdi, wherein the transmittance decay indicator can be the mathematical model which can be configured to simulate the transmittance of the imaging lens assembly, the analog constant of the transmittance decay can be constructed from the experimental data. The transmittance decay indicator is negatively correlated with the number of the lens elements of the imaging lens element assembly, the transmittance decay indicator is positively correlated with the analog constant of the transmittance decay, and the transmittance decay indicator is not correlated with the nanostructure layer. Furthermore, the analog constant of the transmittance decay may be influenced by the variety such as the quality of the imaging lens assembly and the test condition. In particular, when the analog constant of the transmittance decay is 0.008, the analog constant of the transmittance decay is the most preferred condition, and the analog constant of the transmittance decay meets the model of the transmittance prediction of the present disclosure. It should be mentioned that the analog constant of the transmittance decay can also increase or decrease, that is, the analog constant of the transmittance decay can be 0.007, 0.009 or 0.01, but the present disclosure is not limited thereto. The transmittance of the lens elements after coating can be simulated via the simulating formula of the transmittance. According to the estimation of the experimental data, the transmittance of the imaging lens assembly can be increased by about 0.28% while increasing one nanostructure layer on the lens elements, and hence the transmittance of the imaging lens assembly which the nanostructure layers are disposed on the number of the surfaces of the lens elements can be simulated via simulating formula of the transmittance.

TABLE 1

| | | the number of the lens elements | | | | |
|---|---|---|---|---|---|---|
| | | 3 | 4 | 5 | 6 | 7 |
| Tdi | c = 0.008 | 0.953 | 0.938 | 0.923 | 0.908 | 0.894 |
| | c = 0.009 | 0.957 | 0.942 | 0.929 | 0.915 | 0.902 |
| | c = 0.01 | 0.960 | 0.947 | 0.935 | 0.922 | 0.910 |
| | | the number of the lens elements | | | | |
| | | 8 | 9 | 10 | 11 | 12 |
| Tdi | c = 0.008 | 0.879 | 0.865 | 0.851 | 0.838 | 0.825 |
| | c = 0.009 | 0.888 | 0.875 | 0.862 | 0.850 | 0.837 |
| | c = 0.01 | 0.897 | 0.885 | 0.873 | 0.862 | 0.850 |
| | | the number of the lens elements | | | | |
| | | 13 | 14 | 15 | 16 | 17 |
| Tdi | c = 0.008 | 0.811 | 0.798 | 0.786 | 0.773 | 0.761 |
| | c = 0.009 | 0.825 | 0.813 | 0.801 | 0.789 | 0.777 |
| | c = 0.01 | 0.839 | 0.827 | 0.816 | 0.805 | 0.794 |

Figure 8B:
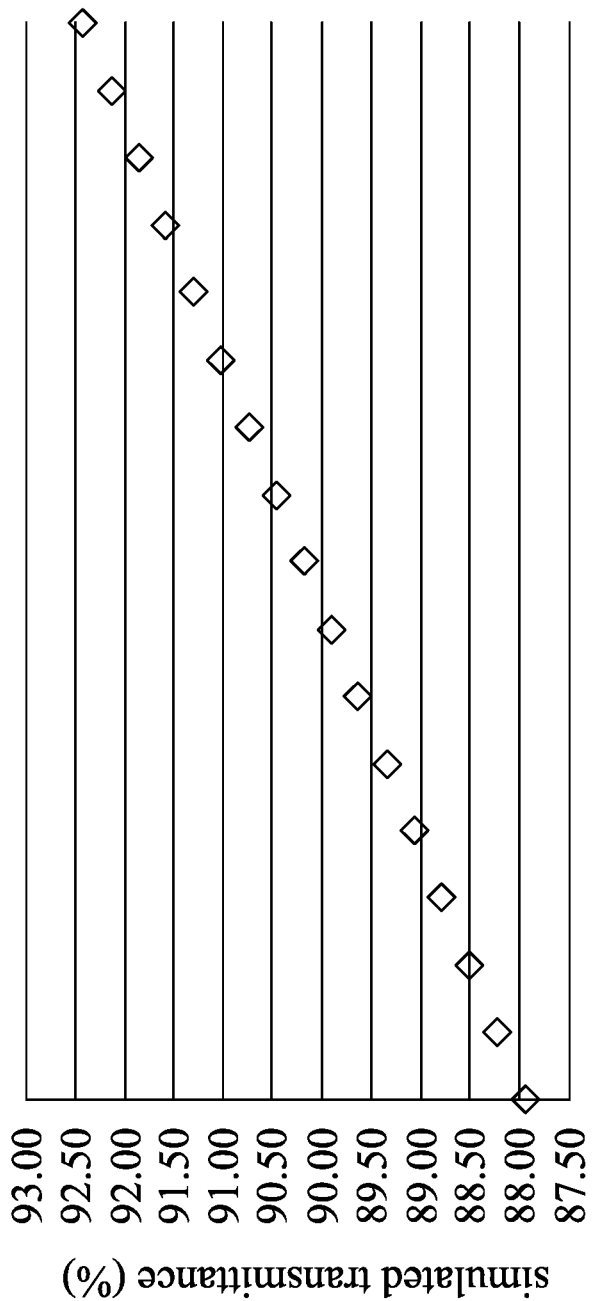
FIG. 8B is a relationship chart between the simulated transmittance and the total number of the surfaces of the object-side surfaces and the image-side surfaces of the nanostructure layer disposed on the lens elements according to the present disclosure.

Table 2 lists a simulated transmittance of the object-side surfaces and the image-side surfaces of the lens elements with the nanostructure layer corresponding to the different total numbers of the surfaces, and FIG. 8B is a relationship chart between the simulated transmittance and the total number of the surfaces of the object-side surfaces and the image-side surfaces of the nanostructure layer disposed on the lens elements according to the present disclosure. In Table 2 and FIG. 8B, the simulated transmittance is $T_{sim}$, the transmittance decay indicator is Tdi, a total number of surfaces of object-side surfaces and image-side surfaces of the nanostructure layers disposed on the lens elements is $N_{CS}$, and the number of the lens elements of the imaging lens element assembly is E. Taking the number of the lens elements as eight as the example, the transmittance of the object-side surfaces and the image-side surfaces of the lens elements with the nanostructure layer corresponding to the different total numbers of the surfaces can be simulated. In detail, the simulated transmittance $T_{sim}$ is increased along with the increment of the total number $N_{CS}$ of the surfaces of the object-side surfaces and the image-side surfaces of the nanostructure layers disposed on the lens elements, and the following condition can be satisfied: $T_{sim}$=Tdi×100%+ 0.28%×$N_{CS}$. It should be mentioned that the aforementioned condition is suitable for the optimal wavelength range between 540 nm and 590 nm. For example, when the imaging lens element assembly without the nanostructure layer, the following condition can be satisfied: $T_{sim}$=Tdi× 100%; when the total number of the surfaces of the object-side surfaces and the image-side surfaces of the nanostructure layers disposed on the lens elements is $N_{CS}$, the following condition can be satisfied: $T_{sim}$=Tdi×100%+ 0.28%×$N_{CS}$; when the nanostructure layer is disposed on all of the lens elements of the imaging lens element assembly, the following condition can be satisfied: $T_{sim}$=Tdi×100%+ 0.28%×2E. Therefore, the required number of the coating surfaces meeting the specification of the imaging lens assembly can be previously simulated via the transmittance decay indicator and the simulated transmittance, so that the unnecessary cost waste can be reduced and the time of the research and development can be shortened. Moreover, according to the simulated transmittance, when the number of the lens elements is eight and the total number of the surfaces of the object-side surfaces and the image-side surfaces of the nanostructure layers disposed on the lens elements is at least eight, the simulated transmittance can be over 90%. It should be mentioned that the simulated transmittance $T_{sim}$ is only the simulated value, and the present disclosure is not limited thereto.

TABLE 2

| $N_{CS}$ | 0 | 1 | 2 | 3 | 4 |
|---|---|---|---|---|---|
| $T_{sim}$ (%) | 87.93 | 88.21 | 88.49 | 88.77 | 89.05 |
| $N_{CS}$ | 5 | 6 | 7 | 8 | 9 |
| $T_{sim}$ (%) | 89.33 | 89.61 | 89.89 | 90.17 | 90.45 |
| $N_{CS}$ | 10 | 11 | 12 | 13 | 14 |
| $T_{sim}$ (%) | 90.73 | 91.01 | 91.29 | 91.57 | 91.85 |
| $N_{CS}$ | 15 | 16 | | | |
| $T_{sim}$ (%) | 92.13 | 92.41 | | | |

Table 3 lists the simulated transmittance corresponding to different numbers of the lens elements. In Table 3, Tdi× 100% is configured to simulate the maximum transmittance of the imaging lens assembly which can be theoretically achieved under the condition of the different numbers of the lens elements of the imaging lens assembly and all of the lens elements without the nanostructure layer; $N_{CS}$=2E is configured to simulate the maximum transmittance of the imaging lens assembly which can be theoretically achieved under the condition of the different numbers of the lens elements of the imaging lens assembly and the nanostructure layer disposed on all of the lens elements.

TABLE 3

| | | the number of the lens elements | | | | |
|---|---|---|---|---|---|---|
| | | 7 | 8 | 9 | 10 | 11 |
| $T_{sim}$ (%) | Tdi × 100% | 89.36 | 87.93 | 86.53 | 85.15 | 83.79 |
| | $N_{CS}$ = 2E | 93.28 | 92.41 | 91.57 | 90.75 | 89.95 |

| | | the number of the lens elements | | | |
|---|---|---|---|---|---|
| | | 12 | 13 | 14 | 15 |
| $T_{sim}$ (%) | Tdi × 100% | 82.45 | 81.14 | 79.84 | 78.57 |
| | $N_{CS}$ = 2E | 89.17 | 88.42 | 87.68 | 86.97 |

The lens elements of the imaging lens element assembly can be separated into a first lens group and a second lens group, the first lens group is closer to an object side than the second lens group to the object side, and a number of the lens elements of the first lens group is less than a number of the lens elements of the second lens group. The first lens group closest to an image side includes one of the lens elements of a high refractive index lens element, and an adjacent lens element of the high refractive index lens element at an object-side end is a low refractive index lens element. The second lens group includes the others lens elements on an image-side end of the first lens group, and the second lens group includes at least one of the lens elements being a high refractive index lens element. The possibility of light reflection formed between the interfaces can be reduced by disposing the nanostructure layer on the high refractive index lens element. In particular, the high refractive index lens element can be the lens element which the refractive index is greater than 1.6, or the lens element which the refractive index is higher than the average refractive index of the imaging lens assembly; the low refractive index lens element can be the lens element which the refractive index is smaller than 1.6, or the lens element which the refractive index is smaller than the average refractive index of the imaging lens assembly.

When the transmittance decay indicator is Tdi, the following condition can be satisfied: $0.85 \leq Tdi \leq 0.9$. Further, the following condition can be satisfied: $0.85 \leq Tdi \leq 0.88$. Moreover, the following condition can be satisfied: $0.81 \leq Tdi \leq 0.84$. Further, the following condition can be satisfied: $0.78 \leq Tdi \leq 0.80$.

When a light of the imaging lens assembly corresponding to a wavelength range between 540 nm and 590 nm has an average transmittance, and the average transmittance is $T_{5459}$, the following condition can be satisfied: $90\% \leq T_{5459}$. It should be mentioned that the measurement method of the average transmittance is to measure the average transmittance of the light of the wavelength range between 540 nm and 590 nm by disposing the imaging lens element assembly in a lens barrel, wherein the imaging lens element assembly excludes a light blocking sheet during measuring. Further, the following condition can be satisfied: $87.6\% \leq T_{5459} \leq 92\%$. Moreover, the following condition can be satisfied: $86\% \leq T_{5459} \leq 91\%$.

When a refractive index of the first lens element is n1, a refractive index of the second lens element is n2, and a difference between the refractive index of the first lens element and the refractive index of the second lens element is $\Delta n$, the following conditions can be satisfied: $0.065 \leq \Delta n \leq 0.82$; $n1 > 1.6$; and $n2 < 1.6$. It should be mentioned that the refractive index of the first lens element is different from the refractive index of the second lens element, and the measuring light of the refractive index of the lens elements is a light of wavelength of 587.6 nm (d-line).

When the total number of the surfaces of the object-side surfaces and the image-side surfaces of the nanostructure layers disposed on the lens elements is $N_{CS}$, and the number of the lens elements of the imaging lens element assembly is E, the following condition can be satisfied: $0.5 \leq N_{CS}/2E \leq 1$. Therefore, the optical property of the imaging lens assembly can be further enhanced. Moreover, the imaging quality of the imaging lens assembly can be more stable when the nanostructure layer is disposed on at least half lens elements of the imaging lens assembly. Further, the following condition can be satisfied: $0.59 \leq N_{CS}/2E \leq 1$. Therefore, the image quality can be still maintained when the number of the lens elements of the imaging lens assembly is increased. Moreover, the following condition can be satisfied: $0.67 \leq N_{CS}/2E \leq 1$. Further, the following condition can be satisfied: $0.8 \leq N_{CS}/2E \leq 1$. Moreover, the following condition can be satisfied: $0.9 \leq N_{CS}/2E \leq 1$. Further, the following condition can be satisfied: $0.96 \leq N_{CS}/2E \leq 1$.

When a light of the imaging lens assembly corresponding to a wavelength range between 520 nm and 540 nm has an average transmittance, and the average transmittance is $T_{5254}$, the following condition can be satisfied: $90\% \leq T_{5254}$. Therefore, the image quality of the imaging lens assembly can be enhanced. Further, the following condition can be satisfied: $86\% \leq T_{5254}$. Moreover, the following condition can be satisfied: $84\% \leq T_{5254}$.

When a light of the imaging lens assembly corresponding to a wavelength range between 530 nm and 540 nm has an average transmittance, and the average transmittance is $T_{5354}$, the following condition can be satisfied: $90\% \leq T_{5354}$. Further, the following condition can be satisfied: $86\% \leq T_{5354}$. Moreover, the following condition can be satisfied: $84\% \leq T_{5354}$.

Each of the aforementioned features of the imaging lens assembly can be utilized in various combinations for achieving the corresponding effects.

The present disclosure provides an electronic device, which includes the aforementioned imaging lens assembly.

According to the aforementioned embodiment, specific embodiments and specific examples are provided, and illustrated via figures.

1st Embodiment

Figure 1A:
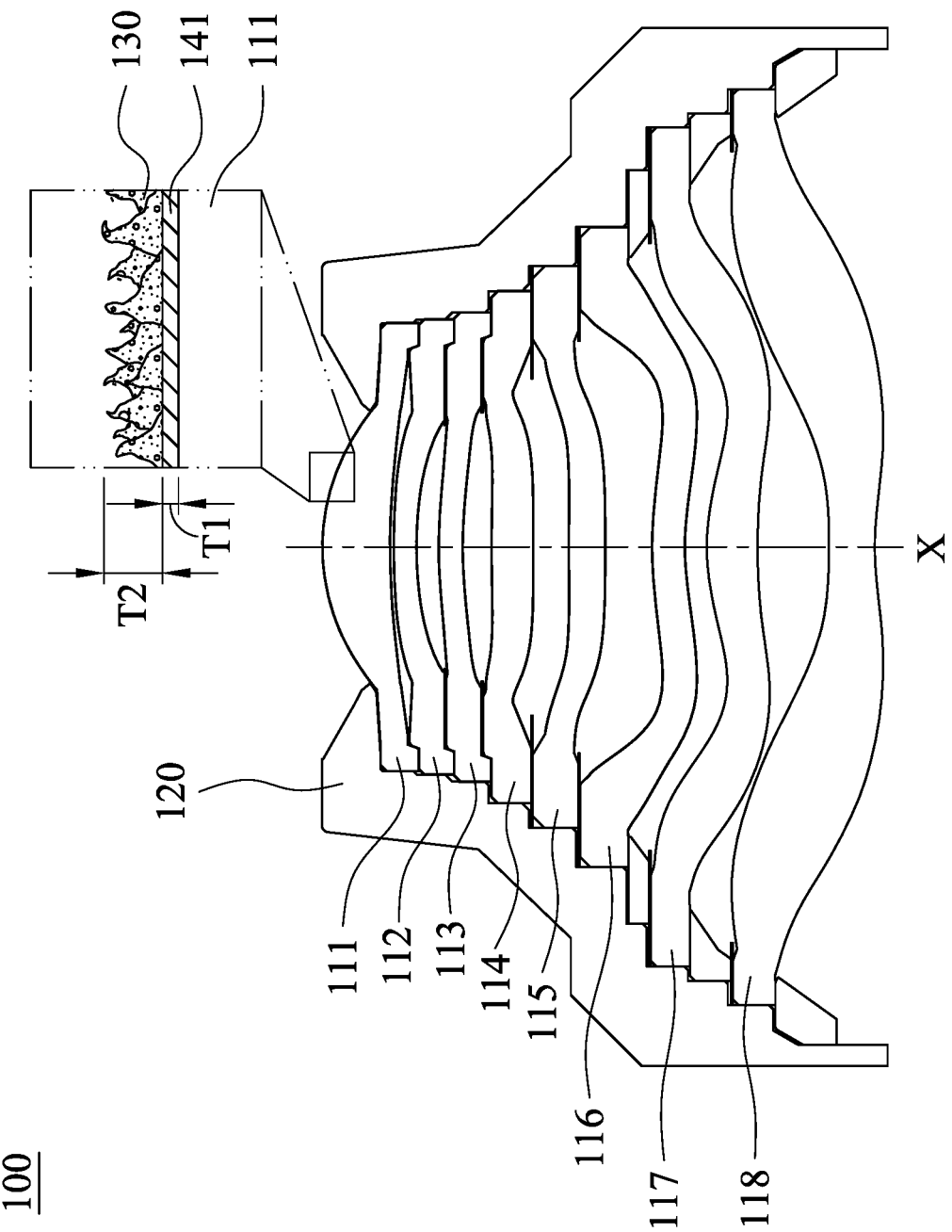
FIG. 1A is a schematic view of an imaging lens assembly according to the 1st embodiment of the present disclosure.

FIG. 1A is a schematic view of an imaging lens assembly 100 according to the 1st embodiment of the present disclosure. In FIG. 1A, the imaging lens assembly 100 includes an imaging lens element assembly (its numeral reference is omitted), an optical axis X passes through the imaging lens assembly 100, a visual angle of the imaging lens assembly 100 is 85 degrees, and the imaging lens assembly 100 is the main lens. The imaging lens element assembly includes a plurality of lens elements and a lens barrel 120.

In particular, the imaging lens element assembly, in order from an object side to an image side, includes lens elements 111, 112, 113, 114, 115, 116, 117, 118, and the lens elements 111, 112, 113, 114, 115, 116, 117, 118 are disposed in the lens barrel 120, wherein the optical features such as structures, surface shapes and so on of the lens elements can be disposed according to different imaging demand, and the optical features are not limited thereto.

Figure 1C:
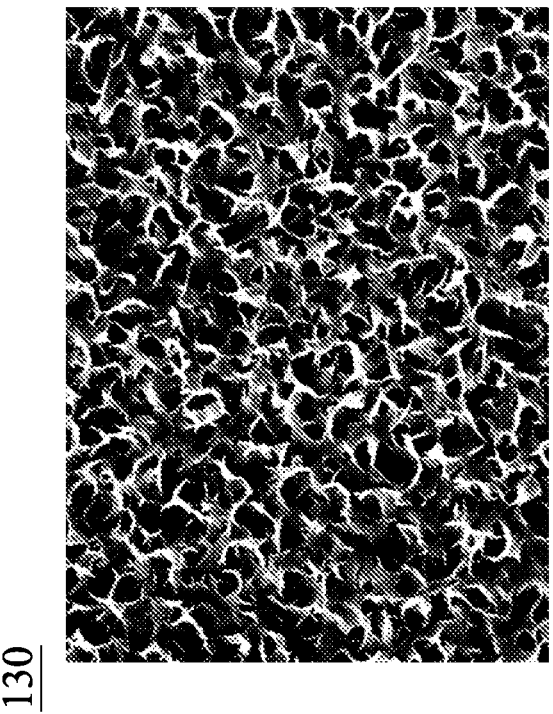
FIG. 1C is another image of the scanning electron microscope of the nanostructure layer according to the 1st embodiment in FIG. 1A.
Figure 1B:
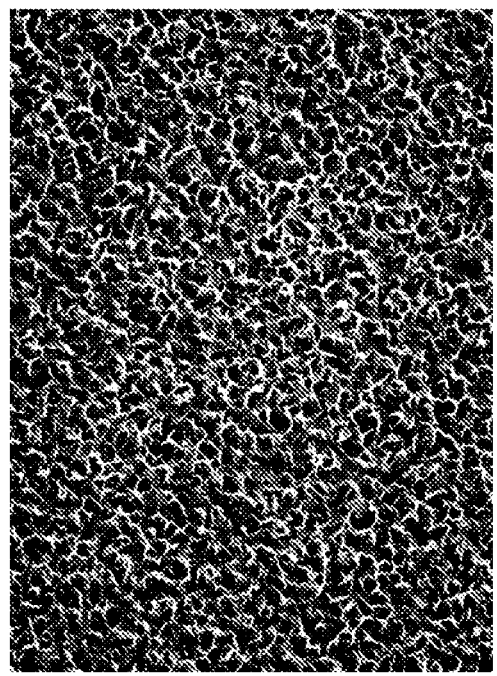
FIG. 1B is an image of a scanning electron microscope of the nanostructure layer according to the 1st embodiment in FIG. 1A.
Figure 1E:
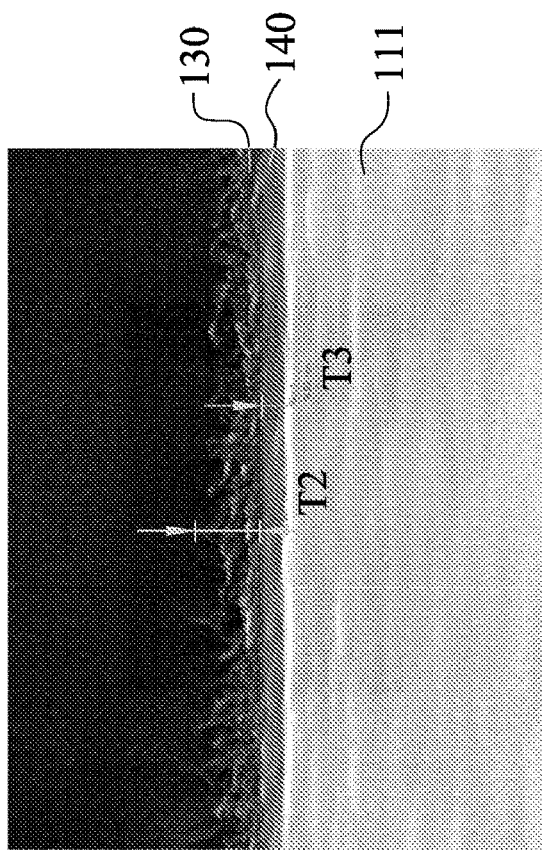
FIG. 1E is another image of a scanning electron microscope of the cross-section of the lens element according to the 1st embodiment in FIG. 1A.
Figure 1D:
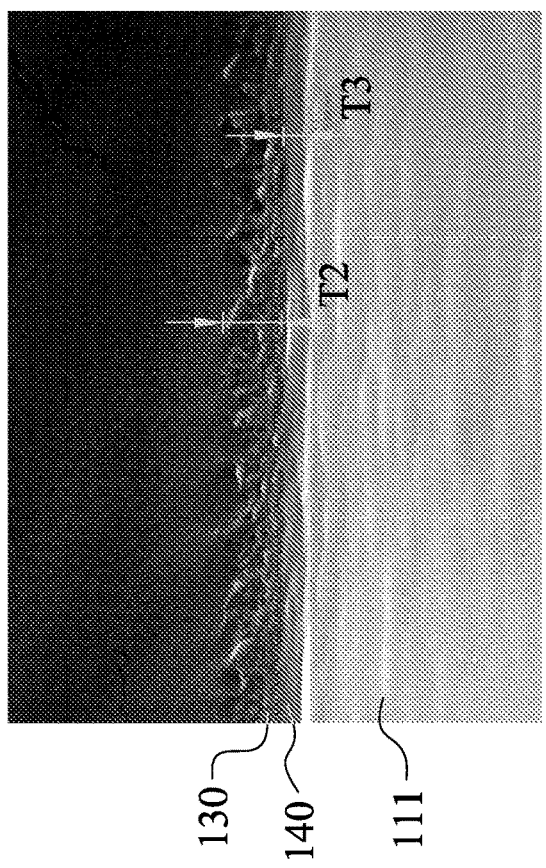
FIG. 1D is an image of a scanning electron microscope of a cross-section of the lens element according to the 1st embodiment in FIG. 1A.
Figure 1F:
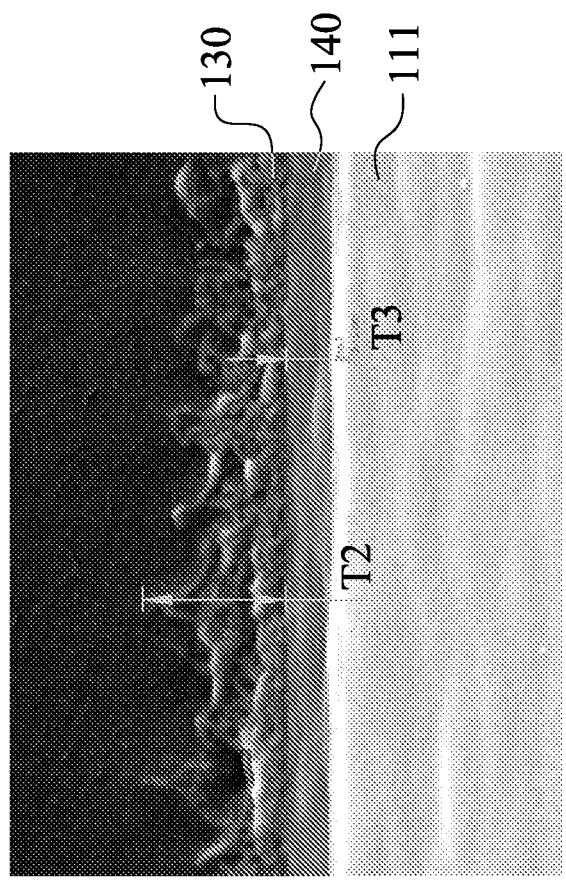
FIG. 1F is still another image of a scanning electron microscope of the cross-section of the lens element according to the 1st embodiment in FIG. 1A.

FIG. 1B is an image of a scanning electron microscope of the nanostructure layer 130 according to the 1st embodiment in FIG. 1A. FIG. 1C is another image of the scanning electron microscope of the nanostructure layer 130 according to the 1st embodiment in FIG. 1A. FIG. 1D is an image of a scanning electron microscope of a cross-section of the lens element 111 according to the 1st embodiment in FIG. 1A. FIG. 1E is another image of a scanning electron microscope of the cross-section of the lens element 111 according to the 1st embodiment in FIG. 1A. FIG. 1F is still another image of a scanning electron microscope of the cross-section of the lens element 111 according to the 1st embodiment in FIG. 1A. In FIGS. 1A to 1F, each of object-side surfaces and image-side surfaces of the lens elements 111, 112, 113, 114, 115, 116, 117, 118 includes at least one nanostructure layer and at least one structure connection film. Taking the object-side surface of the lens element 111 as the example, the nanostructure layer 130 is irregularly arranged, the nanostructure layer 130 includes an alumina crystal, and a structure dimension T2 of the nanostructure layer 130 is between 98 nm and 420 nm; the structure connection film 140 is disposed between the object-side surface of the lens element 111 and the nanostructure layer 130, the structure connection film 140 includes at least one silica film 141, the silica film 141 is directly contacted with a bottom of the nanostructure layer 130, and a film thickness T1 of the silica film 141 is between 20 nm and 150 nm.

In FIG. 1D, a thickness T3 of the structure connection film 140 is 73.68 nm, and a structure dimension T2 of the nanostructure layer 130 is 200.3 nm; in FIG. 1E, the thickness T3 of the structure connection film 140 is 76.62 nm, and the structure dimension T2 of the nanostructure layer 130 is 232.7 nm; in FIG. 1F, the thickness T3 of the structure connection film 140 is 75.15 nm, and the structure dimension T2 of the nanostructure layer 130 is 247.4 nm.

The nanostructure layer 130 can be steadied via the structure connection film 140, so that the nanostructure layer 130 can be disposed on every lens element made of different materials, and the adhesion stability of the nanostructure layer 130 can be enhanced. In detail, the nanostructure layer 130 has pores so that the equivalent refractive index of the nanostructure layer 130 is gradually changed towards 1.00. Hence, the variety of the refractive index between the interfaces is reduced, and the possibility of light reflection is reduced.

Table 4 lists the refractive index of the lens elements 111, 112, 113, 114, 115, 116, 117, 118, and the measuring light of the refractive index of the lens elements 111, 112, 113, 114, 115, 116, 117, 118 is a light of wavelength of 587.6 nm (d-line).

TABLE 4 the refractive index of the lens elements according to the 1st embodiment

| lens element | 111 | 112 | 113 | 114 |
|---|---|---|---|---|
| refractive index | 1.545 | 1.686 | 1.686 | 1.544 |
| lens element | 115 | 116 | 117 | 118 |
| refractive index | 1.544 | 1.566 | 1.544 | 1.534 |

According to the 1st embodiment, the lens element 112 can be a first lens element, the lens element 111 can be a second lens element, and the refractive index of the first lens element is different from the refractive index of the second lens element.

Moreover, the lens elements 111, 112, 113, 114, 115, 116, 117, 118 of the imaging lens element assembly are separated into a first lens group and a second lens group, wherein the first lens group is closer to the object side than the second lens group to the object side, and a number of the lens elements of the first lens group is less than a number of the lens elements of the second lens group. According to the 1st embodiment, the lens elements 111, 112 are the first lens group, and the lens elements 113, 114, 115, 116, 117, 118 are the second lens group, wherein the first lens group closest to the image side includes one of the lens elements of a high refractive index lens element (that is, the lens element 112), and an adjacent lens element of the high refractive index lens element at the object-side end is a low refractive index lens element (that is, the lens element 111); the second lens group includes the others lens elements of an image-side end of the first lens group (that is, the lens elements 113, 114, 115, 116, 117, 118), and the second lens group includes at least one of the lens elements being a high refractive index lens element (that is, the lens element 113). The possibility of light reflection formed between the interfaces can be reduced by disposing the nanostructure layer 130 on the high refractive index lens element.

In particular, the high refractive index lens element can be the lens element which the refractive index is greater than 1.6, or the lens element which the refractive index is higher than the average refractive index of the imaging lens assembly 100; the low refractive index lens element can be the lens element which the refractive index is smaller than 1.6, or the lens element which the refractive index is smaller than the average refractive index of the imaging lens assembly 100.

Figure 1G:
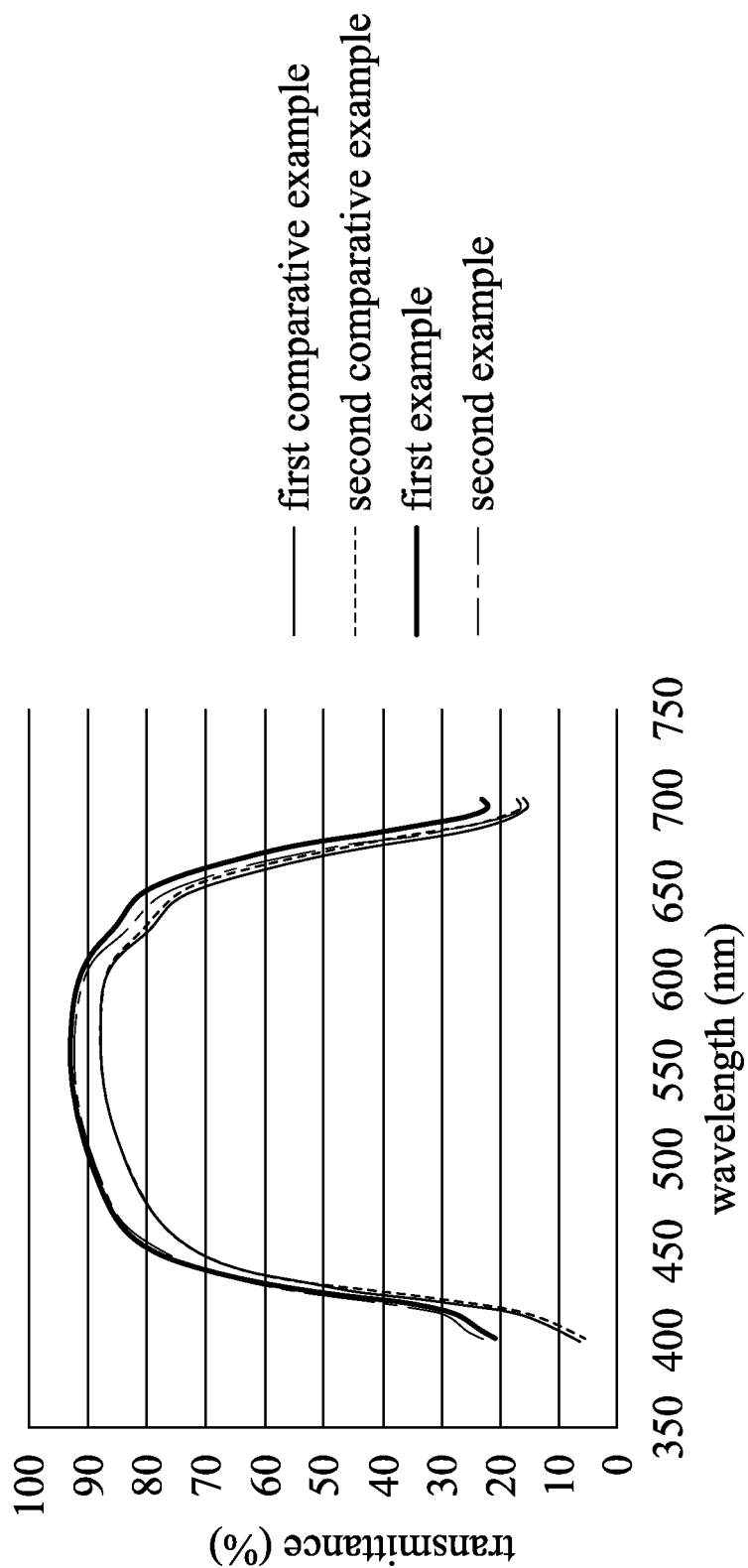
FIG. 1G is a curve diagram of the transmittance corresponding to the wavelength range between 400 nm and 700 nm of the 1st example and the 2nd example according to the 1st embodiment in FIG. 1A and the 1st comparative example and the 2nd comparative example.
Figure 1H:
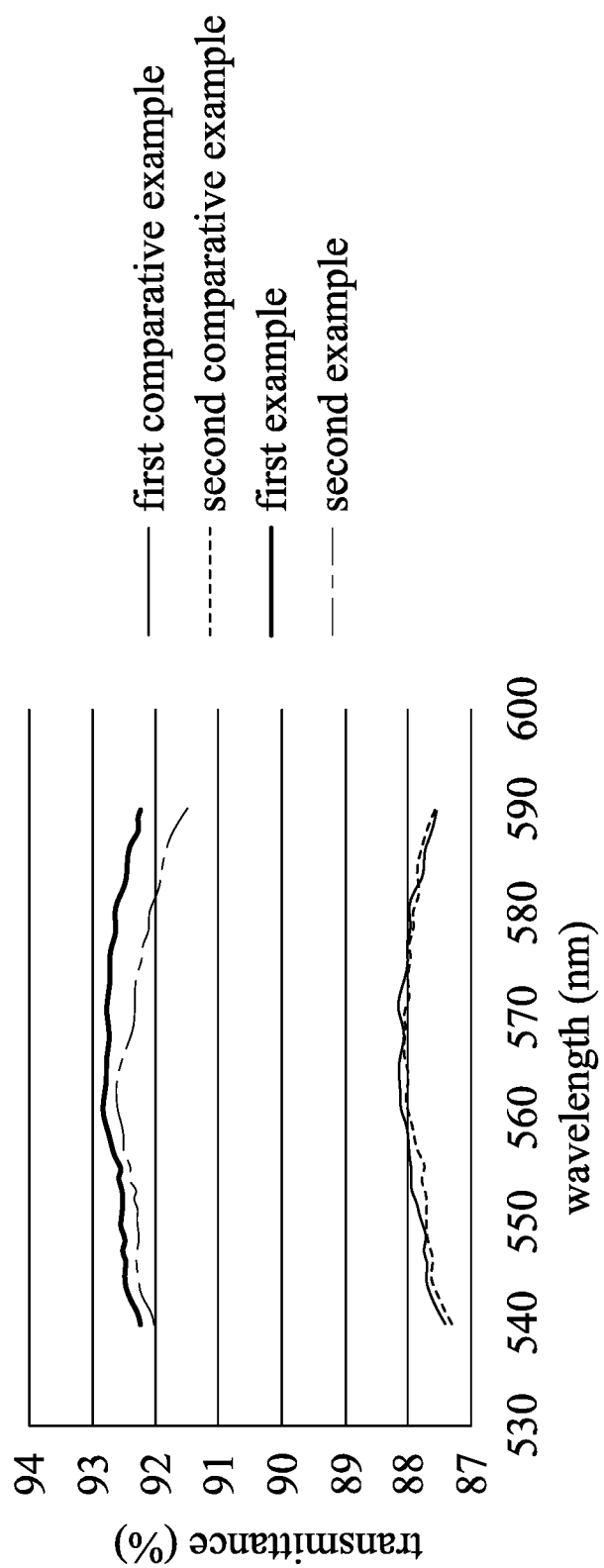
FIG. 1H is a curve diagram of the transmittance corresponding to the wavelength range between 540 nm and 590 nm of the 1st example and the 2nd example according to the 1st embodiment in FIG. 1A and the 1st comparative example and the 2nd comparative example.
Figure 1I:
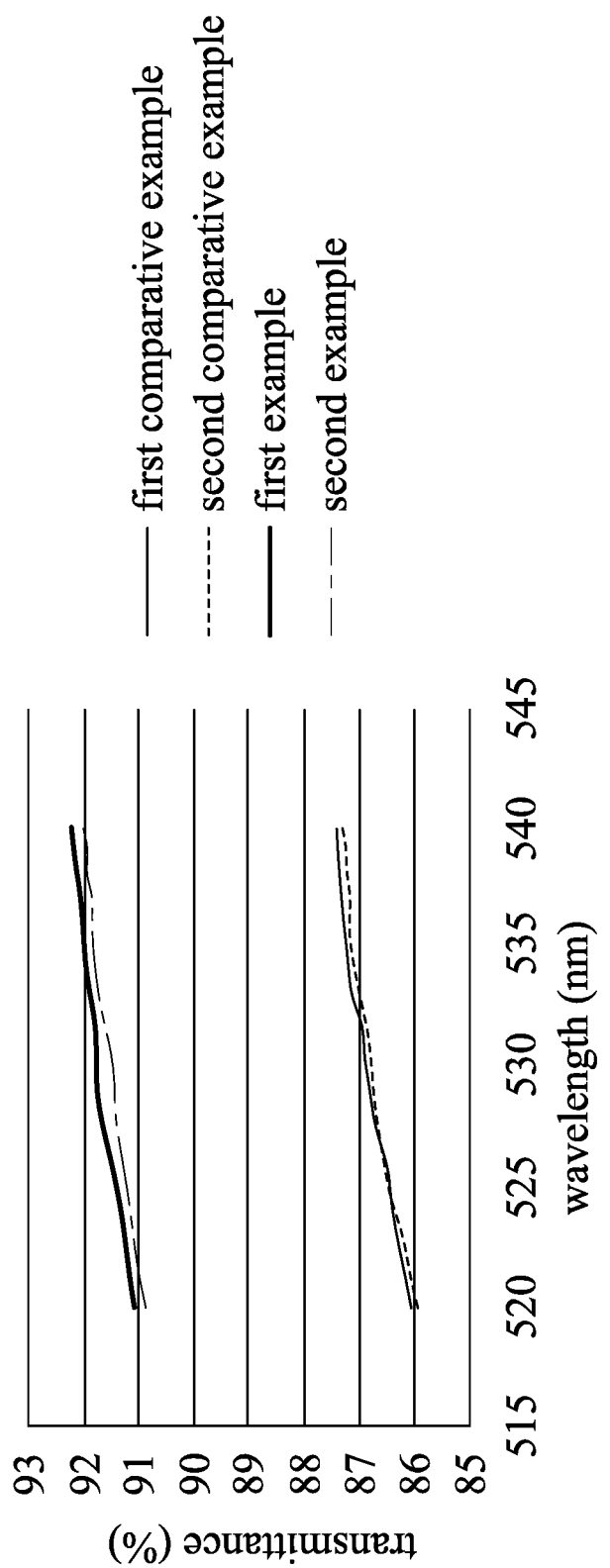
FIG. 1I is a curve diagram of the transmittance corresponding to the wavelength range between 520 nm and 540 nm of the 1st example and the 2nd example according to the 1st embodiment in FIG. 1A and the 1st comparative example and the 2nd comparative example.

Table 5 lists a transmittance corresponding to a wavelength range between 400 nm and 700 nm of the 1st example and the 2nd example according to the 1st embodiment and the 1st comparative example and the 2nd comparative example. Table 6 lists an average transmittance corresponding to a wavelength range between 540 nm and 590 nm, a wavelength range between 520 nm and 540 nm and a wavelength range between 530 nm and 540 nm of the 1st example and the 2nd example according to the 1st embodiment and the 1st comparative example and the 2nd comparative example. FIG. 1G is a curve diagram of the transmittance corresponding to the wavelength range between 400 nm and 700 nm of the 1st example and the 2nd example according to the 1st embodiment in FIG. 1A and the 1st comparative example and the 2nd comparative example. FIG. 1H is a curve diagram of the transmittance corresponding to the wavelength range between 540 nm and 590 nm of the 1st example and the 2nd example according to the 1st embodiment in FIG. 1A and the 1st comparative example and the 2nd comparative example. FIG. 1I is a curve diagram of the transmittance corresponding to the wavelength range between 520 nm and 540 nm of the 1st example and the 2nd example according to the 1st embodiment in FIG. 1A and the 1st comparative example and the 2nd comparative example. According to the 1st example and the 2nd example according to the 1st embodiment and the 1st comparative example and the 2nd comparative example, a light of the imaging lens assembly corresponding to a wavelength range between 540 nm and 590 nm has an average transmittance, and the average transmittance is $T_{5459}$; a light of the imaging lens assembly corresponding to a wavelength range between 520 nm and 540 nm has an average transmittance, and the average transmittance is $T_{5254}$; a light of the imaging lens assembly corresponding to a wavelength range between 530 nm and 540 nm has an average transmittance, and the average transmittance is $T_{5354}$. It should be mentioned that all of the 1st example and the 2nd example according to the 1st embodiment and the 1st comparative example and the 2nd comparative example include eight lens elements, but both of the 1st comparative example and the 2nd comparative example exclude the nanostructure layer and the structure connection film.

TABLE 5

| wavelength (nm) | transmittance of the 1st comparative example (%) | transmittance of the 2nd comparative example (%) | transmittance of the 1st example (%) | transmittance of the 2nd example (%) |
|---|---|---|---|---|
| 700 | 16.082 | 17.242 | 23.065 | 17.151 |
| 699 | 15.782 | 16.923 | 22.595 | 16.8 |
| 698 | 15.577 | 16.778 | 22.356 | 16.592 |
| 697 | 15.528 | 16.737 | 22.285 | 16.52 |
| 696 | 15.644 | 16.851 | 22.435 | 16.615 |
| 695 | 15.906 | 17.139 | 22.829 | 16.882 |
| 694 | 16.254 | 17.567 | 23.386 | 17.249 |
| 693 | 16.735 | 18.09 | 24.077 | 17.756 |
| 692 | 17.359 | 18.75 | 24.893 | 18.416 |
| 691 | 18.127 | 19.583 | 25.915 | 19.205 |
| 690 | 18.983 | 20.53 | 27.045 | 20.072 |
| 689 | 19.969 | 21.568 | 28.262 | 21.073 |
| 688 | 21.102 | 22.738 | 29.614 | 22.241 |
| 687 | 22.368 | 24.072 | 31.136 | 23.551 |
| 686 | 23.733 | 25.523 | 32.78 | 24.982 |
| 685 | 25.252 | 27.073 | 34.509 | 26.53 |
| 684 | 26.896 | 28.741 | 36.346 | 28.223 |
| 683 | 28.619 | 30.492 | 38.241 | 30.008 |
| 682 | 30.361 | 32.307 | 40.154 | 31.822 |
| 681 | 32.183 | 34.136 | 42.072 | 33.69 |
| 680 | 34.01 | 35.97 | 43.992 | 35.583 |
| 679 | 35.851 | 37.84 | 45.897 | 37.487 |
| 678 | 37.706 | 39.702 | 47.767 | 39.423 |
| 677 | 39.598 | 41.578 | 49.66 | 41.402 |
| 676 | 41.462 | 43.426 | 51.512 | 43.344 |
| 675 | 43.28 | 45.231 | 53.274 | 45.215 |
| 674 | 45.027 | 46.956 | 54.959 | 47.024 |
| 673 | 46.751 | 48.633 | 56.569 | 48.775 |
| 672 | 48.379 | 50.249 | 58.119 | 50.48 |
| 671 | 49.95 | 51.792 | 59.59 | 52.082 |
| 670 | 51.495 | 53.295 | 61.017 | 53.671 |
| 669 | 52.994 | 54.734 | 62.389 | 55.221 |
| 668 | 54.418 | 56.15 | 63.718 | 56.677 |
| 667 | 55.824 | 57.507 | 64.983 | 58.104 |
| 666 | 57.182 | 58.775 | 66.162 | 59.492 |
| 665 | 58.457 | 59.997 | 67.318 | 60.783 |
| 664 | 59.686 | 61.183 | 68.413 | 62.033 |
| 663 | 60.855 | 62.314 | 69.402 | 63.25 |
| 662 | 61.992 | 63.392 | 70.349 | 64.46 |
| 661 | 63.084 | 64.462 | 71.312 | 65.621 |
| 660 | 64.172 | 65.5 | 72.298 | 66.756 |
| 659 | 65.207 | 66.519 | 73.21 | 67.824 |
| 658 | 66.194 | 67.466 | 74.053 | 68.897 |
| 657 | 67.122 | 68.35 | 74.888 | 69.885 |
| 656 | 68.054 | 69.239 | 75.7 | 70.879 |
| 655 | 68.93 | 70.052 | 76.46 | 71.825 |
| 654 | 69.736 | 70.792 | 77.156 | 72.66 |
| 653 | 70.522 | 71.538 | 77.803 | 73.449 |
| 652 | 71.256 | 72.222 | 78.404 | 74.185 |
| 651 | 71.969 | 72.887 | 79.068 | 74.893 |
| 650 | 72.655 | 73.535 | 79.692 | 75.594 |
| 649 | 73.262 | 74.113 | 80.202 | 76.237 |
| 648 | 73.783 | 74.63 | 80.636 | 76.827 |
| 647 | 74.247 | 75.097 | 81.069 | 77.372 |
| 646 | 74.731 | 75.516 | 81.481 | 77.891 |
| 645 | 75.208 | 75.951 | 81.842 | 78.354 |
| 644 | 75.625 | 76.349 | 82.164 | 78.8 |
| 643 | 75.975 | 76.687 | 82.45 | 79.135 |
| 642 | 76.319 | 76.997 | 82.717 | 79.466 |
| 641 | 76.618 | 77.286 | 83.006 | 79.816 |
| 640 | 76.919 | 77.538 | 83.258 | 80.113 |
| 639 | 77.194 | 77.825 | 83.49 | 80.398 |
| 638 | 77.446 | 78.057 | 83.712 | 80.647 |
| 637 | 77.69 | 78.277 | 83.979 | 80.904 |
| 636 | 77.954 | 78.548 | 84.229 | 81.17 |
| 635 | 78.207 | 78.794 | 84.418 | 81.432 |
| 634 | 78.446 | 79.032 | 84.571 | 81.684 |
| 633 | 78.68 | 79.28 | 84.77 | 81.965 |
| 632 | 78.939 | 79.512 | 84.975 | 82.238 |
| 631 | 79.239 | 79.765 | 85.185 | 82.523 |

TABLE 5-continued

| wavelength (nm) | transmittance of the 1st comparative example (%) | transmittance of the 2nd comparative example (%) | transmittance of the 1st example (%) | transmittance of the 2nd example (%) |
| --- | --- | --- | --- | --- |
| 630 | 79.544 | 80.03 | 85.429 | 82.828 |
| 629 | 79.87 | 80.291 | 85.666 | 83.153 |
| 628 | 80.214 | 80.587 | 85.949 | 83.466 |
| 627 | 80.486 | 80.866 | 86.229 | 83.776 |
| 626 | 80.801 | 81.189 | 86.509 | 84.117 |
| 625 | 81.129 | 81.527 | 86.787 | 84.476 |
| 624 | 81.518 | 81.939 | 87.114 | 84.877 |
| 623 | 81.863 | 82.302 | 87.428 | 85.247 |
| 622 | 82.23 | 82.652 | 87.726 | 85.599 |
| 621 | 82.624 | 82.996 | 88.035 | 85.99 |
| 620 | 82.974 | 83.317 | 88.296 | 86.363 |
| 619 | 83.254 | 83.575 | 88.571 | 86.703 |
| 618 | 83.586 | 83.835 | 88.821 | 87.047 |
| 617 | 83.863 | 84.085 | 89.066 | 87.344 |
| 616 | 84.164 | 84.345 | 89.306 | 87.645 |
| 615 | 84.421 | 84.578 | 89.492 | 87.974 |
| 614 | 84.693 | 84.85 | 89.691 | 88.24 |
| 613 | 84.95 | 85.095 | 89.915 | 88.505 |
| 612 | 85.177 | 85.314 | 90.099 | 88.772 |
| 611 | 85.398 | 85.505 | 90.265 | 88.987 |
| 610 | 85.6 | 85.712 | 90.413 | 89.224 |
| 609 | 85.755 | 85.897 | 90.559 | 89.397 |
| 608 | 85.911 | 86.026 | 90.686 | 89.522 |
| 607 | 86.102 | 86.155 | 90.821 | 89.705 |
| 606 | 86.229 | 86.302 | 90.944 | 89.879 |
| 605 | 86.331 | 86.403 | 91.051 | 90.031 |
| 604 | 86.443 | 86.518 | 91.147 | 90.201 |
| 603 | 86.547 | 86.663 | 91.296 | 90.363 |
| 602 | 86.69 | 86.789 | 91.452 | 90.514 |
| 601 | 86.824 | 86.907 | 91.612 | 90.67 |
| 600 | 86.953 | 87.033 | 91.723 | 90.781 |
| 599 | 87.081 | 87.166 | 91.834 | 90.929 |
| 598 | 87.188 | 87.222 | 91.902 | 91.053 |
| 597 | 87.281 | 87.281 | 91.982 | 91.164 |
| 596 | 87.327 | 87.301 | 91.979 | 91.233 |
| 595 | 87.353 | 87.349 | 91.994 | 91.299 |
| 594 | 87.389 | 87.392 | 92.006 | 91.328 |
| 593 | 87.419 | 87.4 | 92.027 | 91.358 |
| 592 | 87.471 | 87.453 | 92.123 | 91.422 |
| 591 | 87.557 | 87.544 | 92.203 | 91.489 |
| 590 | 87.568 | 87.568 | 92.236 | 91.533 |
| 589 | 87.628 | 87.653 | 92.288 | 91.643 |
| 588 | 87.65 | 87.697 | 92.301 | 91.711 |
| 587 | 87.682 | 87.742 | 92.361 | 91.78 |
| 586 | 87.735 | 87.78 | 92.42 | 91.827 |
| 585 | 87.749 | 87.821 | 92.437 | 91.869 |
| 584 | 87.779 | 87.857 | 92.457 | 91.907 |
| 583 | 87.819 | 87.852 | 92.5 | 91.937 |
| 582 | 87.871 | 87.836 | 92.519 | 91.961 |
| 581 | 87.96 | 87.865 | 92.596 | 92.029 |
| 580 | 88.003 | 87.901 | 92.636 | 92.086 |
| 579 | 87.99 | 87.9 | 92.636 | 92.1 |
| 578 | 87.988 | 87.9 | 92.659 | 92.125 |
| 577 | 88.02 | 87.968 | 92.693 | 92.188 |
| 576 | 88.006 | 87.956 | 92.711 | 92.204 |
| 575 | 88.028 | 87.975 | 92.716 | 92.24 |
| 574 | 88.047 | 87.995 | 92.718 | 92.28 |
| 573 | 88.075 | 88.002 | 92.735 | 92.313 |
| 572 | 88.128 | 87.996 | 92.762 | 92.322 |
| 571 | 88.154 | 88.024 | 92.768 | 92.336 |
| 570 | 88.137 | 88.059 | 92.763 | 92.36 |
| 569 | 88.105 | 88.063 | 92.751 | 92.357 |
| 568 | 88.079 | 88.068 | 92.74 | 92.407 |
| 567 | 88.099 | 88.051 | 92.773 | 92.449 |
| 566 | 88.113 | 88.052 | 92.785 | 92.529 |
| 565 | 88.117 | 88.034 | 92.798 | 92.587 |
| 564 | 88.113 | 88.01 | 92.798 | 92.607 |
| 563 | 88.112 | 88.028 | 92.813 | 92.618 |
| 562 | 88.093 | 88.006 | 92.815 | 92.611 |
| 561 | 88.099 | 87.993 | 92.838 | 92.599 |
| 560 | 88.067 | 87.962 | 92.815 | 92.585 |
| 559 | 88.022 | 87.93 | 92.773 | 92.562 |
| 558 | 87.997 | 87.882 | 92.729 | 92.523 |
| 557 | 87.99 | 87.844 | 92.671 | 92.506 |
| 556 | 87.973 | 87.809 | 92.634 | 92.481 |

TABLE 5-continued

| wavelength (nm) | transmittance of the 1st comparative example (%) | transmittance of the 2nd comparative example (%) | transmittance of the 1st example (%) | transmittance of the 2nd example (%) |
| --- | --- | --- | --- | --- |
| 555 | 87.95 | 87.766 | 92.562 | 92.417 |
| 554 | 87.937 | 87.78 | 92.566 | 92.413 |
| 553 | 87.932 | 87.745 | 92.554 | 92.34 |
| 552 | 87.902 | 87.732 | 92.521 | 92.313 |
| 551 | 87.838 | 87.713 | 92.514 | 92.283 |
| 550 | 87.811 | 87.7 | 92.523 | 92.299 |
| 549 | 87.76 | 87.679 | 92.529 | 92.275 |
| 548 | 87.734 | 87.663 | 92.498 | 92.274 |
| 547 | 87.754 | 87.656 | 92.521 | 92.303 |
| 546 | 87.703 | 87.615 | 92.489 | 92.285 |
| 545 | 87.715 | 87.631 | 92.496 | 92.288 |
| 544 | 87.715 | 87.609 | 92.482 | 92.262 |
| 543 | 87.667 | 87.538 | 92.417 | 92.241 |
| 542 | 87.6 | 87.474 | 92.371 | 92.182 |
| 541 | 87.502 | 87.377 | 92.274 | 92.088 |
| 540 | 87.419 | 87.313 | 92.237 | 92.027 |
| 539 | 87.388 | 87.257 | 92.193 | 91.957 |
| 538 | 87.376 | 87.226 | 92.142 | 91.935 |
| 537 | 87.318 | 87.187 | 92.068 | 91.867 |
| 536 | 87.299 | 87.187 | 92.039 | 91.861 |
| 535 | 87.251 | 87.137 | 92.019 | 91.846 |
| 534 | 87.198 | 87.076 | 91.971 | 91.794 |
| 533 | 87.136 | 86.995 | 91.918 | 91.746 |
| 532 | 86.989 | 86.884 | 91.83 | 91.65 |
| 531 | 86.906 | 86.835 | 91.821 | 91.569 |
| 530 | 86.85 | 86.778 | 91.797 | 91.5 |
| 529 | 86.766 | 86.73 | 91.75 | 91.461 |
| 528 | 86.714 | 86.694 | 91.695 | 91.434 |
| 527 | 86.63 | 86.626 | 91.606 | 91.38 |
| 526 | 86.512 | 86.536 | 91.508 | 91.308 |
| 525 | 86.443 | 86.461 | 91.438 | 91.242 |
| 524 | 86.391 | 86.369 | 91.361 | 91.196 |
| 523 | 86.303 | 86.221 | 91.263 | 91.107 |
| 522 | 86.233 | 86.13 | 91.217 | 91.036 |
| 521 | 86.157 | 86.04 | 91.175 | 91.001 |
| 520 | 86.054 | 85.936 | 91.109 | 90.918 |
| 519 | 85.948 | 85.854 | 91.044 | 90.847 |
| 518 | 85.836 | 85.781 | 90.952 | 90.787 |
| 517 | 85.707 | 85.668 | 90.902 | 90.682 |
| 516 | 85.602 | 85.58 | 90.855 | 90.624 |
| 515 | 85.505 | 85.499 | 90.829 | 90.594 |
| 514 | 85.426 | 85.389 | 90.764 | 90.537 |
| 513 | 85.329 | 85.257 | 90.665 | 90.45 |
| 512 | 85.207 | 85.135 | 90.574 | 90.377 |
| 511 | 85.094 | 85.057 | 90.52 | 90.333 |
| 510 | 85.011 | 84.984 | 90.458 | 90.271 |
| 509 | 84.884 | 84.867 | 90.416 | 90.192 |
| 508 | 84.751 | 84.75 | 90.386 | 90.105 |
| 507 | 84.615 | 84.618 | 90.293 | 90.016 |
| 506 | 84.453 | 84.451 | 90.148 | 89.89 |
| 505 | 84.301 | 84.324 | 90.046 | 89.797 |
| 504 | 84.157 | 84.201 | 89.899 | 89.675 |
| 503 | 84.032 | 84.062 | 89.777 | 89.524 |
| 502 | 83.9 | 83.964 | 89.681 | 89.438 |
| 501 | 83.767 | 83.842 | 89.632 | 89.379 |
| 500 | 83.642 | 83.706 | 89.562 | 89.321 |
| 499 | 83.519 | 83.544 | 89.476 | 89.251 |
| 498 | 83.39 | 83.403 | 89.4 | 89.151 |
| 497 | 83.246 | 83.241 | 89.337 | 89.102 |
| 496 | 83.088 | 83.062 | 89.206 | 89.003 |
| 495 | 82.935 | 82.913 | 89.11 | 88.917 |
| 494 | 82.742 | 82.78 | 89.029 | 88.777 |
| 493 | 82.596 | 82.622 | 88.936 | 88.671 |
| 492 | 82.456 | 82.452 | 88.802 | 88.54 |
| 491 | 82.326 | 82.319 | 88.696 | 88.455 |
| 490 | 82.174 | 82.16 | 88.594 | 88.319 |
| 489 | 82.032 | 82.02 | 88.472 | 88.203 |
| 488 | 81.894 | 81.868 | 88.36 | 88.085 |
| 487 | 81.73 | 81.673 | 88.275 | 87.959 |
| 486 | 81.573 | 81.503 | 88.174 | 87.843 |
| 485 | 81.372 | 81.294 | 88.02 | 87.721 |
| 484 | 81.175 | 81.139 | 87.87 | 87.565 |
| 483 | 81.016 | 81.004 | 87.795 | 87.465 |
| 482 | 80.846 | 80.843 | 87.656 | 87.316 |
| 481 | 80.677 | 80.689 | 87.5 | 87.209 |

TABLE 5-continued

| wavelength (nm) | transmittance of the 1st comparative example (%) | transmittance of the 2nd comparative example (%) | transmittance of the 1st example (%) | transmittance of the 2nd example (%) |
|---|---|---|---|---|
| 480 | 80.477 | 80.529 | 87.336 | 87 |
| 479 | 80.286 | 80.319 | 87.165 | 86.816 |
| 478 | 80.099 | 80.127 | 87.02 | 86.664 |
| 477 | 79.91 | 79.928 | 86.85 | 86.509 |
| 476 | 79.765 | 79.784 | 86.761 | 86.377 |
| 475 | 79.603 | 79.651 | 86.657 | 86.256 |
| 474 | 79.474 | 79.551 | 86.563 | 86.145 |
| 473 | 79.257 | 79.356 | 86.4 | 85.965 |
| 472 | 79.072 | 79.173 | 86.226 | 85.779 |
| 471 | 78.876 | 78.95 | 86.012 | 85.568 |
| 470 | 78.673 | 78.711 | 85.761 | 85.349 |
| 469 | 78.432 | 78.488 | 85.543 | 85.126 |
| 468 | 78.235 | 78.283 | 85.329 | 84.933 |
| 467 | 77.975 | 78.081 | 85.1 | 84.734 |
| 466 | 77.777 | 77.898 | 84.898 | 84.544 |
| 465 | 77.614 | 77.708 | 84.687 | 84.309 |
| 464 | 77.42 | 77.521 | 84.489 | 84.086 |
| 463 | 77.168 | 77.208 | 84.205 | 83.769 |
| 462 | 76.902 | 76.889 | 83.896 | 83.451 |
| 461 | 76.601 | 76.57 | 83.597 | 83.097 |
| 460 | 76.317 | 76.293 | 83.293 | 82.777 |
| 459 | 75.926 | 75.946 | 82.873 | 82.373 |
| 458 | 75.551 | 75.661 | 82.52 | 81.998 |
| 457 | 75.204 | 75.366 | 82.147 | 81.624 |
| 456 | 74.907 | 75.035 | 81.756 | 81.263 |
| 455 | 74.578 | 74.683 | 81.386 | 80.844 |
| 454 | 74.26 | 74.325 | 81.015 | 80.441 |
| 453 | 73.836 | 73.887 | 80.575 | 79.932 |
| 452 | 73.349 | 73.355 | 80.066 | 79.399 |
| 451 | 72.835 | 72.855 | 79.537 | 78.863 |
| 450 | 72.3 | 72.391 | 79.006 | 78.3 |
| 449 | 71.703 | 71.866 | 78.427 | 77.732 |
| 448 | 71.108 | 71.261 | 77.812 | 77.142 |
| 447 | 70.554 | 70.674 | 77.226 | 76.545 |
| 446 | 69.975 | 70.041 | 76.621 | 75.942 |
| 445 | 69.326 | 69.333 | 75.926 | 75.312 |
| 444 | 68.639 | 68.595 | 75.241 | 74.601 |
| 443 | 67.88 | 67.77 | 74.466 | 73.809 |
| 442 | 67.073 | 66.928 | 73.622 | 73 |
| 441 | 66.166 | 66.024 | 72.806 | 72.178 |
| 440 | 65.199 | 65.056 | 71.94 | 71.35 |
| 439 | 64.182 | 64.022 | 71.01 | 70.463 |
| 438 | 63.039 | 62.857 | 70.008 | 69.532 |
| 437 | 61.781 | 61.573 | 68.894 | 68.532 |
| 436 | 60.481 | 60.16 | 67.689 | 67.386 |
| 435 | 59.084 | 58.64 | 66.389 | 66.204 |
| 434 | 57.575 | 57.009 | 65.035 | 64.956 |
| 433 | 55.961 | 55.282 | 63.597 | 63.603 |
| 432 | 54.238 | 53.433 | 62.054 | 62.162 |
| 431 | 52.392 | 51.48 | 60.395 | 60.694 |
| 430 | 50.425 | 49.45 | 58.705 | 59.168 |
| 429 | 48.283 | 47.218 | 56.876 | 57.48 |
| 428 | 46.018 | 44.849 | 54.86 | 55.621 |
| 427 | 43.679 | 42.397 | 52.797 | 53.71 |
| 426 | 41.258 | 39.892 | 50.698 | 51.733 |
| 425 | 38.819 | 37.33 | 48.539 | 49.69 |
| 424 | 36.35 | 34.745 | 46.337 | 47.65 |
| 423 | 33.881 | 32.195 | 44.109 | 45.655 |
| 422 | 31.428 | 29.683 | 41.873 | 43.609 |
| 421 | 29.036 | 27.227 | 39.638 | 41.545 |
| 420 | 26.747 | 24.915 | 37.467 | 39.537 |
| 419 | 24.575 | 22.772 | 35.447 | 37.613 |
| 418 | 22.575 | 20.806 | 33.575 | 35.803 |
| 417 | 20.805 | 19.052 | 31.857 | 34.119 |
| 416 | 19.28 | 17.553 | 30.403 | 32.675 |
| 415 | 17.916 | 16.246 | 29.175 | 31.443 |
| 414 | 16.706 | 15.059 | 28.093 | 30.34 |
| 413 | 15.672 | 14.026 | 27.157 | 29.414 |
| 412 | 14.733 | 13.17 | 26.418 | 28.637 |
| 411 | 13.896 | 12.427 | 25.835 | 28.022 |
| 410 | 13.133 | 11.734 | 25.311 | 27.451 |
| 409 | 12.464 | 11.13 | 24.923 | 27.055 |
| 408 | 11.826 | 10.552 | 24.581 | 26.729 |
| 407 | 11.192 | 10.002 | 24.294 | 26.411 |
| 406 | 10.55 | 9.412 | 23.95 | 26.069 |

TABLE 5-continued

| wavelength (nm) | transmittance of the 1st comparative example (%) | transmittance of the 2nd comparative example (%) | transmittance of the 1st example (%) | transmittance of the 2nd example (%) |
| --- | --- | --- | --- | --- |
| 405 | 9.9 | 8.805 | 23.565 | 25.656 |
| 404 | 9.216 | 8.174 | 23.124 | 25.199 |
| 403 | 8.502 | 7.556 | 22.618 | 24.677 |
| 402 | 7.787 | 6.93 | 22.083 | 24.121 |
| 401 | 7.076 | 6.305 | 21.493 | 23.53 |
| 400 | 6.39 | 5.683 | 20.842 | 22.891 |

TABLE 6

| | 1st example | 2nd example | 1st comparative example | 2nd comparative example |
| --- | --- | --- | --- | --- |
| $T_{5459}$ (%) | 92.59 | 92.24 | 87.90 | 87.82 |
| $T_{5254}$ (%) | 91.72 | 91.52 | 86.83 | 86.74 |
| $T_{5354}$ (%) | 92.00 | 91.80 | 87.19 | 87.08 |

When the imaging lens assembly 100 has a transmittance decay indicator, and the transmittance decay indicator is corresponding to a number of the lens elements of the imaging lens element assembly and an analog constant of a transmittance decay, wherein the transmittance decay indicator is Tdi; the number of the lens elements of the imaging lens element assembly is E; a light of the imaging lens assembly 100 corresponding to a wavelength range between 540 nm and 590 nm has an average transmittance, and the average transmittance is $T_{5459}$; a light of the imaging lens assembly 100 corresponding to a wavelength range between 520 nm and 540 nm has an average transmittance, and the average transmittance is $T_{5254}$; a simulated transmittance of the imaging lens assembly 100 is $T_{sim}$, and the simulated transmittance is corresponding to the light of the wavelength range between 540 nm and 590 nm; the refractive index of the first lens element (that is, the lens element 112) is n1, the refractive index of the second lens element (that is, the lens element 111) is n2, and a difference between the refractive index of the first lens element and the refractive index of the second lens element is Δn; a total number of the surfaces of the object-side surfaces and the image-side surfaces of the nanostructure layers 130 disposed on the lens elements is $N_{CS}$, the following conditions of the Table 7 are satisfied.

TABLE 7

| 1st embodiment | | | |
| --- | --- | --- | --- |
| Tdi | 0.879 | $T_{5254}$ (%) | 91.62 |
| E | 8 | $T_{sim}$ (%) | 92.41 |
| $N_{CS}$ | 16 | n1 | 1.686 |
| $N_{CS}$/2E | 1 | n2 | 1.545 |
| $T_{5459}$ (%) | 92.42 | Δn | 0.141 |

2nd Embodiment

Figure 2A:
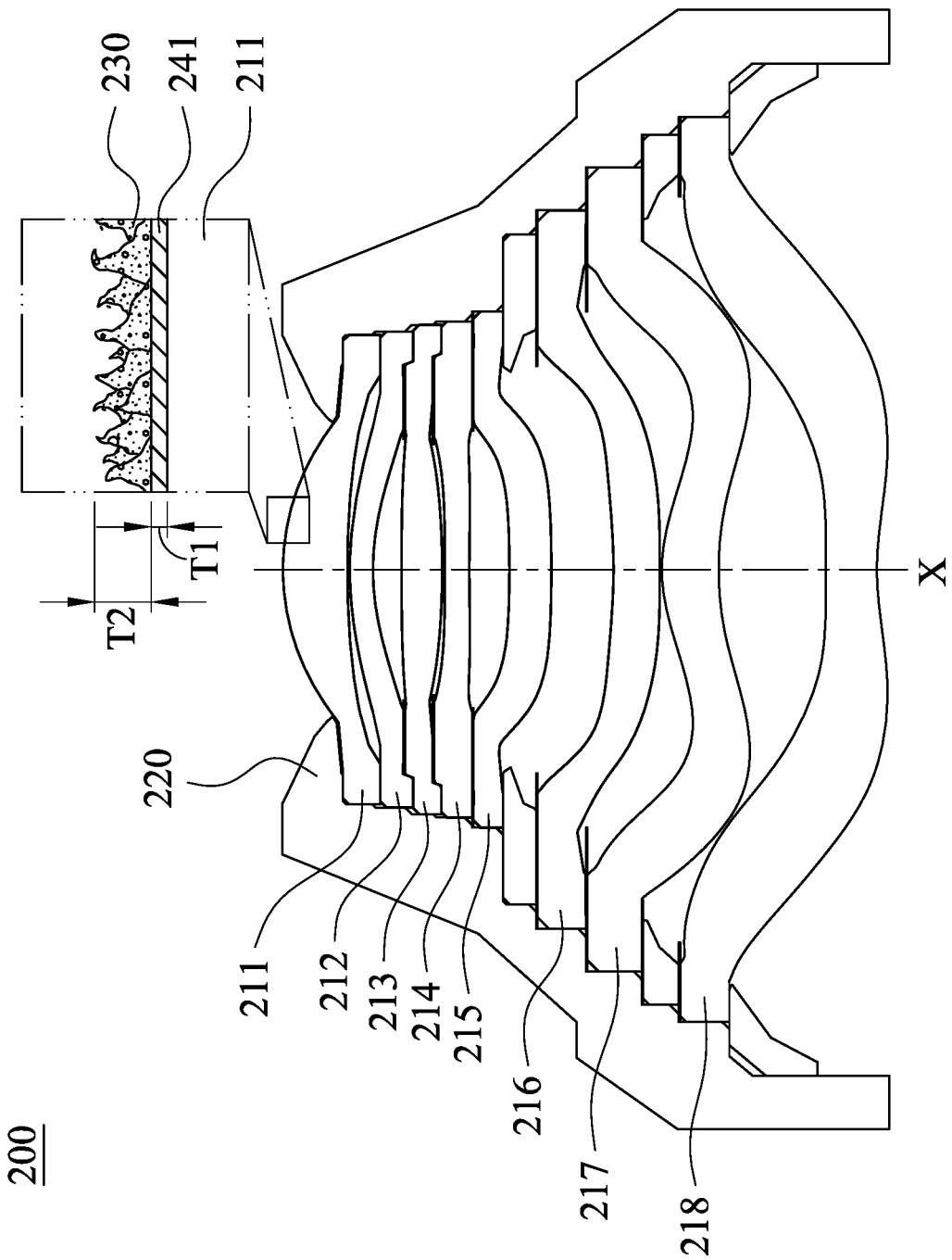
FIG. 2A is a schematic view of an imaging lens assembly according to the 2nd embodiment of the present disclosure.

FIG. 2A is a schematic view of an imaging lens assembly 200 according to the 2nd embodiment of the present disclosure. In FIG. 2A, the imaging lens assembly 200 includes an imaging lens element assembly (its numeral reference is omitted), an optical axis X passes through the imaging lens assembly 200, a visual angle of the imaging lens assembly 200 is 85 degrees, and the imaging lens assembly 200 is the main lens. The imaging lens element assembly includes a plurality of lens elements and a lens barrel 220.

In particular, the imaging lens element assembly, in order from an object side to an image side, includes lens elements 211, 212, 213, 214, 215, 216, 217, 218, and the lens elements 211, 212, 213, 214, 215, 216, 217, 218 are disposed in the lens barrel 220, wherein the optical features such as structures, surface shapes and so on of the lens elements can be disposed according to different imaging demand, and the optical features are not limited thereto.

Each of object-side surfaces and image-side surfaces of the lens elements 211, 212, 213, 214, 215, 216, 217, 218 includes at least one nanostructure layer and at least one structure connection film. Taking the object-side surface of the lens element 211 as the example, the nanostructure layer 230 is irregularly arranged, the nanostructure layer 230 includes an alumina crystal, and a structure dimension T2 of the nanostructure layer 230 is between 98 nm and 420 nm; the structure connection film (its reference numeral is omitted) is disposed between the object-side surface of the lens element 211 and the nanostructure layer 230, the structure connection film includes at least one silica film 241, the silica film 241 is directly contacted with a bottom of the nanostructure layer 230, and a film thickness T1 of the silica film 241 is between 20 nm and 150 nm.

The nanostructure layer 230 can be steadied via the structure connection film, so that the nanostructure layer 230 can be disposed on every lens element made of different materials, and the adhesion stability of the nanostructure layer 230 can be enhanced. In detail, the nanostructure layer 230 has pores so that the equivalent refractive index of the nanostructure layer 230 is gradually changed towards 1.00. Hence, the variety of the refractive index between the interfaces is reduced, and the possibility of light reflection is reduced.

Table 8 lists the refractive index of the lens elements 211, 212, 213, 214, 215, 216, 217, 218, and the measuring light of the refractive index of the lens elements 211, 212, 213, 214, 215, 216, 217, 218 is a light of wavelength of 587.6 nm (d-line).

TABLE 8

| the refractive index of the lens elements according to the 2nd embodiment | | | | |
| --- | --- | --- | --- | --- |
| lens element | 211 | 212 | 213 | 214 |
| refractive index | 1.545 | 1.669 | 1.544 | 1.669 |
| lens element | 215 | 216 | 217 | 218 |
| refractive index | 1.544 | 1.566 | 1.544 | 1.534 |

According to the 2nd embodiment, the lens element 212 can be a first lens element, the lens element 211 can be a second lens element, and the refractive index of the first lens element is different from the refractive index of the second lens element.

Moreover, the lens elements 211, 212, 213, 214, 215, 216, 217, 218 of the imaging lens element assembly are separated into a first lens group and a second lens group, wherein the first lens group is closer to the object side than the second lens group to the object side, and a number of the lens elements of the first lens group is less than a number of the lens elements of the second lens group. According to the 2nd embodiment, the lens elements 211, 212 are the first lens group, and the lens elements 213, 214, 215, 216, 217, 218 are the second lens group, wherein the first lens group closest to the image side includes one of the lens elements of a high refractive index lens element (that is, the lens element 212), and an adjacent lens element of the high refractive index lens element at the object-side end is a low refractive index lens element (that is, the lens element 211); the second lens group includes the others lens elements of an image-side end of the first lens group (that is, the lens elements 213, 214, 215, 216, 217, 218), and the second lens group includes at least one of the lens elements being a high refractive index lens element (that is, the lens element 214). The possibility of light reflection formed between the interfaces can be reduced by disposing the nanostructure layer 230 on the high refractive index lens element.

In particular, the high refractive index lens element can be the lens element which the refractive index is greater than 1.6, or the lens element which the refractive index is higher than the average refractive index of the imaging lens assembly 200; the low refractive index lens element can be the lens element which the refractive index is smaller than 1.6, or the lens element which the refractive index is smaller than the average refractive index of the imaging lens assembly 200.

Figure 2B:
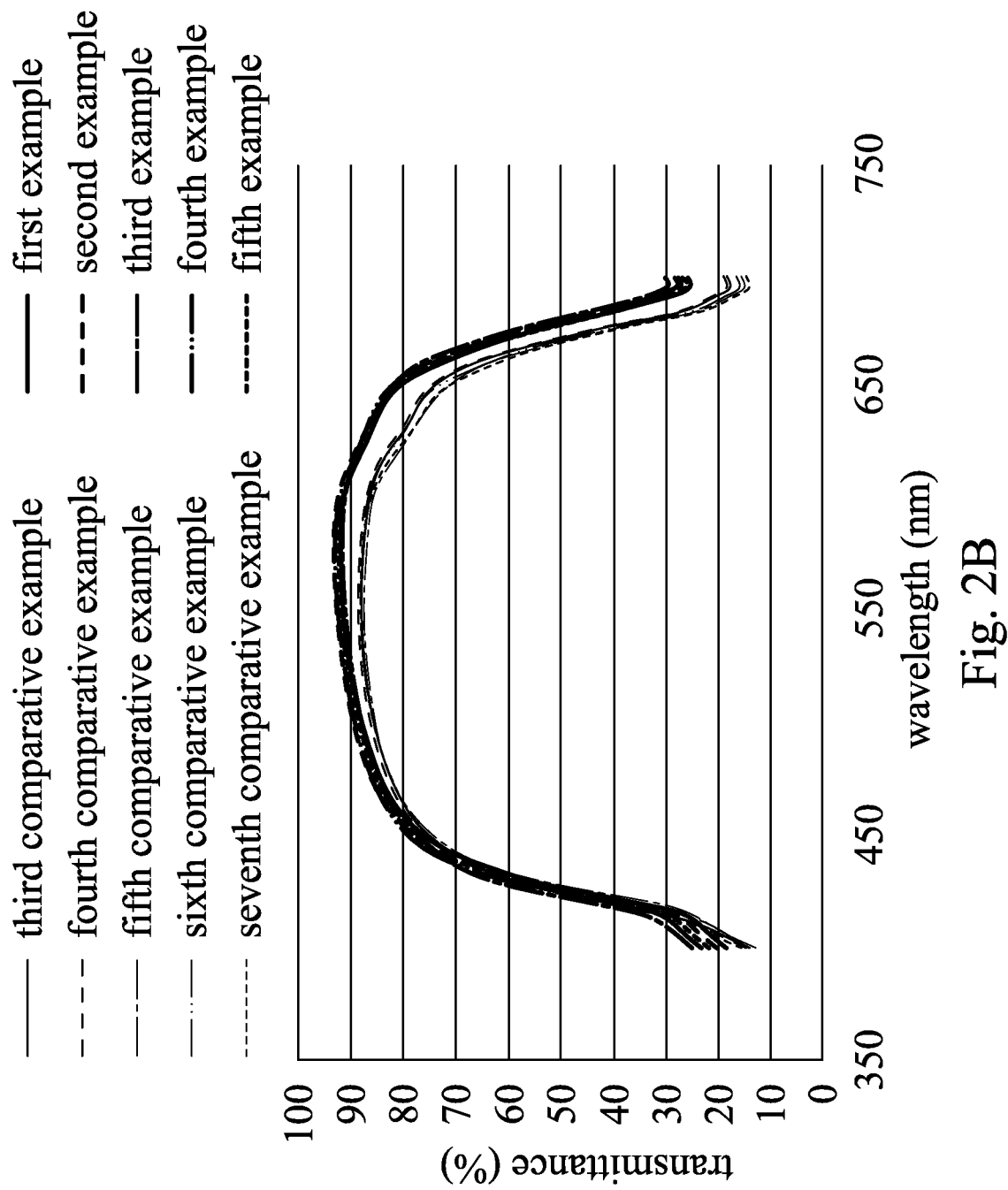
FIG. 2B is a curve diagram of the transmittance corresponding to a wavelength range between 400 nm and 700 nm of the 1st example to the 5th example according to the 2nd embodiment in FIG. 2A and the 3rd comparative example to the 7th comparative example.
Figure 2C:
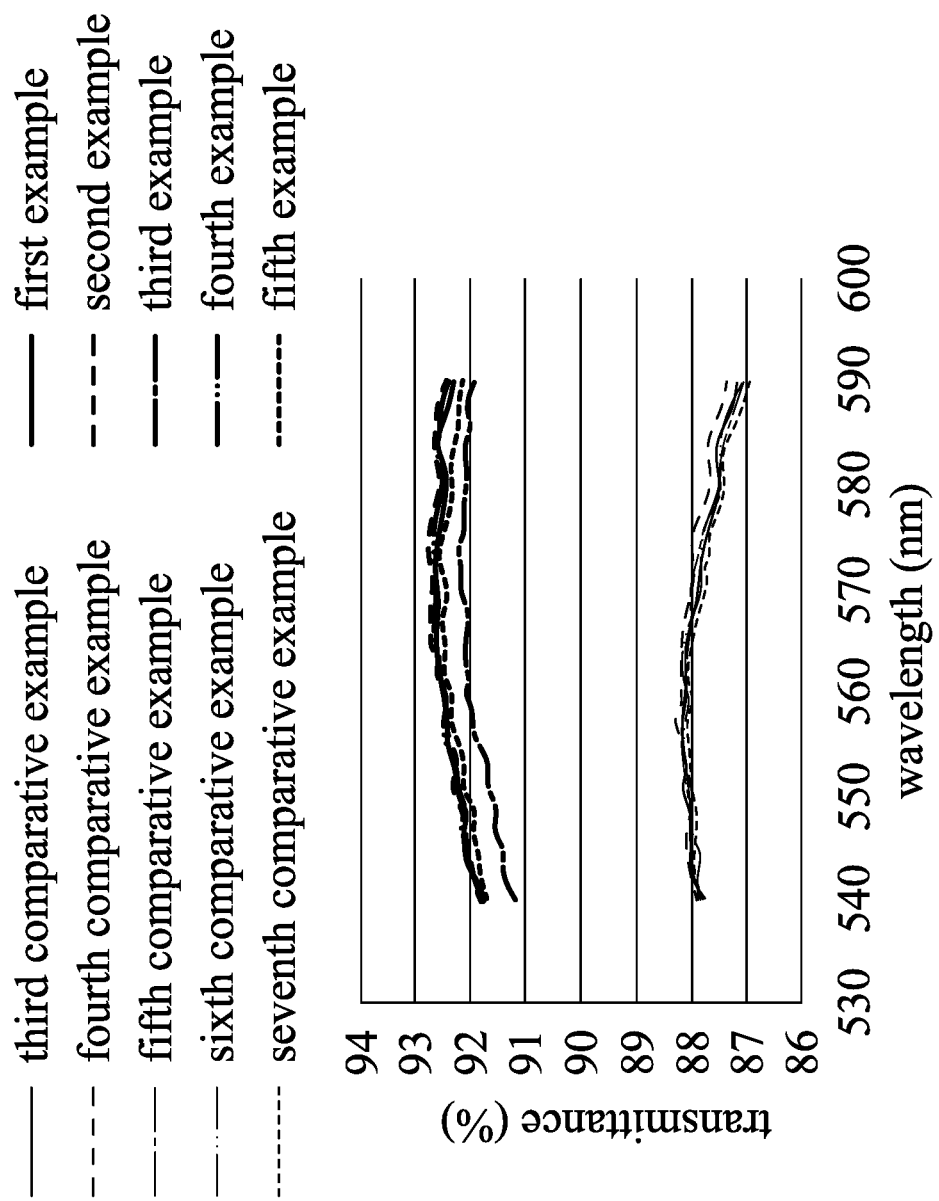
FIG. 2C is a curve diagram of the transmittance corresponding to a wavelength range between 540 nm and 590 nm of the 1st example to the 5th example according to the 2nd embodiment in FIG. 2A and the 3rd comparative example to the 7th comparative example.
Figure 2D:
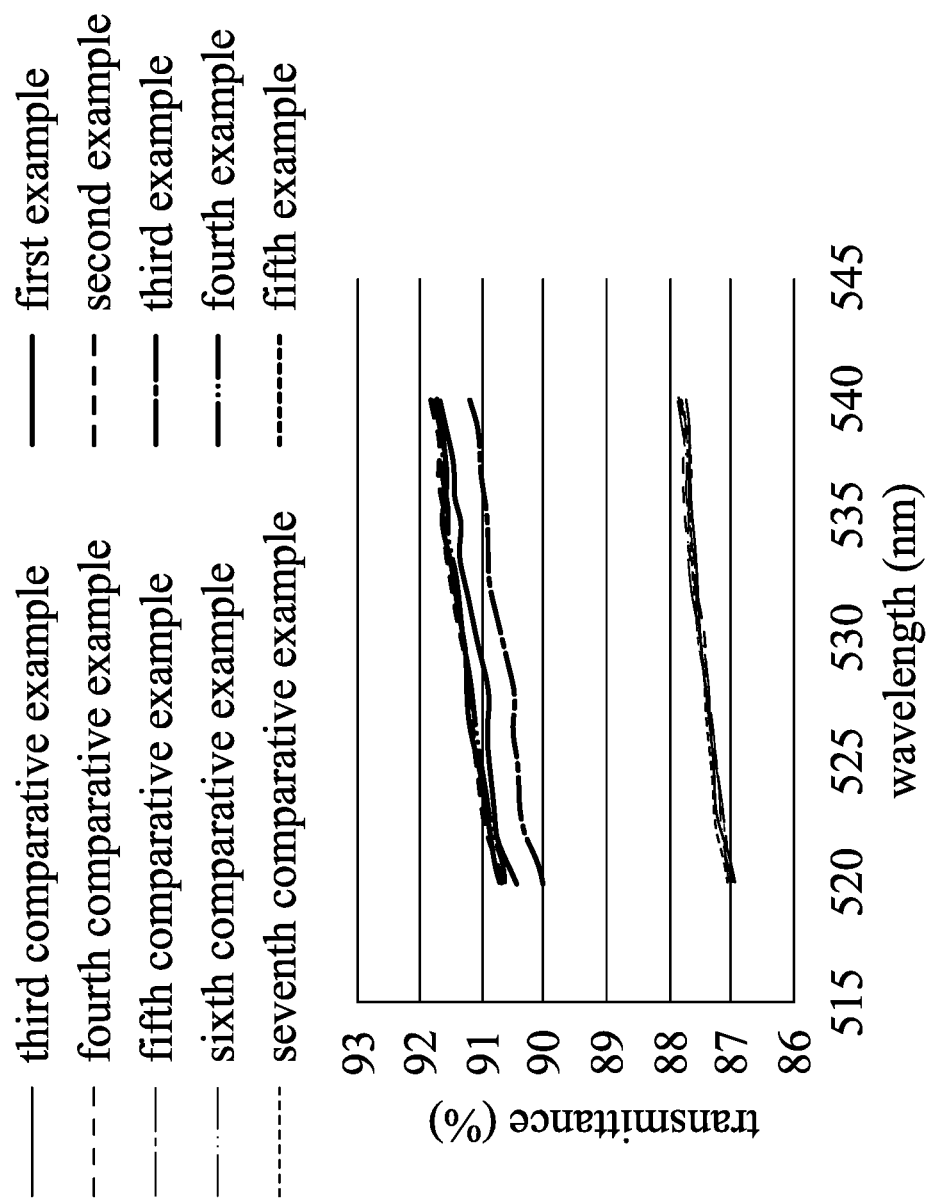
FIG. 2D is a curve diagram of the transmittance corresponding to a wavelength range between 520 nm and 540 nm of the 1st example to the 5th example according to the 2nd embodiment in FIG. 2A and the 3rd comparative example to the 7th comparative example.

Table 9 lists a transmittance corresponding to a wavelength range between 400 nm and 700 nm of the 1st example to the 5th example according to the 2nd embodiment. Table 10 lists a transmittance corresponding to a wavelength range between 400 nm and 700 nm of the 3rd comparative example to the 7th comparative example. Table 11 lists an average transmittance corresponding to a wavelength range between 540 nm and 590 nm, a wavelength range between 520 nm and 540 nm and a wavelength range between 530 nm and 540 nm of the 1st example to the 5th example according to the 2nd embodiment and the 3rd comparative example to the 7th comparative example. FIG. 2B is a curve diagram of the transmittance corresponding to a wavelength range between 400 nm and 700 nm of the 1st example to the 5th example according to the 2nd embodiment in FIG. 2A and the 3rd comparative example to the 7th comparative example. FIG. 2C is a curve diagram of the transmittance corresponding to a wavelength range between 540 nm and 590 nm of the 1st example to the 5th example according to the 2nd embodiment in FIG. 2A and the 3rd comparative example to the 7th comparative example. FIG. 2D is a curve diagram of the transmittance corresponding to a wavelength range between 520 nm and 540 nm of the 1st example to the 5th example according to the 2nd embodiment in FIG. 2A and the 3rd comparative example to the 7th comparative example. According to the 1st example to the 5th example according to the 2nd embodiment and the 3rd comparative example to the 7th comparative example, a light of the imaging lens assembly corresponding to a wavelength range between 540 nm and 590 nm has an average transmittance, and the average transmittance is $T_{5459}$; a light of the imaging lens assembly corresponding to a wavelength range between 520 nm and 540 nm has an average transmittance, and the average transmittance is $T_{5254}$; a light of the imaging lens assembly corresponding to a wavelength range between 530 nm and 540 nm has an average transmittance, and the average transmittance is $T_{5354}$. It should be mentioned that all of the 1st example to the 5th example according to the 2nd embodiment and the 3rd comparative example to the 7th comparative example include eight lens elements, but all of the 3rd comparative example to the 7th comparative example exclude the nanostructure layer and the structure connection film.

TABLE 9

| wavelength (nm) | transmittance of the 1st example (%) | transmittance of the 2nd example (%) | transmittance of the 3rd example (%) | transmittance of the 4th example (%) | transmittance of the 5th example (%) |
| --- | --- | --- | --- | --- | --- |
| 700 | 26.399 | 28.435 | 29.265 | 28.348 | 26.804 |
| 699 | 25.946 | 27.969 | 28.756 | 27.865 | 26.327 |
| 698 | 25.727 | 27.736 | 28.453 | 27.562 | 26.025 |
| 697 | 25.724 | 27.711 | 28.412 | 27.509 | 25.988 |
| 696 | 25.93 | 27.921 | 28.66 | 27.732 | 26.219 |
| 695 | 26.382 | 28.39 | 29.111 | 28.201 | 26.627 |
| 694 | 27.043 | 29.03 | 29.731 | 28.847 | 27.19 |
| 693 | 27.816 | 29.82 | 30.54 | 29.627 | 27.963 |
| 692 | 28.759 | 30.774 | 31.545 | 30.612 | 28.943 |
| 691 | 29.916 | 31.952 | 32.738 | 31.805 | 30.122 |
| 690 | 31.206 | 33.261 | 34.029 | 33.102 | 31.397 |
| 689 | 32.579 | 34.651 | 35.395 | 34.466 | 32.785 |
| 688 | 34.09 | 36.186 | 36.823 | 35.946 | 34.298 |
| 687 | 35.719 | 37.833 | 38.43 | 37.551 | 35.895 |
| 686 | 37.421 | 39.547 | 40.173 | 39.289 | 37.561 |
| 685 | 39.215 | 41.345 | 41.997 | 41.096 | 39.336 |
| 684 | 41.073 | 43.177 | 43.858 | 42.967 | 41.182 |
| 683 | 42.969 | 45.039 | 45.784 | 44.884 | 43.049 |
| 682 | 44.881 | 46.927 | 47.728 | 46.791 | 44.94 |
| 681 | 46.768 | 48.792 | 49.609 | 48.647 | 46.804 |
| 680 | 48.68 | 50.627 | 51.416 | 50.498 | 48.663 |
| 679 | 50.553 | 52.449 | 53.152 | 52.267 | 50.491 |
| 678 | 52.34 | 54.227 | 54.836 | 53.994 | 52.282 |
| 677 | 54.145 | 55.987 | 56.501 | 55.76 | 54.078 |
| 676 | 55.921 | 57.711 | 58.171 | 57.507 | 55.811 |
| 675 | 57.576 | 59.346 | 59.74 | 59.117 | 57.463 |

TABLE 9-continued

| wavelength (nm) | transmittance of the 1st example (%) | transmittance of the 2nd example (%) | transmittance of the 3rd example (%) | transmittance of the 4th example (%) | transmittance of the 5th example (%) |
| --- | --- | --- | --- | --- | --- |
| 674 | 59.126 | 60.894 | 61.211 | 60.583 | 59.053 |
| 673 | 60.633 | 62.38 | 62.648 | 61.992 | 60.582 |
| 672 | 62.045 | 63.765 | 64.055 | 63.347 | 61.967 |
| 671 | 63.381 | 65.07 | 65.393 | 64.627 | 63.296 |
| 670 | 64.655 | 66.331 | 66.645 | 65.861 | 64.601 |
| 669 | 65.91 | 67.564 | 67.862 | 67.115 | 65.853 |
| 668 | 67.153 | 68.761 | 69.02 | 68.344 | 67.071 |
| 667 | 68.32 | 69.859 | 70.089 | 69.478 | 68.231 |
| 666 | 69.399 | 70.886 | 71.095 | 70.541 | 69.343 |
| 665 | 70.464 | 71.88 | 72.037 | 71.542 | 70.414 |
| 664 | 71.478 | 72.849 | 72.937 | 72.499 | 71.394 |
| 663 | 72.453 | 73.747 | 73.831 | 73.441 | 72.322 |
| 662 | 73.392 | 74.615 | 74.734 | 74.363 | 73.272 |
| 661 | 74.281 | 75.458 | 75.571 | 75.239 | 74.143 |
| 660 | 75.154 | 76.313 | 76.455 | 76.094 | 75.016 |
| 659 | 75.998 | 77.109 | 77.235 | 76.883 | 75.868 |
| 658 | 76.823 | 77.885 | 78.005 | 77.618 | 76.672 |
| 657 | 77.59 | 78.601 | 78.704 | 78.305 | 77.439 |
| 656 | 78.255 | 79.269 | 79.308 | 78.955 | 78.131 |
| 655 | 78.879 | 79.896 | 79.873 | 79.575 | 78.771 |
| 654 | 79.483 | 80.465 | 80.42 | 80.197 | 79.383 |
| 653 | 80.098 | 81.001 | 80.983 | 80.791 | 79.966 |
| 652 | 80.597 | 81.494 | 81.482 | 81.308 | 80.507 |
| 651 | 81.091 | 81.961 | 81.967 | 81.791 | 81.044 |
| 650 | 81.57 | 82.422 | 82.395 | 82.254 | 81.539 |
| 649 | 82.031 | 82.817 | 82.824 | 82.686 | 81.98 |
| 648 | 82.457 | 83.251 | 83.192 | 83.081 | 82.432 |
| 647 | 82.873 | 83.625 | 83.497 | 83.406 | 82.792 |
| 646 | 83.218 | 83.995 | 83.847 | 83.74 | 83.175 |
| 645 | 83.481 | 84.272 | 84.101 | 84.022 | 83.468 |
| 644 | 83.79 | 84.568 | 84.392 | 84.292 | 83.75 |
| 643 | 84.073 | 84.844 | 84.654 | 84.564 | 84.016 |
| 642 | 84.349 | 85.07 | 84.885 | 84.821 | 84.248 |
| 641 | 84.578 | 85.245 | 85.063 | 85.048 | 84.456 |
| 640 | 84.783 | 85.426 | 85.252 | 85.308 | 84.686 |
| 639 | 85.015 | 85.585 | 85.43 | 85.498 | 84.873 |
| 638 | 85.19 | 85.737 | 85.584 | 85.656 | 85.074 |
| 637 | 85.406 | 85.926 | 85.772 | 85.81 | 85.276 |
| 636 | 85.627 | 86.142 | 85.969 | 85.976 | 85.486 |
| 635 | 85.81 | 86.27 | 86.148 | 86.102 | 85.642 |
| 634 | 85.971 | 86.465 | 86.316 | 86.257 | 85.815 |
| 633 | 86.133 | 86.632 | 86.499 | 86.43 | 85.949 |
| 632 | 86.283 | 86.819 | 86.682 | 86.603 | 86.122 |
| 631 | 86.432 | 86.974 | 86.865 | 86.779 | 86.315 |
| 630 | 86.624 | 87.159 | 87.033 | 86.965 | 86.509 |
| 629 | 86.804 | 87.378 | 87.215 | 87.164 | 86.736 |
| 628 | 87.051 | 87.61 | 87.394 | 87.37 | 86.986 |
| 627 | 87.31 | 87.811 | 87.552 | 87.567 | 87.222 |
| 626 | 87.6 | 88.052 | 87.779 | 87.846 | 87.475 |
| 625 | 87.847 | 88.249 | 87.967 | 88.048 | 87.684 |
| 624 | 88.069 | 88.482 | 88.205 | 88.302 | 87.932 |
| 623 | 88.287 | 88.74 | 88.458 | 88.553 | 88.176 |
| 622 | 88.542 | 88.989 | 88.712 | 88.813 | 88.431 |
| 621 | 88.77 | 89.19 | 88.893 | 89.028 | 88.639 |
| 620 | 89.031 | 89.447 | 89.097 | 89.259 | 88.891 |
| 619 | 89.25 | 89.649 | 89.297 | 89.469 | 89.107 |
| 618 | 89.44 | 89.81 | 89.432 | 89.658 | 89.298 |
| 617 | 89.65 | 90.002 | 89.591 | 89.86 | 89.541 |
| 616 | 89.878 | 90.208 | 89.757 | 90.069 | 89.753 |
| 615 | 90.06 | 90.358 | 89.945 | 90.256 | 89.955 |
| 614 | 90.231 | 90.556 | 90.14 | 90.427 | 90.181 |
| 613 | 90.396 | 90.737 | 90.314 | 90.574 | 90.346 |
| 612 | 90.579 | 90.887 | 90.481 | 90.744 | 90.458 |
| 611 | 90.713 | 91.011 | 90.589 | 90.842 | 90.546 |
| 610 | 90.818 | 91.125 | 90.658 | 90.933 | 90.638 |
| 609 | 90.937 | 91.257 | 90.76 | 91.054 | 90.755 |
| 608 | 91.091 | 91.411 | 90.91 | 91.204 | 90.918 |
| 607 | 91.206 | 91.522 | 91.035 | 91.335 | 91.023 |
| 606 | 91.299 | 91.667 | 91.167 | 91.487 | 91.177 |
| 605 | 91.409 | 91.732 | 91.33 | 91.56 | 91.329 |
| 604 | 91.475 | 91.739 | 91.398 | 91.613 | 91.404 |
| 603 | 91.541 | 91.796 | 91.438 | 91.683 | 91.488 |
| 602 | 91.599 | 91.816 | 91.411 | 91.735 | 91.499 |
| 601 | 91.676 | 91.86 | 91.42 | 91.829 | 91.543 |
| 600 | 91.727 | 91.931 | 91.421 | 91.889 | 91.576 |
| 599 | 91.786 | 92.02 | 91.463 | 91.99 | 91.638 |

TABLE 9-continued

| wavelength (nm) | transmittance of the 1st example (%) | transmittance of the 2nd example (%) | transmittance of the 3rd example (%) | transmittance of the 4th example (%) | transmittance of the 5th example (%) |
|---|---|---|---|---|---|
| 598 | 91.867 | 92.066 | 91.529 | 92.073 | 91.695 |
| 597 | 91.957 | 92.15 | 91.611 | 92.128 | 91.763 |
| 596 | 92.009 | 92.183 | 91.678 | 92.164 | 91.86 |
| 595 | 92.058 | 92.164 | 91.697 | 92.163 | 91.919 |
| 594 | 92.113 | 92.197 | 91.764 | 92.184 | 92.005 |
| 593 | 92.207 | 92.246 | 91.824 | 92.212 | 92.039 |
| 592 | 92.242 | 92.316 | 91.84 | 92.286 | 92.089 |
| 591 | 92.311 | 92.376 | 91.945 | 92.356 | 92.15 |
| 590 | 92.325 | 92.428 | 91.975 | 92.413 | 92.164 |
| 589 | 92.345 | 92.521 | 92.037 | 92.469 | 92.208 |
| 588 | 92.392 | 92.56 | 92.046 | 92.513 | 92.193 |
| 587 | 92.442 | 92.593 | 92.071 | 92.528 | 92.239 |
| 586 | 92.475 | 92.614 | 92.062 | 92.547 | 92.226 |
| 585 | 92.542 | 92.628 | 92.085 | 92.59 | 92.281 |
| 584 | 92.593 | 92.633 | 92.106 | 92.6 | 92.343 |
| 583 | 92.588 | 92.624 | 92.091 | 92.584 | 92.359 |
| 582 | 92.538 | 92.583 | 92.095 | 92.564 | 92.378 |
| 581 | 92.501 | 92.532 | 92.102 | 92.525 | 92.358 |
| 580 | 92.444 | 92.541 | 92.115 | 92.551 | 92.345 |
| 579 | 92.453 | 92.605 | 92.133 | 92.577 | 92.342 |
| 578 | 92.458 | 92.66 | 92.119 | 92.578 | 92.374 |
| 577 | 92.511 | 92.698 | 92.149 | 92.586 | 92.4 |
| 576 | 92.548 | 92.742 | 92.163 | 92.631 | 92.449 |
| 575 | 92.602 | 92.755 | 92.172 | 92.635 | 92.497 |
| 574 | 92.653 | 92.762 | 92.227 | 92.674 | 92.529 |
| 573 | 92.64 | 92.737 | 92.215 | 92.636 | 92.55 |
| 572 | 92.639 | 92.733 | 92.218 | 92.638 | 92.514 |
| 571 | 92.641 | 92.688 | 92.193 | 92.632 | 92.466 |
| 570 | 92.634 | 92.676 | 92.187 | 92.629 | 92.461 |
| 569 | 92.621 | 92.713 | 92.133 | 92.656 | 92.459 |
| 568 | 92.617 | 92.714 | 92.092 | 92.656 | 92.474 |
| 567 | 92.629 | 92.709 | 92.09 | 92.646 | 92.504 |
| 566 | 92.623 | 92.699 | 92.087 | 92.642 | 92.48 |
| 565 | 92.678 | 92.7 | 92.106 | 92.659 | 92.466 |
| 564 | 92.68 | 92.676 | 92.095 | 92.643 | 92.477 |
| 563 | 92.593 | 92.613 | 92.082 | 92.572 | 92.456 |
| 562 | 92.552 | 92.595 | 92.091 | 92.537 | 92.482 |
| 561 | 92.515 | 92.556 | 92.056 | 92.502 | 92.46 |
| 560 | 92.47 | 92.516 | 92.067 | 92.475 | 92.401 |
| 559 | 92.421 | 92.476 | 92.014 | 92.464 | 92.349 |
| 558 | 92.447 | 92.485 | 92.016 | 92.499 | 92.353 |
| 557 | 92.463 | 92.487 | 91.987 | 92.528 | 92.338 |
| 556 | 92.457 | 92.426 | 91.942 | 92.484 | 92.285 |
| 555 | 92.407 | 92.384 | 91.841 | 92.432 | 92.232 |
| 554 | 92.366 | 92.329 | 91.765 | 92.37 | 92.193 |
| 553 | 92.305 | 92.298 | 91.705 | 92.312 | 92.176 |
| 552 | 92.222 | 92.256 | 91.675 | 92.241 | 92.126 |
| 551 | 92.214 | 92.281 | 91.666 | 92.213 | 92.111 |
| 550 | 92.193 | 92.262 | 91.619 | 92.174 | 92.055 |
| 549 | 92.124 | 92.194 | 91.558 | 92.117 | 91.963 |
| 548 | 92.127 | 92.154 | 91.559 | 92.13 | 91.969 |
| 547 | 92.129 | 92.12 | 91.55 | 92.165 | 91.979 |
| 546 | 92.133 | 92.113 | 91.525 | 92.137 | 91.941 |
| 545 | 92.078 | 92.073 | 91.47 | 92.115 | 91.883 |
| 544 | 92.06 | 92.032 | 91.462 | 92.081 | 91.88 |
| 543 | 92.007 | 92.006 | 91.434 | 92.049 | 91.86 |
| 542 | 91.931 | 91.941 | 91.388 | 91.938 | 91.799 |
| 541 | 91.833 | 91.88 | 91.292 | 91.836 | 91.752 |
| 540 | 91.735 | 91.815 | 91.198 | 91.756 | 91.695 |
| 539 | 91.674 | 91.754 | 91.092 | 91.687 | 91.601 |
| 538 | 91.655 | 91.68 | 91.04 | 91.65 | 91.514 |
| 537 | 91.642 | 91.661 | 91.031 | 91.635 | 91.46 |
| 536 | 91.621 | 91.63 | 90.991 | 91.626 | 91.44 |
| 535 | 91.586 | 91.567 | 90.932 | 91.554 | 91.361 |
| 534 | 91.54 | 91.573 | 90.93 | 91.524 | 91.367 |
| 533 | 91.469 | 91.51 | 90.896 | 91.458 | 91.326 |
| 532 | 91.426 | 91.455 | 90.836 | 91.388 | 91.271 |
| 531 | 91.376 | 91.406 | 90.77 | 91.352 | 91.193 |
| 530 | 91.303 | 91.298 | 90.677 | 91.29 | 91.097 |
| 529 | 91.258 | 91.265 | 90.598 | 91.268 | 91.014 |
| 528 | 91.215 | 91.196 | 90.523 | 91.19 | 90.936 |
| 527 | 91.189 | 91.161 | 90.504 | 91.137 | 90.907 |
| 526 | 91.153 | 91.143 | 90.497 | 91.085 | 90.928 |
| 525 | 91.096 | 91.101 | 90.46 | 91.029 | 90.902 |
| 524 | 91.05 | 91.066 | 90.426 | 90.959 | 90.88 |
| 523 | 90.969 | 91.022 | 90.396 | 90.877 | 90.824 |

TABLE 9-continued

| wavelength (nm) | transmittance of the 1st example (%) | transmittance of the 2nd example (%) | transmittance of the 3rd example (%) | transmittance of the 4th example (%) | transmittance of the 5th example (%) |
|---|---|---|---|---|---|
| 522 | 90.913 | 90.953 | 90.324 | 90.817 | 90.782 |
| 521 | 90.821 | 90.793 | 90.168 | 90.716 | 90.624 |
| 520 | 90.719 | 90.708 | 90.047 | 90.65 | 90.476 |
| 519 | 90.586 | 90.584 | 89.89 | 90.523 | 90.326 |
| 518 | 90.54 | 90.519 | 89.832 | 90.483 | 90.252 |
| 517 | 90.464 | 90.449 | 89.782 | 90.413 | 90.172 |
| 516 | 90.369 | 90.347 | 89.752 | 90.348 | 90.112 |
| 515 | 90.315 | 90.339 | 89.739 | 90.325 | 90.074 |
| 514 | 90.26 | 90.307 | 89.705 | 90.26 | 90.026 |
| 513 | 90.172 | 90.273 | 89.642 | 90.176 | 90 |
| 512 | 90.144 | 90.223 | 89.587 | 90.102 | 89.987 |
| 511 | 90.107 | 90.117 | 89.524 | 90.042 | 89.886 |
| 510 | 90.022 | 90.002 | 89.41 | 89.932 | 89.754 |
| 509 | 89.868 | 89.83 | 89.282 | 89.798 | 89.602 |
| 508 | 89.749 | 89.728 | 89.168 | 89.689 | 89.502 |
| 507 | 89.629 | 89.624 | 89.056 | 89.626 | 89.429 |
| 506 | 89.5 | 89.574 | 88.989 | 89.586 | 89.338 |
| 505 | 89.417 | 89.504 | 88.891 | 89.503 | 89.229 |
| 504 | 89.381 | 89.477 | 88.856 | 89.477 | 89.17 |
| 503 | 89.295 | 89.392 | 88.759 | 89.379 | 89.088 |
| 502 | 89.234 | 89.287 | 88.665 | 89.265 | 89.001 |
| 501 | 89.134 | 89.143 | 88.559 | 89.131 | 88.87 |
| 500 | 89.066 | 89.046 | 88.471 | 89.017 | 88.768 |
| 499 | 88.876 | 88.912 | 88.322 | 88.841 | 88.64 |
| 498 | 88.741 | 88.791 | 88.182 | 88.693 | 88.553 |
| 497 | 88.623 | 88.7 | 88.098 | 88.61 | 88.435 |
| 496 | 88.486 | 88.601 | 87.989 | 88.505 | 88.296 |
| 495 | 88.331 | 88.43 | 87.884 | 88.366 | 88.112 |
| 494 | 88.215 | 88.297 | 87.759 | 88.225 | 87.958 |
| 493 | 88.166 | 88.159 | 87.664 | 88.157 | 87.864 |
| 492 | 88.122 | 88.039 | 87.562 | 88.096 | 87.808 |
| 491 | 88.076 | 87.921 | 87.459 | 88.028 | 87.744 |
| 490 | 87.98 | 87.828 | 87.383 | 87.976 | 87.659 |
| 489 | 87.825 | 87.754 | 87.287 | 87.871 | 87.554 |
| 488 | 87.649 | 87.674 | 87.167 | 87.75 | 87.399 |
| 487 | 87.429 | 87.522 | 87.016 | 87.589 | 87.199 |
| 486 | 87.231 | 87.361 | 86.834 | 87.419 | 86.999 |
| 485 | 87.048 | 87.194 | 86.681 | 87.237 | 86.795 |
| 484 | 86.954 | 87.014 | 86.522 | 87.033 | 86.675 |
| 483 | 86.889 | 86.88 | 86.41 | 86.909 | 86.576 |
| 482 | 86.815 | 86.715 | 86.273 | 86.753 | 86.444 |
| 481 | 86.716 | 86.564 | 86.123 | 86.606 | 86.342 |
| 480 | 86.551 | 86.472 | 85.956 | 86.447 | 86.238 |
| 479 | 86.373 | 86.335 | 85.807 | 86.282 | 86.075 |
| 478 | 86.197 | 86.214 | 85.628 | 86.133 | 85.882 |
| 477 | 86.011 | 86.04 | 85.45 | 85.974 | 85.708 |
| 476 | 85.855 | 85.837 | 85.266 | 85.825 | 85.515 |
| 475 | 85.655 | 85.621 | 85.061 | 85.658 | 85.304 |
| 474 | 85.493 | 85.444 | 84.886 | 85.492 | 85.115 |
| 473 | 85.32 | 85.244 | 84.709 | 85.333 | 84.958 |
| 472 | 85.12 | 85.031 | 84.544 | 85.153 | 84.773 |
| 471 | 84.916 | 84.848 | 84.387 | 84.99 | 84.579 |
| 470 | 84.717 | 84.677 | 84.218 | 84.744 | 84.382 |
| 469 | 84.471 | 84.489 | 84.01 | 84.507 | 84.162 |
| 468 | 84.225 | 84.282 | 83.812 | 84.29 | 83.927 |
| 467 | 84.023 | 84.033 | 83.591 | 84.072 | 83.73 |
| 466 | 83.824 | 83.839 | 83.414 | 83.898 | 83.586 |
| 465 | 83.581 | 83.579 | 83.196 | 83.648 | 83.358 |
| 464 | 83.309 | 83.337 | 82.95 | 83.394 | 83.107 |
| 463 | 83.033 | 83.025 | 82.622 | 83.121 | 82.832 |
| 462 | 82.695 | 82.661 | 82.333 | 82.77 | 82.484 |
| 461 | 82.333 | 82.313 | 81.987 | 82.432 | 82.083 |
| 460 | 81.987 | 81.942 | 81.625 | 82.041 | 81.664 |
| 459 | 81.674 | 81.592 | 81.287 | 81.683 | 81.332 |
| 458 | 81.353 | 81.274 | 81.003 | 81.38 | 81.018 |
| 457 | 81.025 | 80.95 | 80.735 | 81.112 | 80.69 |
| 456 | 80.742 | 80.647 | 80.456 | 80.82 | 80.37 |
| 455 | 80.396 | 80.278 | 80.104 | 80.436 | 80.032 |
| 454 | 79.982 | 79.852 | 79.688 | 80.112 | 79.676 |
| 453 | 79.492 | 79.305 | 79.163 | 79.627 | 79.214 |
| 452 | 79.029 | 78.798 | 78.683 | 79.176 | 78.776 |
| 451 | 78.462 | 78.275 | 78.212 | 78.674 | 78.236 |
| 450 | 77.947 | 77.762 | 77.779 | 78.174 | 77.731 |
| 449 | 77.44 | 77.259 | 77.271 | 77.644 | 77.19 |
| 448 | 76.879 | 76.756 | 76.815 | 77.084 | 76.63 |
| 447 | 76.247 | 76.241 | 76.294 | 76.534 | 76.033 |

TABLE 9-continued

| wavelength (nm) | transmittance of the 1st example (%) | transmittance of the 2nd example (%) | transmittance of the 3rd example (%) | transmittance of the 4th example (%) | transmittance of the 5th example (%) |
|---|---|---|---|---|---|
| 446 | 75.616 | 75.653 | 75.696 | 75.932 | 75.409 |
| 445 | 74.96 | 74.959 | 75.056 | 75.329 | 74.794 |
| 444 | 74.254 | 74.18 | 74.389 | 74.63 | 74.096 |
| 443 | 73.481 | 73.352 | 73.73 | 73.884 | 73.339 |
| 442 | 72.658 | 72.43 | 73.032 | 73.089 | 72.501 |
| 441 | 71.773 | 71.492 | 72.312 | 72.211 | 71.594 |
| 440 | 70.818 | 70.51 | 71.518 | 71.352 | 70.67 |
| 439 | 69.804 | 69.488 | 70.681 | 70.376 | 69.704 |
| 438 | 68.766 | 68.434 | 69.76 | 69.351 | 68.69 |
| 437 | 67.592 | 67.313 | 68.82 | 68.278 | 67.574 |
| 436 | 66.379 | 66.087 | 67.811 | 67.185 | 66.421 |
| 435 | 65.111 | 64.82 | 66.728 | 65.99 | 65.2 |
| 434 | 63.795 | 63.46 | 65.574 | 64.731 | 63.951 |
| 433 | 62.28 | 61.949 | 64.288 | 63.324 | 62.535 |
| 432 | 60.704 | 60.391 | 62.93 | 61.821 | 61.089 |
| 431 | 59.027 | 58.706 | 61.483 | 60.298 | 59.533 |
| 430 | 57.264 | 56.943 | 59.943 | 58.611 | 57.828 |
| 429 | 55.381 | 55.084 | 58.289 | 56.831 | 56.028 |
| 428 | 53.473 | 53.176 | 56.643 | 54.992 | 54.217 |
| 427 | 51.493 | 51.252 | 54.993 | 53.137 | 52.331 |
| 426 | 49.411 | 49.22 | 53.216 | 51.197 | 50.406 |
| 425 | 47.197 | 47.122 | 51.311 | 49.152 | 48.387 |
| 424 | 44.91 | 44.935 | 49.318 | 47.04 | 46.324 |
| 423 | 42.584 | 42.736 | 47.296 | 44.91 | 44.233 |
| 422 | 40.233 | 40.519 | 45.246 | 42.801 | 42.097 |
| 421 | 37.921 | 38.38 | 43.224 | 40.723 | 39.961 |
| 420 | 35.73 | 36.329 | 41.285 | 38.736 | 37.953 |
| 419 | 33.633 | 34.395 | 39.469 | 36.867 | 36.03 |
| 418 | 31.715 | 32.631 | 37.794 | 35.153 | 34.293 |
| 417 | 30.037 | 31.06 | 36.308 | 33.657 | 32.765 |
| 416 | 28.508 | 29.666 | 34.943 | 32.281 | 31.396 |
| 415 | 27.135 | 28.397 | 33.654 | 31.029 | 30.144 |
| 414 | 25.981 | 27.299 | 32.498 | 29.939 | 29.074 |
| 413 | 25.001 | 26.409 | 31.559 | 29.035 | 28.18 |
| 412 | 24.239 | 25.688 | 30.78 | 28.298 | 27.447 |
| 411 | 23.567 | 25.116 | 30.075 | 27.652 | 26.779 |
| 410 | 23.038 | 24.623 | 29.548 | 27.119 | 26.239 |
| 409 | 22.571 | 24.206 | 29.064 | 26.665 | 25.771 |
| 408 | 22.225 | 23.83 | 28.657 | 26.299 | 25.383 |
| 407 | 21.874 | 23.476 | 28.238 | 25.921 | 24.988 |
| 406 | 21.556 | 23.116 | 27.801 | 25.519 | 24.594 |
| 405 | 21.19 | 22.677 | 27.334 | 25.098 | 24.212 |
| 404 | 20.786 | 22.211 | 26.807 | 24.644 | 23.767 |
| 403 | 20.358 | 21.707 | 26.294 | 24.14 | 23.29 |
| 402 | 19.861 | 21.186 | 25.723 | 23.583 | 22.754 |
| 401 | 19.337 | 20.658 | 25.143 | 22.941 | 22.159 |
| 400 | 18.782 | 20.045 | 24.508 | 22.285 | 21.516 |

TABLE 10

| wavelength (nm) | transmittance of the 3rd comparative example (%) | transmittance of the 4th comparative example (%) | transmittance of the 5th comparative example (%) | transmittance of the 6th comparative example (%) | transmittance of the 7th comparative example (%) |
|---|---|---|---|---|---|
| 700 | 16.329 | 18.782 | 15.549 | 16.429 | 14.513 |
| 699 | 15.963 | 18.379 | 15.207 | 16.068 | 14.192 |
| 698 | 15.75 | 18.153 | 15.003 | 15.901 | 13.997 |
| 697 | 15.722 | 18.144 | 14.988 | 15.891 | 13.947 |
| 696 | 15.89 | 18.337 | 15.146 | 16.034 | 14.094 |
| 695 | 16.237 | 18.7 | 15.447 | 16.376 | 14.386 |
| 694 | 16.692 | 19.201 | 15.852 | 16.868 | 14.786 |
| 693 | 17.285 | 19.855 | 16.389 | 17.458 | 15.319 |
| 692 | 18.048 | 20.703 | 17.088 | 18.202 | 16.008 |
| 691 | 18.952 | 21.696 | 17.949 | 19.115 | 16.837 |
| 690 | 19.943 | 22.778 | 18.915 | 20.157 | 17.76 |
| 689 | 21.061 | 23.98 | 20.017 | 21.28 | 18.806 |
| 688 | 22.341 | 25.343 | 21.275 | 22.54 | 19.997 |
| 687 | 23.757 | 26.818 | 22.668 | 23.962 | 21.33 |
| 686 | 25.282 | 28.388 | 24.157 | 25.502 | 22.771 |
| 685 | 26.935 | 30.067 | 25.747 | 27.147 | 24.334 |
| 684 | 28.699 | 31.861 | 27.466 | 28.892 | 26.031 |
| 683 | 30.508 | 33.732 | 29.246 | 30.731 | 27.804 |

TABLE 10-continued

| wavelength (nm) | transmittance of the 3rd comparative example (%) | transmittance of the 4th comparative example (%) | transmittance of the 5th comparative example (%) | transmittance of the 6th comparative example (%) | transmittance of the 7th comparative example (%) |
|---|---|---|---|---|---|
| 682 | 32.349 | 35.642 | 31.07 | 32.611 | 29.624 |
| 681 | 34.223 | 37.551 | 32.913 | 34.499 | 31.487 |
| 680 | 36.13 | 39.477 | 34.81 | 36.391 | 33.375 |
| 679 | 38.046 | 41.375 | 36.707 | 38.305 | 35.292 |
| 678 | 39.935 | 43.24 | 38.604 | 40.203 | 37.209 |
| 677 | 41.837 | 45.085 | 40.523 | 42.095 | 39.136 |
| 676 | 43.708 | 46.896 | 42.406 | 43.97 | 41.033 |
| 675 | 45.53 | 48.632 | 44.228 | 45.776 | 42.874 |
| 674 | 47.267 | 50.354 | 45.993 | 47.514 | 44.633 |
| 673 | 48.931 | 52.005 | 47.697 | 49.183 | 46.346 |
| 672 | 50.539 | 53.579 | 49.324 | 50.797 | 47.994 |
| 671 | 52.086 | 55.062 | 50.841 | 52.326 | 49.566 |
| 670 | 53.621 | 56.514 | 52.391 | 53.798 | 51.102 |
| 669 | 55.099 | 57.918 | 53.91 | 55.233 | 52.642 |
| 668 | 56.52 | 59.251 | 55.368 | 56.628 | 54.104 |
| 667 | 57.852 | 60.483 | 56.702 | 57.939 | 55.513 |
| 666 | 59.117 | 61.673 | 58.015 | 59.162 | 56.847 |
| 665 | 60.339 | 62.843 | 59.262 | 60.365 | 58.141 |
| 664 | 61.451 | 63.932 | 60.443 | 61.534 | 59.359 |
| 663 | 62.537 | 64.963 | 61.577 | 62.648 | 60.549 |
| 662 | 63.621 | 65.964 | 62.696 | 63.734 | 61.706 |
| 661 | 64.705 | 66.934 | 63.78 | 64.784 | 62.821 |
| 660 | 65.796 | 67.894 | 64.866 | 65.832 | 63.948 |
| 659 | 66.789 | 68.792 | 65.919 | 66.813 | 64.999 |
| 658 | 67.747 | 69.68 | 66.925 | 67.778 | 66.035 |
| 657 | 68.61 | 70.547 | 67.79 | 68.654 | 66.989 |
| 656 | 69.44 | 71.318 | 68.6 | 69.494 | 67.869 |
| 655 | 70.218 | 72.082 | 69.411 | 70.28 | 68.729 |
| 654 | 70.964 | 72.784 | 70.213 | 70.99 | 69.517 |
| 653 | 71.709 | 73.459 | 70.955 | 71.708 | 70.28 |
| 652 | 72.376 | 74.045 | 71.641 | 72.347 | 70.937 |
| 651 | 73.011 | 74.637 | 72.31 | 72.994 | 71.59 |
| 650 | 73.579 | 75.144 | 72.908 | 73.562 | 72.193 |
| 649 | 74.11 | 75.619 | 73.476 | 74.085 | 72.776 |
| 648 | 74.595 | 76.052 | 74.003 | 74.588 | 73.334 |
| 647 | 75.021 | 76.463 | 74.45 | 75.034 | 73.825 |
| 646 | 75.462 | 76.849 | 74.85 | 75.459 | 74.307 |
| 645 | 75.835 | 77.151 | 75.23 | 75.845 | 74.705 |
| 644 | 76.21 | 77.47 | 75.626 | 76.201 | 75.075 |
| 643 | 76.553 | 77.81 | 75.989 | 76.525 | 75.424 |
| 642 | 76.845 | 78.108 | 76.268 | 76.849 | 75.743 |
| 641 | 77.122 | 78.377 | 76.567 | 77.118 | 76.052 |
| 640 | 77.418 | 78.639 | 76.876 | 77.375 | 76.352 |
| 639 | 77.688 | 78.865 | 77.155 | 77.629 | 76.601 |
| 638 | 77.913 | 79.06 | 77.374 | 77.858 | 76.817 |
| 637 | 78.125 | 79.293 | 77.615 | 78.102 | 77.093 |
| 636 | 78.348 | 79.501 | 77.83 | 78.353 | 77.347 |
| 635 | 78.525 | 79.651 | 78.029 | 78.578 | 77.546 |
| 634 | 78.695 | 79.828 | 78.261 | 78.818 | 77.796 |
| 633 | 78.916 | 80.047 | 78.548 | 79.002 | 78.097 |
| 632 | 79.159 | 80.268 | 78.82 | 79.227 | 78.374 |
| 631 | 79.404 | 80.479 | 79.092 | 79.483 | 78.64 |
| 630 | 79.678 | 80.68 | 79.369 | 79.748 | 78.89 |
| 629 | 79.992 | 80.889 | 79.664 | 80.03 | 79.144 |
| 628 | 80.255 | 81.166 | 79.911 | 80.333 | 79.411 |
| 627 | 80.528 | 81.419 | 80.234 | 80.621 | 79.703 |
| 626 | 80.849 | 81.725 | 80.57 | 80.977 | 80.064 |
| 625 | 81.153 | 81.987 | 80.88 | 81.262 | 80.358 |
| 624 | 81.458 | 82.256 | 81.177 | 81.571 | 80.721 |
| 623 | 81.757 | 82.567 | 81.489 | 81.845 | 81.123 |
| 622 | 82.1 | 82.916 | 81.842 | 82.119 | 81.469 |
| 621 | 82.413 | 83.198 | 82.142 | 82.357 | 81.778 |
| 620 | 82.72 | 83.488 | 82.454 | 82.704 | 82.094 |
| 619 | 83.036 | 83.711 | 82.769 | 82.976 | 82.424 |
| 618 | 83.324 | 83.919 | 83.075 | 83.226 | 82.706 |
| 617 | 83.628 | 84.169 | 83.397 | 83.518 | 83.031 |
| 616 | 83.888 | 84.388 | 83.709 | 83.844 | 83.355 |
| 615 | 84.142 | 84.575 | 83.936 | 84.122 | 83.632 |
| 614 | 84.354 | 84.8 | 84.14 | 84.373 | 83.905 |
| 613 | 84.544 | 85.019 | 84.369 | 84.602 | 84.18 |
| 612 | 84.69 | 85.252 | 84.569 | 84.811 | 84.418 |
| 611 | 84.867 | 85.457 | 84.748 | 84.963 | 84.568 |
| 610 | 85.025 | 85.605 | 84.941 | 85.1 | 84.749 |
| 609 | 85.192 | 85.724 | 85.131 | 85.221 | 84.914 |
| 608 | 85.405 | 85.875 | 85.35 | 85.397 | 85.057 |

TABLE 10-continued

| wavelength (nm) | transmittance of the 3rd comparative example (%) | transmittance of the 4th comparative example (%) | transmittance of the 5th comparative example (%) | transmittance of the 6th comparative example (%) | transmittance of the 7th comparative example (%) |
|---|---|---|---|---|---|
| 607 | 85.578 | 86.024 | 85.518 | 85.535 | 85.186 |
| 606 | 85.751 | 86.199 | 85.677 | 85.717 | 85.33 |
| 605 | 85.894 | 86.32 | 85.779 | 85.896 | 85.491 |
| 604 | 85.988 | 86.387 | 85.855 | 86.001 | 85.585 |
| 603 | 86.111 | 86.467 | 85.938 | 86.1 | 85.733 |
| 602 | 86.186 | 86.535 | 86.029 | 86.207 | 85.869 |
| 601 | 86.338 | 86.631 | 86.136 | 86.298 | 86.046 |
| 600 | 86.439 | 86.701 | 86.255 | 86.356 | 86.101 |
| 599 | 86.533 | 86.782 | 86.386 | 86.457 | 86.208 |
| 598 | 86.579 | 86.851 | 86.492 | 86.526 | 86.284 |
| 597 | 86.668 | 86.95 | 86.569 | 86.629 | 86.346 |
| 596 | 86.699 | 87.016 | 86.638 | 86.707 | 86.438 |
| 595 | 86.72 | 87.033 | 86.683 | 86.692 | 86.504 |
| 594 | 86.798 | 87.09 | 86.705 | 86.739 | 86.601 |
| 593 | 86.916 | 87.158 | 86.825 | 86.825 | 86.678 |
| 592 | 87.006 | 87.202 | 86.915 | 86.887 | 86.775 |
| 591 | 87.099 | 87.294 | 87.01 | 87.003 | 86.894 |
| 590 | 87.163 | 87.356 | 87.077 | 87.096 | 86.97 |
| 589 | 87.206 | 87.393 | 87.169 | 87.166 | 87.016 |
| 588 | 87.247 | 87.435 | 87.232 | 87.281 | 87.045 |
| 587 | 87.31 | 87.496 | 87.277 | 87.376 | 87.138 |
| 586 | 87.363 | 87.553 | 87.286 | 87.402 | 87.185 |
| 585 | 87.475 | 87.635 | 87.339 | 87.461 | 87.281 |
| 584 | 87.529 | 87.688 | 87.38 | 87.486 | 87.369 |
| 583 | 87.563 | 87.711 | 87.405 | 87.503 | 87.387 |
| 582 | 87.538 | 87.695 | 87.432 | 87.508 | 87.395 |
| 581 | 87.491 | 87.662 | 87.466 | 87.49 | 87.382 |
| 580 | 87.444 | 87.682 | 87.472 | 87.503 | 87.405 |
| 579 | 87.487 | 87.726 | 87.573 | 87.575 | 87.444 |
| 578 | 87.528 | 87.775 | 87.653 | 87.619 | 87.475 |
| 577 | 87.635 | 87.833 | 87.711 | 87.699 | 87.536 |
| 576 | 87.742 | 87.919 | 87.757 | 87.758 | 87.608 |
| 575 | 87.827 | 87.93 | 87.811 | 87.779 | 87.664 |
| 574 | 87.937 | 87.954 | 87.881 | 87.813 | 87.702 |
| 573 | 87.937 | 87.922 | 87.925 | 87.83 | 87.707 |
| 572 | 87.921 | 87.956 | 87.946 | 87.815 | 87.756 |
| 571 | 87.907 | 87.956 | 87.995 | 87.805 | 87.739 |
| 570 | 87.905 | 87.966 | 87.997 | 87.826 | 87.768 |
| 569 | 87.921 | 88.035 | 88 | 87.891 | 87.8 |
| 568 | 87.966 | 88.087 | 87.997 | 87.922 | 87.861 |
| 567 | 88.028 | 88.113 | 88.002 | 88.008 | 87.885 |
| 566 | 88.089 | 88.144 | 88.021 | 88.071 | 87.932 |
| 565 | 88.152 | 88.157 | 88.047 | 88.163 | 87.959 |
| 564 | 88.16 | 88.155 | 88.089 | 88.185 | 88.005 |
| 563 | 88.16 | 88.121 | 88.077 | 88.183 | 88.032 |
| 562 | 88.168 | 88.153 | 88.081 | 88.164 | 88.059 |
| 561 | 88.138 | 88.18 | 88.074 | 88.112 | 88.055 |
| 560 | 88.125 | 88.207 | 88.068 | 88.064 | 88.039 |
| 559 | 88.103 | 88.204 | 88.054 | 88.022 | 88.014 |
| 558 | 88.126 | 88.279 | 88.086 | 88.041 | 88.062 |
| 557 | 88.133 | 88.283 | 88.156 | 88.055 | 88.088 |
| 556 | 88.124 | 88.221 | 88.158 | 88.06 | 88.074 |
| 555 | 88.133 | 88.178 | 88.161 | 88.091 | 88.045 |
| 554 | 88.129 | 88.123 | 88.154 | 88.07 | 88.036 |
| 553 | 88.121 | 88.048 | 88.111 | 88.082 | 88.007 |
| 552 | 88.122 | 88.011 | 88.076 | 88.045 | 88.001 |
| 551 | 88.138 | 88.04 | 88.052 | 88.048 | 87.977 |
| 550 | 88.102 | 88.046 | 88.034 | 88.006 | 87.982 |
| 549 | 88.035 | 88.002 | 88.012 | 87.982 | 87.934 |
| 548 | 88.034 | 88.025 | 87.99 | 87.975 | 87.93 |
| 547 | 88.05 | 88.077 | 87.988 | 87.957 | 87.917 |
| 546 | 88.044 | 88.1 | 87.97 | 87.93 | 87.939 |
| 545 | 88.014 | 88.093 | 87.946 | 87.873 | 87.933 |
| 544 | 88.011 | 88.085 | 87.954 | 87.868 | 87.94 |
| 543 | 87.98 | 88.032 | 87.961 | 87.875 | 87.954 |
| 542 | 87.908 | 87.964 | 87.915 | 87.883 | 87.929 |
| 541 | 87.849 | 87.914 | 87.874 | 87.878 | 87.882 |
| 540 | 87.781 | 87.856 | 87.844 | 87.854 | 87.806 |
| 539 | 87.725 | 87.787 | 87.795 | 87.798 | 87.732 |
| 538 | 87.705 | 87.744 | 87.756 | 87.762 | 87.675 |
| 537 | 87.7 | 87.757 | 87.716 | 87.729 | 87.644 |
| 536 | 87.699 | 87.768 | 87.707 | 87.679 | 87.659 |
| 535 | 87.655 | 87.723 | 87.676 | 87.668 | 87.647 |
| 534 | 87.615 | 87.711 | 87.683 | 87.682 | 87.666 |
| 533 | 87.586 | 87.641 | 87.655 | 87.663 | 87.634 |

TABLE 10-continued

| wavelength (nm) | transmittance of the 3rd comparative example (%) | transmittance of the 4th comparative example (%) | transmittance of the 5th comparative example (%) | transmittance of the 6th comparative example (%) | transmittance of the 7th comparative example (%) |
|---|---|---|---|---|---|
| 532 | 87.571 | 87.594 | 87.604 | 87.64 | 87.597 |
| 531 | 87.548 | 87.562 | 87.586 | 87.578 | 87.564 |
| 530 | 87.504 | 87.477 | 87.52 | 87.48 | 87.488 |
| 529 | 87.462 | 87.46 | 87.463 | 87.419 | 87.465 |
| 528 | 87.431 | 87.426 | 87.4 | 87.371 | 87.432 |
| 527 | 87.397 | 87.413 | 87.361 | 87.358 | 87.414 |
| 526 | 87.371 | 87.376 | 87.316 | 87.333 | 87.376 |
| 525 | 87.322 | 87.316 | 87.286 | 87.267 | 87.341 |
| 524 | 87.292 | 87.262 | 87.254 | 87.226 | 87.326 |
| 523 | 87.207 | 87.189 | 87.217 | 87.197 | 87.282 |
| 522 | 87.172 | 87.152 | 87.203 | 87.17 | 87.243 |
| 521 | 87.079 | 87.086 | 87.103 | 87.096 | 87.142 |
| 520 | 86.971 | 87.053 | 87.046 | 87.033 | 87.071 |
| 519 | 86.85 | 86.952 | 86.92 | 86.946 | 86.939 |
| 518 | 86.791 | 86.909 | 86.835 | 86.901 | 86.883 |
| 517 | 86.718 | 86.846 | 86.763 | 86.832 | 86.805 |
| 516 | 86.686 | 86.729 | 86.716 | 86.76 | 86.724 |
| 515 | 86.664 | 86.684 | 86.652 | 86.729 | 86.711 |
| 514 | 86.641 | 86.63 | 86.614 | 86.664 | 86.665 |
| 513 | 86.567 | 86.555 | 86.585 | 86.598 | 86.601 |
| 512 | 86.528 | 86.51 | 86.573 | 86.543 | 86.556 |
| 511 | 86.48 | 86.434 | 86.528 | 86.468 | 86.488 |
| 510 | 86.38 | 86.347 | 86.447 | 86.356 | 86.41 |
| 509 | 86.218 | 86.219 | 86.341 | 86.224 | 86.31 |
| 508 | 86.071 | 86.127 | 86.202 | 86.141 | 86.227 |
| 507 | 85.933 | 86.054 | 86.044 | 86.026 | 86.132 |
| 506 | 85.819 | 85.989 | 85.916 | 85.931 | 86.043 |
| 505 | 85.736 | 85.907 | 85.82 | 85.826 | 85.911 |
| 504 | 85.692 | 85.835 | 85.763 | 85.759 | 85.865 |
| 503 | 85.612 | 85.738 | 85.69 | 85.666 | 85.758 |
| 502 | 85.579 | 85.644 | 85.666 | 85.584 | 85.674 |
| 501 | 85.5 | 85.52 | 85.552 | 85.467 | 85.556 |
| 500 | 85.455 | 85.422 | 85.479 | 85.385 | 85.464 |
| 499 | 85.309 | 85.299 | 85.329 | 85.22 | 85.297 |
| 498 | 85.173 | 85.204 | 85.15 | 85.091 | 85.139 |
| 497 | 85.044 | 85.104 | 84.996 | 84.979 | 85.008 |
| 496 | 84.88 | 85.018 | 84.87 | 84.853 | 84.87 |
| 495 | 84.738 | 84.893 | 84.792 | 84.691 | 84.753 |
| 494 | 84.591 | 84.737 | 84.708 | 84.565 | 84.672 |
| 493 | 84.451 | 84.641 | 84.655 | 84.441 | 84.598 |
| 492 | 84.354 | 84.565 | 84.578 | 84.36 | 84.551 |
| 491 | 84.291 | 84.489 | 84.5 | 84.284 | 84.508 |
| 490 | 84.201 | 84.409 | 84.402 | 84.212 | 84.456 |
| 489 | 84.07 | 84.297 | 84.266 | 84.105 | 84.361 |
| 488 | 83.93 | 84.182 | 84.112 | 84.006 | 84.252 |
| 487 | 83.685 | 83.999 | 83.896 | 83.84 | 84.051 |
| 486 | 83.488 | 83.826 | 83.739 | 83.696 | 83.862 |
| 485 | 83.302 | 83.657 | 83.568 | 83.472 | 83.67 |
| 484 | 83.179 | 83.485 | 83.398 | 83.296 | 83.47 |
| 483 | 83.09 | 83.331 | 83.26 | 83.17 | 83.362 |
| 482 | 82.989 | 83.229 | 83.136 | 83.087 | 83.231 |
| 481 | 82.883 | 83.136 | 83.015 | 82.917 | 83.113 |
| 480 | 82.731 | 82.98 | 82.849 | 82.735 | 82.96 |
| 479 | 82.544 | 82.824 | 82.658 | 82.55 | 82.795 |
| 478 | 82.355 | 82.624 | 82.448 | 82.371 | 82.597 |
| 477 | 82.179 | 82.433 | 82.273 | 82.205 | 82.386 |
| 476 | 81.999 | 82.248 | 82.076 | 82.034 | 82.172 |
| 475 | 81.817 | 82.064 | 81.855 | 81.813 | 81.984 |
| 474 | 81.667 | 81.863 | 81.679 | 81.623 | 81.832 |
| 473 | 81.464 | 81.668 | 81.513 | 81.455 | 81.68 |
| 472 | 81.265 | 81.545 | 81.373 | 81.336 | 81.523 |
| 471 | 81.058 | 81.386 | 81.209 | 81.144 | 81.347 |
| 470 | 80.898 | 81.193 | 81.024 | 80.941 | 81.135 |
| 469 | 80.728 | 80.945 | 80.814 | 80.727 | 80.935 |
| 468 | 80.553 | 80.728 | 80.628 | 80.55 | 80.703 |
| 467 | 80.378 | 80.542 | 80.426 | 80.341 | 80.492 |
| 466 | 80.16 | 80.361 | 80.25 | 80.151 | 80.302 |
| 465 | 79.973 | 80.195 | 79.995 | 79.931 | 80.101 |
| 464 | 79.747 | 79.946 | 79.707 | 79.689 | 79.837 |
| 463 | 79.476 | 79.713 | 79.446 | 79.406 | 79.55 |
| 462 | 79.149 | 79.464 | 79.145 | 79.11 | 79.177 |
| 461 | 78.806 | 79.184 | 78.803 | 78.783 | 78.83 |
| 460 | 78.46 | 78.848 | 78.474 | 78.413 | 78.446 |
| 459 | 78.117 | 78.505 | 78.132 | 78.094 | 78.138 |
| 458 | 77.836 | 78.232 | 77.831 | 77.891 | 77.872 |

TABLE 10-continued

| wavelength (nm) | transmittance of the 3rd comparative example (%) | transmittance of the 4th comparative example (%) | transmittance of the 5th comparative example (%) | transmittance of the 6th comparative example (%) | transmittance of the 7th comparative example (%) |
|---|---|---|---|---|---|
| 457 | 77.54 | 77.936 | 77.534 | 77.675 | 77.608 |
| 456 | 77.319 | 77.66 | 77.262 | 77.473 | 77.378 |
| 455 | 77.078 | 77.311 | 76.947 | 77.216 | 77.074 |
| 454 | 76.775 | 77.015 | 76.66 | 76.874 | 76.756 |
| 453 | 76.356 | 76.623 | 76.186 | 76.436 | 76.338 |
| 452 | 75.898 | 76.236 | 75.764 | 75.969 | 75.95 |
| 451 | 75.412 | 75.825 | 75.296 | 75.465 | 75.475 |
| 450 | 74.927 | 75.412 | 74.833 | 75.022 | 75.01 |
| 449 | 74.475 | 74.95 | 74.327 | 74.543 | 74.558 |
| 448 | 74.03 | 74.511 | 73.832 | 74.091 | 74.061 |
| 447 | 73.565 | 74.062 | 73.31 | 73.62 | 73.572 |
| 446 | 73.107 | 73.544 | 72.779 | 73.113 | 73.034 |
| 445 | 72.573 | 73.02 | 72.213 | 72.569 | 72.522 |
| 444 | 71.987 | 72.451 | 71.605 | 71.992 | 71.943 |
| 443 | 71.33 | 71.862 | 70.966 | 71.312 | 71.324 |
| 442 | 70.603 | 71.2 | 70.26 | 70.609 | 70.648 |
| 441 | 69.888 | 70.457 | 69.473 | 69.867 | 69.924 |
| 440 | 69.146 | 69.706 | 68.707 | 69.058 | 69.217 |
| 439 | 68.325 | 68.885 | 67.816 | 68.194 | 68.433 |
| 438 | 67.475 | 67.985 | 66.844 | 67.261 | 67.61 |
| 437 | 66.528 | 66.947 | 65.772 | 66.238 | 66.685 |
| 436 | 65.547 | 65.905 | 64.663 | 65.17 | 65.735 |
| 435 | 64.467 | 64.766 | 63.489 | 63.987 | 64.69 |
| 434 | 63.299 | 63.569 | 62.288 | 62.785 | 63.587 |
| 433 | 61.97 | 62.267 | 60.929 | 61.483 | 62.341 |
| 432 | 60.584 | 60.807 | 59.506 | 60.044 | 60.985 |
| 431 | 59.123 | 59.265 | 57.958 | 58.483 | 59.593 |
| 430 | 57.534 | 57.608 | 56.219 | 56.817 | 58.063 |
| 429 | 55.803 | 55.837 | 54.344 | 54.996 | 56.368 |
| 428 | 53.962 | 53.963 | 52.37 | 53.081 | 54.577 |
| 427 | 52.096 | 52.011 | 50.319 | 51.088 | 52.723 |
| 426 | 50.15 | 49.949 | 48.22 | 49.023 | 50.803 |
| 425 | 48.078 | 47.794 | 46.056 | 46.886 | 48.74 |
| 424 | 45.939 | 45.578 | 43.815 | 44.644 | 46.597 |
| 423 | 43.753 | 43.289 | 41.535 | 42.361 | 44.399 |
| 422 | 41.601 | 41.032 | 39.243 | 40.051 | 42.18 |
| 421 | 39.417 | 38.786 | 36.94 | 37.735 | 39.944 |
| 420 | 37.3 | 36.646 | 34.717 | 35.485 | 37.835 |
| 419 | 35.264 | 34.595 | 32.548 | 33.4 | 35.84 |
| 418 | 33.363 | 32.705 | 30.608 | 31.472 | 33.95 |
| 417 | 31.665 | 30.946 | 28.889 | 29.751 | 32.261 |
| 416 | 30.127 | 29.338 | 27.326 | 28.215 | 30.738 |
| 415 | 28.704 | 27.863 | 25.92 | 26.821 | 29.287 |
| 414 | 27.431 | 26.549 | 24.661 | 25.549 | 28.004 |
| 413 | 26.324 | 25.421 | 23.564 | 24.404 | 26.858 |
| 412 | 25.38 | 24.487 | 22.651 | 23.44 | 25.897 |
| 411 | 24.522 | 23.603 | 21.814 | 22.596 | 24.992 |
| 410 | 23.743 | 22.808 | 21.041 | 21.807 | 24.188 |
| 409 | 23.005 | 22.044 | 20.33 | 21.057 | 23.43 |
| 408 | 22.303 | 21.365 | 19.677 | 20.34 | 22.67 |
| 407 | 21.56 | 20.63 | 18.991 | 19.635 | 21.878 |
| 406 | 20.776 | 19.868 | 18.265 | 18.895 | 21.065 |
| 405 | 19.95 | 19.032 | 17.501 | 18.066 | 20.225 |
| 404 | 19.061 | 18.194 | 16.702 | 17.21 | 19.331 |
| 403 | 18.181 | 17.345 | 15.883 | 16.335 | 18.417 |
| 402 | 17.261 | 16.426 | 15.03 | 15.46 | 17.481 |
| 401 | 16.31 | 15.505 | 14.185 | 14.551 | 16.49 |
| 400 | 15.332 | 14.541 | 13.282 | 13.619 | 15.481 |

TABLE 11

| | 1st example | 2nd example | 3rd example | 4th example | 5th example |
|---|---|---|---|---|---|
| $T_{5459}$ (%) | 92.40 | 92.47 | 91.92 | 92.43 | 92.26 |
| $T_{5254}$ (%) | 91.31 | 91.32 | 90.68 | 91.27 | 91.12 |
| $T_{5354}$ (%) | 91.55 | 91.58 | 90.94 | 91.54 | 91.39 |

TABLE 11-continued

|  | 3rd comparative example | 4th comparative example | 5th comparative example | 6th comparative example | 7th comparative example |
|---|---|---|---|---|---|
| $T_{5459}$ (%) | 87.86 | 87.94 | 87.84 | 87.83 | 87.75 |
| $T_{5254}$ (%) | 87.47 | 87.49 | 87.49 | 87.48 | 87.49 |
| $T_{5354}$ (%) | 87.64 | 87.69 | 87.69 | 87.68 | 87.65 |

When the imaging lens assembly 200 has a transmittance decay indicator, and the transmittance decay indicator is corresponding to a number of the lens elements of the imaging lens element assembly and an analog constant of a transmittance decay, wherein the transmittance decay indicator is Tdi; the number of the lens elements of the imaging lens element assembly is E; a light of the imaging lens assembly 200 corresponding to a wavelength range between 540 nm and 590 nm has an average transmittance, and the average transmittance is $T_{5459}$; a light of the imaging lens assembly 200 corresponding to a wavelength range between 520 nm and 540 nm has an average transmittance, and the average transmittance is $T_{5254}$; a simulated transmittance of the imaging lens assembly 200 is $T_{sim}$, and the simulated transmittance is corresponding to the light of the wavelength range between 540 nm and 590 nm; the refractive index of the first lens element (that is, the lens element 212) is n1, the refractive index of the second lens element (that is, the lens element 211) is n2, and a difference between the refractive index of the first lens element and the refractive index of the second lens element is Δn; a total number of the surfaces of the object-side surfaces and the image-side surfaces of the nanostructure layers 230 disposed on the lens elements is $N_{CS}$, the following conditions of the Table 12 are satisfied.

TABLE 12

| 2nd embodiment | | | |
|---|---|---|---|
| Tdi | 0.879 | $T_{5254}$ (%) | 91.14 |
| E | 8 | $T_{sim}$ (%) | 92.41 |
| $N_{CS}$ | 16 | n1 | 1.669 |
| $N_{CS}/2E$ | 1 | n2 | 1.545 |
| $T_{5459}$ (%) | 92.3 | Δn | 0.124 |

3rd Embodiment

Figure 3A:
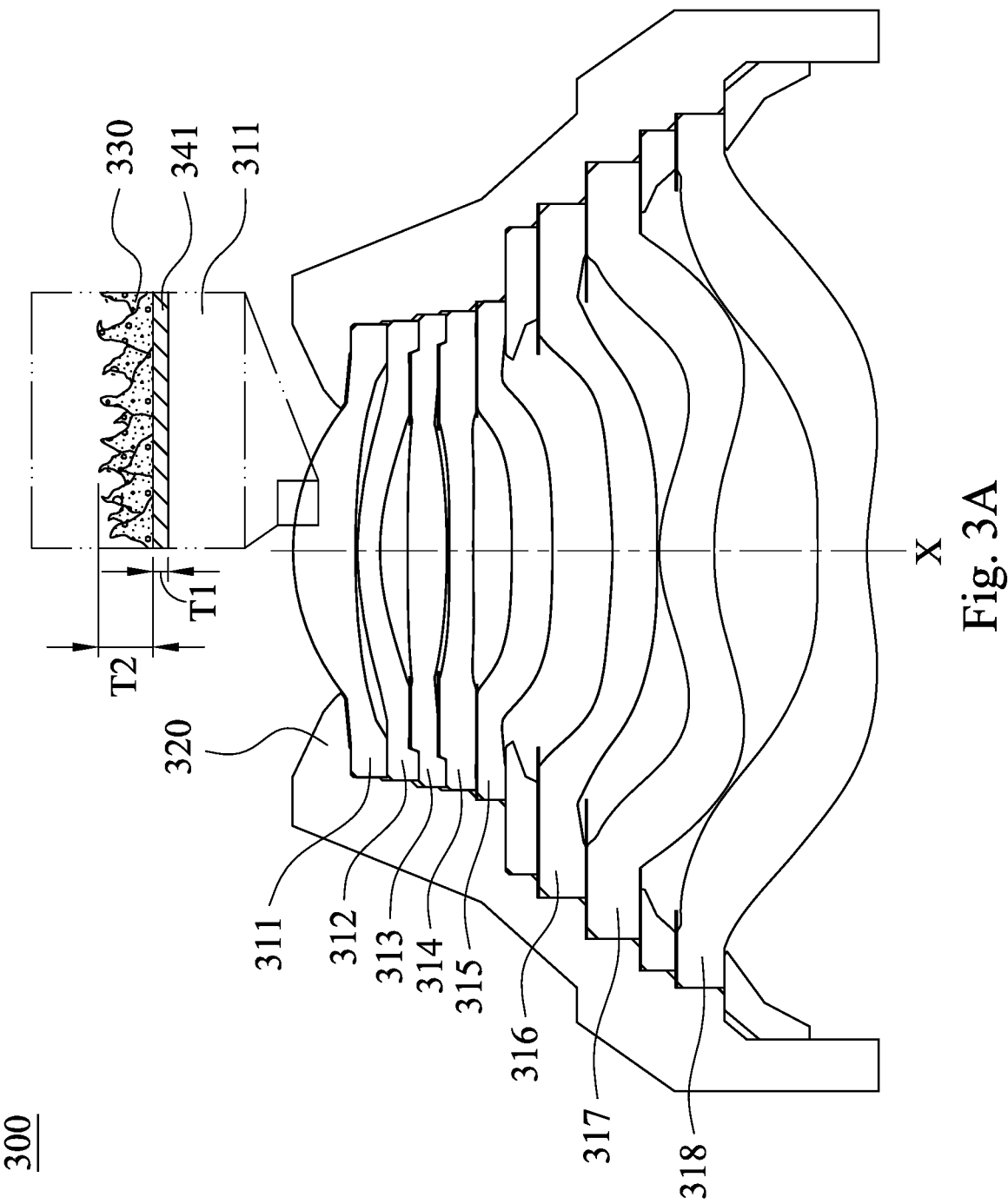
FIG. 3A is a schematic view of an imaging lens assembly according to the 3rd embodiment of the present disclosure.

FIG. 3A is a schematic view of an imaging lens assembly 300 according to the 3rd embodiment of the present disclosure. In FIG. 3A, the imaging lens assembly 300 includes an imaging lens element assembly (its numeral reference is omitted), an optical axis X passes through the imaging lens assembly, a visual angle of the imaging lens assembly 300 is 85 degrees, and the imaging lens assembly 300 is the main lens. The imaging lens element assembly includes a plurality of lens elements and a lens barrel 320.

In particular, the imaging lens element assembly, in order from an object side to an image side, includes lens elements 311, 312, 313, 314, 315, 316, 317, 318, and the lens elements 311, 312, 313, 314, 315, 316, 317, 318 are disposed in the lens barrel 320, wherein the optical features such as structures, surface shapes and so on of the lens elements can be disposed according to different imaging demand, and the optical features are not limited thereto.

Each of object-side surfaces and image-side surfaces of the lens elements 311, 312, 313, 315, 316, 318 includes at least one nanostructure layer and at least one structure connection film. Taking the object-side surface of the lens element 311 as the example, the nanostructure layer 330 is irregularly arranged, the nanostructure layer 330 includes an alumina crystal, and a structure dimension T2 of the nanostructure layer 330 is between 98 nm and 420 nm; the structure connection film (its reference numeral is omitted) is disposed between the object-side surface of the lens element 311 and the nanostructure layer 330, the structure connection film includes at least one silica film 341, the silica film 341 is directly contacted with a bottom of the nanostructure layer 330, and a film thickness T1 of the silica film 341 is between 20 nm and 150 nm.

The nanostructure layer 330 can be steadied via the structure connection film, so that the nanostructure layer 330 can be disposed on every lens element made of different materials, and the adhesion stability of the nanostructure layer 330 can be enhanced. In detail, the nanostructure layer 330 has pores so that the equivalent refractive index of the nanostructure layer 330 is gradually changed towards 1.00. Hence, the variety of the refractive index between the interfaces is reduced, and the possibility of light reflection is reduced.

Table 13 lists the refractive index of the lens elements 311, 312, 313, 314, 315, 316, 317, 318, and the measuring light of the refractive index of the lens elements 311, 312, 313, 314, 315, 316, 317, 318 is a light of wavelength of 587.6 nm (d-line).

TABLE 13 the refractive index of the lens elements according to the 3rd embodiment

| | lens element | | | |
|---|---|---|---|---|
| | 311 | 312 | 313 | 314 |
| refractive index | 1.545 | 1.669 | 1.544 | 1.669 |

| | lens element | | | |
|---|---|---|---|---|
| | 315 | 316 | 317 | 318 |
| refractive index | 1.544 | 1.566 | 1.544 | 1.534 |

According to the 3rd embodiment, the lens element 312 can be a first lens element, the lens element 311 can be a second lens element, and the refractive index of the first lens element is different from the refractive index of the second lens element.

Moreover, the lens elements 311, 312, 313, 314, 315, 316, 317, 318 of the imaging lens element assembly are separated into a first lens group and a second lens group, wherein the first lens group is closer to the object side than the second lens group to the object side, and a number of the lens elements of the first lens group is less than a number of the lens elements of the second lens group. According to the 3rd embodiment, the lens elements 311, 312 are the first lens group, and the lens elements 313, 314, 315, 316, 317, 318 are the second lens group, wherein the first lens group closest to the image side includes one of the lens elements of a high refractive index lens element (that is, the lens element 312), and an adjacent lens element of the high refractive index lens element at the object-side end is a low refractive index lens element (that is, the lens element 311); the second lens group includes the others lens elements of an image-side end of the first lens group (that is, the lens elements 313, 314, 315, 316, 317, 318), and the second lens group includes at least one of the lens elements being a high refractive index lens element (that is, the lens element 314). The possibility of light reflection formed between the interfaces can be reduced by disposing the nanostructure layer 330 on the high refractive index lens element.

In particular, the high refractive index lens element can be the lens element which the refractive index is greater than 1.6, or the lens element which the refractive index is higher than the average refractive index of the imaging lens assembly 300; the low refractive index lens element can be the lens element which the refractive index is smaller than 1.6, or the lens element which the refractive index is smaller than the average refractive index of the imaging lens assembly 300.

Figure 3B:
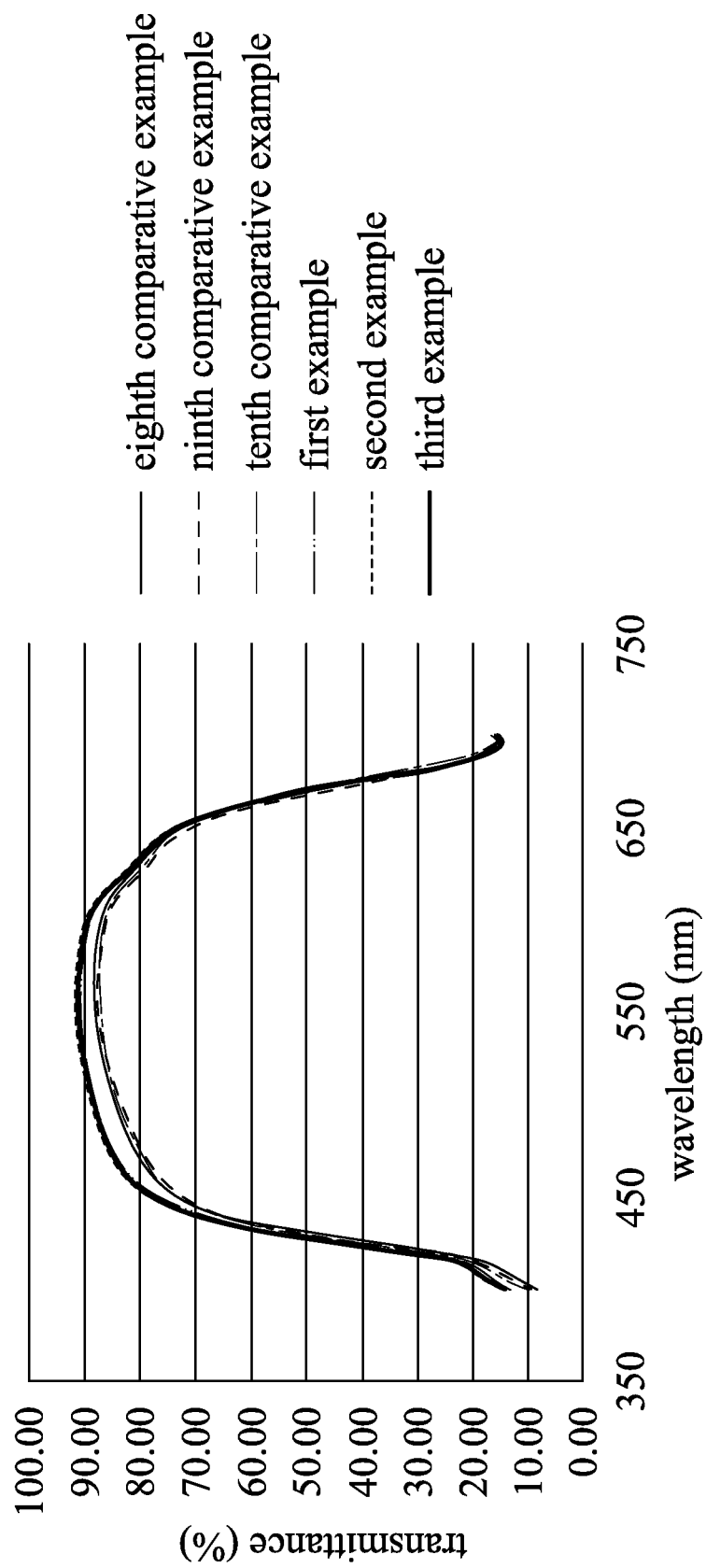
FIG. 3B is a curve diagram of the transmittance corresponding to a wavelength range between 400 nm and 700 nm of the 1st example to the 3rd example according to the 3rd embodiment in FIG. 3A and the 8th comparative example to the 10th comparative example.
Figure 3C:
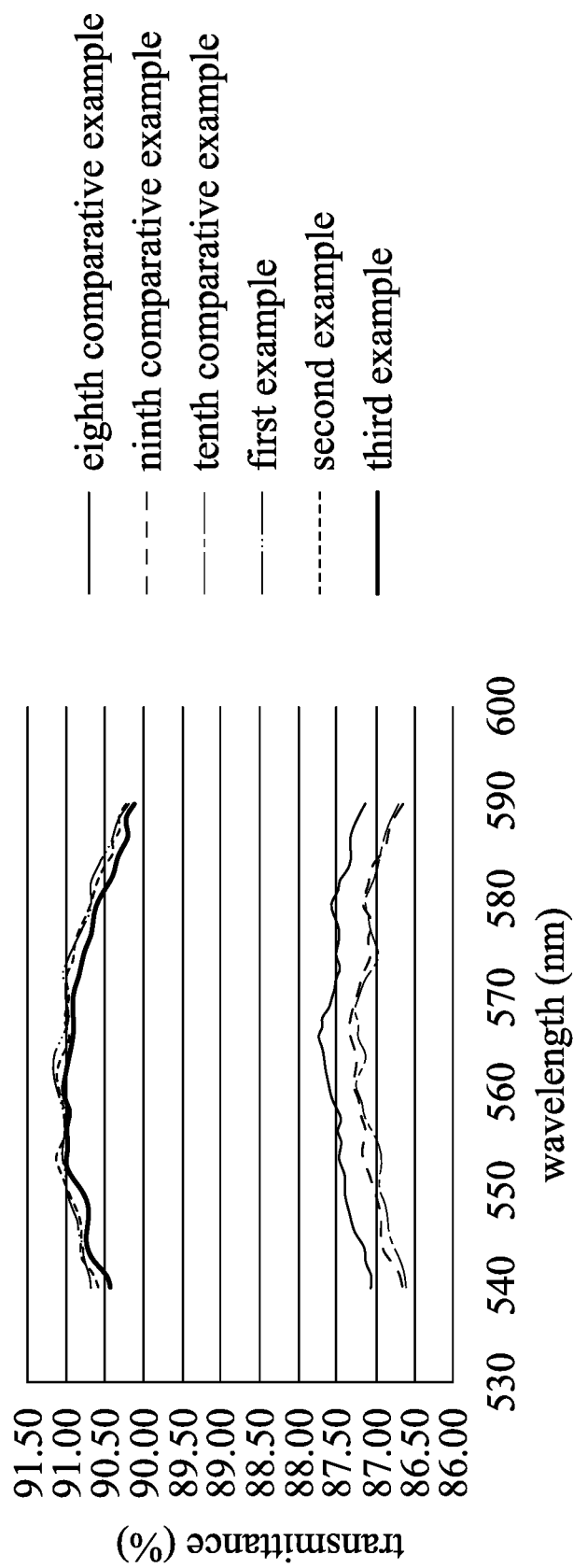
FIG. 3C is a curve diagram of the transmittance corresponding to a wavelength range between 540 nm and 590 nm of the 1st example to the 3rd example according to the 3rd embodiment in FIG. 3A and the 8th comparative example to the 10th comparative example.
Figure 3D:
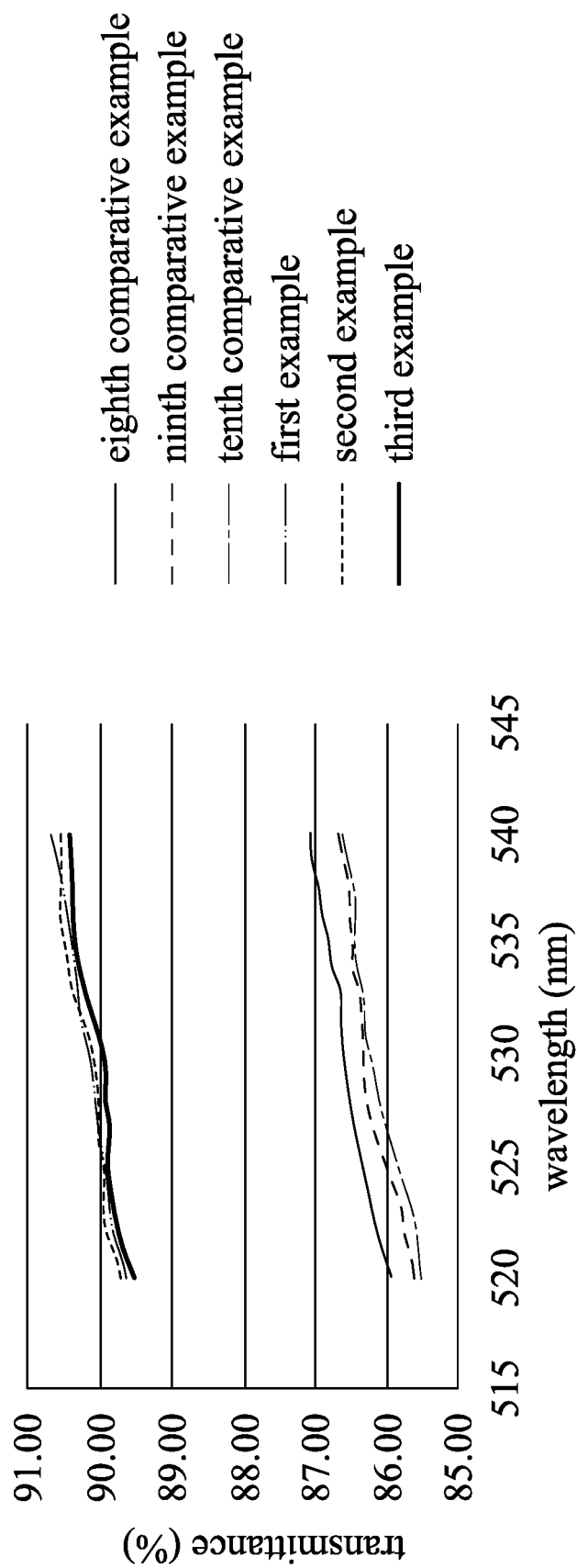
FIG. 3D is a curve diagram of the transmittance corresponding to a wavelength range between 520 nm and 540 nm of the 1st example to the 3rd example according to the 3rd embodiment in FIG. 3A and the 8th comparative example to the 10th comparative example.

Table 14 lists a transmittance corresponding to a wavelength range between 400 nm and 700 nm of the 1st example to the 3rd example according to the 3rd embodiment and the 8th comparative example to the 10th comparative example. Table 15 lists an average transmittance corresponding to a wavelength range between 540 nm and 590 nm, a wavelength range between 520 nm and 540 nm and a wavelength range between 530 nm and 540 nm of the 1st example to the 3rd example according to the 3rd embodiment and the 8th comparative example to the 10th comparative example. FIG. 3B is a curve diagram of the transmittance corresponding to a wavelength range between 400 nm and 700 nm of the 1st example to the 3rd example according to the 3rd embodiment in FIG. 3A and the 8th comparative example to the 10th comparative example. FIG. 3C is a curve diagram of the transmittance corresponding to a wavelength range between 540 nm and 590 nm of the 1st example to the 3rd example according to the 3rd embodiment in FIG. 3A and the 8th comparative example to the 10th comparative example. FIG. 3D is a curve diagram of the transmittance corresponding to a wavelength range between 520 nm and 540 nm of the 1st example to the 3rd example according to the 3rd embodiment in FIG. 3A and the 8th comparative example to the 10th comparative example. According to the 1st example to the 3rd example according to the 3rd embodiment and the 8th comparative example to the 10th comparative example, a light of the imaging lens assembly corresponding to a wavelength range between 540 nm and 590 nm has an average transmittance, and the average transmittance is $T_{5459}$; a light of the imaging lens assembly corresponding to a wavelength range between 520 nm and 540 nm has an average transmittance, and the average transmittance is $T_{5254}$; a light of the imaging lens assembly corresponding to a wavelength range between 530 nm and 540 nm has an average transmittance, and the average transmittance is $T_{5354}$. It should be mentioned that all of the 1st example to the 3rd example according to the 3rd embodiment and the 8th comparative example to the 10th comparative example include eight lens elements, but all of the 8th comparative example to the 10th comparative example exclude the nanostructure layer and the structure connection film.

TABLE 14

| wavelength (nm) | transmittance of the 8th comparative example (%) | transmittance of the 9th comparative example (%) | transmittance of the 10th comparative example (%) | transmittance of the 1st example (%) | transmittance of the 2nd example (%) | transmittance of the 3rd example (%) |
|---|---|---|---|---|---|---|
| 700 | 16.30 | 15.31 | 16.27 | 15.23 | 15.34 | 15.30 |
| 699 | 15.99 | 15.02 | 15.96 | 14.94 | 15.03 | 14.99 |
| 698 | 15.84 | 14.88 | 15.80 | 14.78 | 14.88 | 14.78 |
| 697 | 15.79 | 14.83 | 15.76 | 14.72 | 14.82 | 14.70 |
| 696 | 15.88 | 14.91 | 15.87 | 14.78 | 14.89 | 14.79 |
| 695 | 16.13 | 15.15 | 16.13 | 14.99 | 15.11 | 15.01 |
| 694 | 16.53 | 15.50 | 16.51 | 15.33 | 15.45 | 15.31 |
| 693 | 17.02 | 15.94 | 17.00 | 15.75 | 15.89 | 15.73 |
| 692 | 17.64 | 16.52 | 17.63 | 16.29 | 16.44 | 16.31 |
| 691 | 18.42 | 17.25 | 18.40 | 16.98 | 17.13 | 16.98 |
| 690 | 19.30 | 18.07 | 19.24 | 17.80 | 17.93 | 17.74 |
| 689 | 20.27 | 19.00 | 20.19 | 18.72 | 18.83 | 18.62 |
| 688 | 21.37 | 20.05 | 21.30 | 19.76 | 19.86 | 19.66 |
| 687 | 22.64 | 21.26 | 22.55 | 20.97 | 21.06 | 20.86 |
| 686 | 24.04 | 22.60 | 23.92 | 22.30 | 22.39 | 22.15 |
| 685 | 25.54 | 24.05 | 25.42 | 23.75 | 23.85 | 23.62 |
| 684 | 27.17 | 25.63 | 27.06 | 25.31 | 25.43 | 25.23 |
| 683 | 28.92 | 27.34 | 28.79 | 27.01 | 27.14 | 26.91 |
| 682 | 30.70 | 29.09 | 30.54 | 28.75 | 28.90 | 28.65 |
| 681 | 32.50 | 30.87 | 32.34 | 30.52 | 30.68 | 30.41 |
| 680 | 34.33 | 32.67 | 34.16 | 32.35 | 32.51 | 32.24 |
| 679 | 36.20 | 34.51 | 36.00 | 34.23 | 34.37 | 34.11 |
| 678 | 38.07 | 36.36 | 37.86 | 36.13 | 36.27 | 36.00 |
| 677 | 39.94 | 38.23 | 39.72 | 38.04 | 38.18 | 37.93 |
| 676 | 41.81 | 40.10 | 41.56 | 39.98 | 40.13 | 39.89 |
| 675 | 43.62 | 41.93 | 43.34 | 41.90 | 42.03 | 41.79 |
| 674 | 45.39 | 43.71 | 45.11 | 43.75 | 43.86 | 43.65 |
| 673 | 47.10 | 45.42 | 46.80 | 45.55 | 45.66 | 45.44 |
| 672 | 48.75 | 47.06 | 48.41 | 47.28 | 47.37 | 47.13 |
| 671 | 50.33 | 48.61 | 49.96 | 48.95 | 49.04 | 48.77 |
| 670 | 51.84 | 50.11 | 51.47 | 50.55 | 50.63 | 50.40 |

TABLE 14-continued

| wavelength (nm) | transmittance of the 8th comparative example (%) | transmittance of the 9th comparative example (%) | transmittance of the 10th comparative example (%) | transmittance of the 1st example (%) | transmittance of the 2nd example (%) | transmittance of the 3rd example (%) |
|---|---|---|---|---|---|---|
| 669 | 53.35 | 51.63 | 52.97 | 52.11 | 52.18 | 51.94 |
| 668 | 54.78 | 53.08 | 54.39 | 53.67 | 53.72 | 53.49 |
| 667 | 56.16 | 54.48 | 55.73 | 55.14 | 55.20 | 54.96 |
| 666 | 57.48 | 55.82 | 57.05 | 56.53 | 56.64 | 56.38 |
| 665 | 58.77 | 57.12 | 58.33 | 57.88 | 58.01 | 57.76 |
| 664 | 60.01 | 58.38 | 59.57 | 59.17 | 59.32 | 59.05 |
| 663 | 61.19 | 59.60 | 60.73 | 60.41 | 60.58 | 60.29 |
| 662 | 62.32 | 60.78 | 61.86 | 61.64 | 61.83 | 61.54 |
| 661 | 63.41 | 61.92 | 62.94 | 62.88 | 63.05 | 62.76 |
| 660 | 64.48 | 63.06 | 64.02 | 64.10 | 64.24 | 63.96 |
| 659 | 65.48 | 64.18 | 65.01 | 65.25 | 65.39 | 65.12 |
| 658 | 66.49 | 65.22 | 66.03 | 66.33 | 66.45 | 66.19 |
| 657 | 67.45 | 66.20 | 66.97 | 67.36 | 67.51 | 67.27 |
| 656 | 68.34 | 67.14 | 67.86 | 68.35 | 68.53 | 68.27 |
| 655 | 69.22 | 68.05 | 68.77 | 69.29 | 69.44 | 69.15 |
| 654 | 70.03 | 68.88 | 69.63 | 70.22 | 70.32 | 70.06 |
| 653 | 70.81 | 69.68 | 70.46 | 71.15 | 71.19 | 70.95 |
| 652 | 71.56 | 70.42 | 71.19 | 72.03 | 72.00 | 71.77 |
| 651 | 72.26 | 71.10 | 71.88 | 72.81 | 72.78 | 72.56 |
| 650 | 72.87 | 71.73 | 72.49 | 73.50 | 73.47 | 73.30 |
| 649 | 73.43 | 72.30 | 73.00 | 74.09 | 74.09 | 73.95 |
| 648 | 73.95 | 72.86 | 73.48 | 74.63 | 74.70 | 74.54 |
| 647 | 74.43 | 73.35 | 73.93 | 75.12 | 75.21 | 75.03 |
| 646 | 74.85 | 73.80 | 74.35 | 75.60 | 75.69 | 75.50 |
| 645 | 75.26 | 74.24 | 74.77 | 76.08 | 76.17 | 75.99 |
| 644 | 75.68 | 74.68 | 75.23 | 76.53 | 76.55 | 76.35 |
| 643 | 76.06 | 75.06 | 75.62 | 76.94 | 76.93 | 76.75 |
| 642 | 76.38 | 75.41 | 76.02 | 77.34 | 77.31 | 77.17 |
| 641 | 76.68 | 75.71 | 76.34 | 77.69 | 77.66 | 77.54 |
| 640 | 76.97 | 76.01 | 76.61 | 78.01 | 77.99 | 77.88 |
| 639 | 77.22 | 76.26 | 76.88 | 78.35 | 78.33 | 78.22 |
| 638 | 77.48 | 76.51 | 77.08 | 78.66 | 78.63 | 78.50 |
| 637 | 77.76 | 76.79 | 77.35 | 78.96 | 78.95 | 78.81 |
| 636 | 78.00 | 77.06 | 77.58 | 79.24 | 79.24 | 79.09 |
| 635 | 78.25 | 77.32 | 77.80 | 79.48 | 79.50 | 79.34 |
| 634 | 78.53 | 77.60 | 78.06 | 79.71 | 79.73 | 79.58 |
| 633 | 78.76 | 77.85 | 78.29 | 79.95 | 79.95 | 79.80 |
| 632 | 78.99 | 78.07 | 78.52 | 80.22 | 80.24 | 80.07 |
| 631 | 79.24 | 78.33 | 78.77 | 80.54 | 80.58 | 80.45 |
| 630 | 79.51 | 78.61 | 79.04 | 80.88 | 80.89 | 80.75 |
| 629 | 79.78 | 78.89 | 79.32 | 81.27 | 81.27 | 81.11 |
| 628 | 80.08 | 79.24 | 79.65 | 81.69 | 81.67 | 81.53 |
| 627 | 80.40 | 79.58 | 79.97 | 82.08 | 82.08 | 81.93 |
| 626 | 80.72 | 79.94 | 80.29 | 82.44 | 82.46 | 82.30 |
| 625 | 81.04 | 80.26 | 80.61 | 82.84 | 82.85 | 82.71 |
| 624 | 81.40 | 80.63 | 80.93 | 83.21 | 83.23 | 83.06 |
| 623 | 81.76 | 80.99 | 81.27 | 83.61 | 83.61 | 83.44 |
| 622 | 82.08 | 81.34 | 81.58 | 84.00 | 83.98 | 83.82 |
| 621 | 82.41 | 81.70 | 81.92 | 84.40 | 84.37 | 84.21 |
| 620 | 82.77 | 82.11 | 82.28 | 84.81 | 84.74 | 84.60 |
| 619 | 83.07 | 82.45 | 82.59 | 85.19 | 85.10 | 84.97 |
| 618 | 83.36 | 82.75 | 82.92 | 85.52 | 85.52 | 85.35 |
| 617 | 83.65 | 83.03 | 83.21 | 85.82 | 85.90 | 85.74 |
| 616 | 83.94 | 83.33 | 83.49 | 86.15 | 86.24 | 86.07 |
| 615 | 84.20 | 83.60 | 83.79 | 86.47 | 86.57 | 86.41 |
| 614 | 84.47 | 83.88 | 84.06 | 86.76 | 86.84 | 86.71 |
| 613 | 84.70 | 84.14 | 84.31 | 87.02 | 87.07 | 86.94 |
| 612 | 84.90 | 84.40 | 84.47 | 87.25 | 87.29 | 87.14 |
| 611 | 85.08 | 84.61 | 84.66 | 87.52 | 87.50 | 87.39 |
| 610 | 85.24 | 84.80 | 84.84 | 87.74 | 87.71 | 87.66 |
| 609 | 85.39 | 84.96 | 85.03 | 87.94 | 87.94 | 87.85 |
| 608 | 85.52 | 85.09 | 85.16 | 88.10 | 88.13 | 88.07 |
| 607 | 85.71 | 85.21 | 85.33 | 88.28 | 88.32 | 88.26 |
| 606 | 85.90 | 85.38 | 85.50 | 88.49 | 88.50 | 88.43 |
| 605 | 86.06 | 85.50 | 85.65 | 88.68 | 88.66 | 88.56 |
| 604 | 86.19 | 85.60 | 85.75 | 88.84 | 88.80 | 88.72 |
| 603 | 86.31 | 85.71 | 85.83 | 88.95 | 88.94 | 88.84 |
| 602 | 86.41 | 85.82 | 85.91 | 89.11 | 89.11 | 88.99 |
| 601 | 86.48 | 85.93 | 85.98 | 89.23 | 89.28 | 89.12 |
| 600 | 86.59 | 86.04 | 86.08 | 89.38 | 89.45 | 89.30 |
| 599 | 86.65 | 86.13 | 86.18 | 89.50 | 89.55 | 89.40 |
| 598 | 86.76 | 86.26 | 86.24 | 89.56 | 89.64 | 89.48 |
| 597 | 86.84 | 86.36 | 86.32 | 89.66 | 89.72 | 89.54 |
| 596 | 86.91 | 86.44 | 86.38 | 89.75 | 89.81 | 89.68 |

TABLE 14-continued

| wavelength (nm) | transmittance of the 8th comparative example (%) | transmittance of the 9th comparative example (%) | transmittance of the 10th comparative example (%) | transmittance of the 1st example (%) | transmittance of the 2nd example (%) | transmittance of the 3rd example (%) |
|---|---|---|---|---|---|---|
| 595 | 86.95 | 86.49 | 86.46 | 89.81 | 89.87 | 89.72 |
| 594 | 86.97 | 86.55 | 86.51 | 89.88 | 89.92 | 89.80 |
| 593 | 86.99 | 86.58 | 86.57 | 89.97 | 89.99 | 89.91 |
| 592 | 87.04 | 86.62 | 86.63 | 90.06 | 90.09 | 89.98 |
| 591 | 87.09 | 86.66 | 86.69 | 90.13 | 90.19 | 90.07 |
| 590 | 87.15 | 86.69 | 86.72 | 90.20 | 90.23 | 90.13 |
| 589 | 87.22 | 86.74 | 86.78 | 90.26 | 90.29 | 90.19 |
| 588 | 87.28 | 86.79 | 86.83 | 90.33 | 90.31 | 90.23 |
| 587 | 87.31 | 86.85 | 86.87 | 90.35 | 90.33 | 90.21 |
| 586 | 87.33 | 86.89 | 86.91 | 90.42 | 90.41 | 90.26 |
| 585 | 87.32 | 86.92 | 86.93 | 90.48 | 90.40 | 90.30 |
| 584 | 87.35 | 86.98 | 86.96 | 90.56 | 90.45 | 90.35 |
| 583 | 87.39 | 87.04 | 87.01 | 90.62 | 90.52 | 90.38 |
| 582 | 87.48 | 87.09 | 87.05 | 90.67 | 90.59 | 90.46 |
| 581 | 87.51 | 87.12 | 87.08 | 90.69 | 90.63 | 90.51 |
| 580 | 87.56 | 87.15 | 87.12 | 90.68 | 90.66 | 90.57 |
| 579 | 87.54 | 87.13 | 87.11 | 90.71 | 90.72 | 90.62 |
| 578 | 87.52 | 87.09 | 87.11 | 90.75 | 90.77 | 90.64 |
| 577 | 87.51 | 87.09 | 87.07 | 90.80 | 90.83 | 90.67 |
| 576 | 87.50 | 87.11 | 87.03 | 90.87 | 90.87 | 90.70 |
| 575 | 87.51 | 87.09 | 86.99 | 90.91 | 90.91 | 90.75 |
| 574 | 87.50 | 87.10 | 86.99 | 90.98 | 90.92 | 90.78 |
| 573 | 87.48 | 87.13 | 87.04 | 91.02 | 90.96 | 90.80 |
| 572 | 87.51 | 87.17 | 87.13 | 91.04 | 91.00 | 90.84 |
| 571 | 87.53 | 87.19 | 87.18 | 91.00 | 90.97 | 90.89 |
| 570 | 87.58 | 87.24 | 87.22 | 91.00 | 90.97 | 90.91 |
| 569 | 87.59 | 87.29 | 87.27 | 90.96 | 90.97 | 90.90 |
| 568 | 87.68 | 87.34 | 87.27 | 90.98 | 91.00 | 90.90 |
| 567 | 87.69 | 87.35 | 87.24 | 91.01 | 91.00 | 90.91 |
| 566 | 87.73 | 87.34 | 87.23 | 91.04 | 90.97 | 90.91 |
| 565 | 87.71 | 87.30 | 87.17 | 91.09 | 91.00 | 90.93 |
| 564 | 87.69 | 87.25 | 87.16 | 91.14 | 91.04 | 90.96 |
| 563 | 87.67 | 87.26 | 87.17 | 91.14 | 91.07 | 90.98 |
| 562 | 87.63 | 87.28 | 87.22 | 91.15 | 91.11 | 91.01 |
| 561 | 87.62 | 87.27 | 87.26 | 91.12 | 91.11 | 91.02 |
| 560 | 87.60 | 87.27 | 87.23 | 91.09 | 91.09 | 91.01 |
| 559 | 87.54 | 87.22 | 87.19 | 91.07 | 91.08 | 91.01 |
| 558 | 87.51 | 87.20 | 87.17 | 91.02 | 91.04 | 90.97 |
| 557 | 87.47 | 87.17 | 87.10 | 90.99 | 91.02 | 90.99 |
| 556 | 87.49 | 87.16 | 87.04 | 90.99 | 91.01 | 90.98 |
| 555 | 87.46 | 87.16 | 87.01 | 91.03 | 91.05 | 90.98 |
| 554 | 87.48 | 87.18 | 86.97 | 91.07 | 91.09 | 90.99 |
| 553 | 87.48 | 87.16 | 86.94 | 91.03 | 91.12 | 90.99 |
| 552 | 87.44 | 87.12 | 86.94 | 91.02 | 91.09 | 90.93 |
| 551 | 87.41 | 87.07 | 86.95 | 91.00 | 91.03 | 90.87 |
| 550 | 87.40 | 87.03 | 86.96 | 90.99 | 90.99 | 90.80 |
| 549 | 87.39 | 86.99 | 86.92 | 90.94 | 90.92 | 90.76 |
| 548 | 87.36 | 86.97 | 86.90 | 90.89 | 90.85 | 90.71 |
| 547 | 87.33 | 86.94 | 86.89 | 90.86 | 90.84 | 90.72 |
| 546 | 87.28 | 86.93 | 86.86 | 90.82 | 90.81 | 90.72 |
| 545 | 87.24 | 86.94 | 86.82 | 90.83 | 90.82 | 90.74 |
| 544 | 87.19 | 86.93 | 86.78 | 90.78 | 90.80 | 90.72 |
| 543 | 87.13 | 86.86 | 86.72 | 90.77 | 90.79 | 90.67 |
| 542 | 87.12 | 86.78 | 86.67 | 90.74 | 90.70 | 90.58 |
| 541 | 87.07 | 86.70 | 86.65 | 90.70 | 90.65 | 90.49 |
| 540 | 87.07 | 86.66 | 86.61 | 90.69 | 90.59 | 90.44 |
| 539 | 87.05 | 86.62 | 86.56 | 90.62 | 90.57 | 90.42 |
| 538 | 86.98 | 86.57 | 86.49 | 90.56 | 90.56 | 90.39 |
| 537 | 86.93 | 86.51 | 86.45 | 90.51 | 90.56 | 90.40 |
| 536 | 86.88 | 86.50 | 86.44 | 90.46 | 90.56 | 90.39 |
| 535 | 86.81 | 86.47 | 86.43 | 90.41 | 90.52 | 90.36 |
| 534 | 86.76 | 86.47 | 86.40 | 90.36 | 90.46 | 90.28 |
| 533 | 86.67 | 86.39 | 86.34 | 90.35 | 90.40 | 90.22 |
| 532 | 86.63 | 86.34 | 86.33 | 90.30 | 90.30 | 90.13 |
| 531 | 86.62 | 86.34 | 86.30 | 90.23 | 90.20 | 90.03 |
| 530 | 86.58 | 86.33 | 86.23 | 90.16 | 90.12 | 89.99 |
| 529 | 86.56 | 86.32 | 86.17 | 90.10 | 90.06 | 89.93 |
| 528 | 86.53 | 86.28 | 86.09 | 90.08 | 90.03 | 89.92 |
| 527 | 86.47 | 86.20 | 86.01 | 90.03 | 90.02 | 89.89 |
| 526 | 86.40 | 86.11 | 85.92 | 90.00 | 90.03 | 89.91 |
| 525 | 86.34 | 86.01 | 85.84 | 89.96 | 89.99 | 89.90 |
| 524 | 86.25 | 85.90 | 85.76 | 89.91 | 89.98 | 89.86 |
| 523 | 86.19 | 85.79 | 85.65 | 89.87 | 89.97 | 89.82 |
| 522 | 86.11 | 85.74 | 85.60 | 89.82 | 89.93 | 89.76 |

TABLE 14-continued

| wave-length (nm) | transmittance of the 8th comparative example (%) | transmittance of the 9th comparative example (%) | transmittance of the 10th comparative example (%) | transmittance of the 1st example (%) | transmittance of the 2nd example (%) | transmittance of the 3rd example (%) |
|---|---|---|---|---|---|---|
| 521 | 86.03 | 85.67 | 85.56 | 89.73 | 89.81 | 89.65 |
| 520 | 85.95 | 85.62 | 85.51 | 89.66 | 89.73 | 89.53 |
| 519 | 85.82 | 85.50 | 85.43 | 89.61 | 89.66 | 89.45 |
| 518 | 85.74 | 85.43 | 85.39 | 89.56 | 89.57 | 89.38 |
| 517 | 85.64 | 85.32 | 85.30 | 89.51 | 89.51 | 89.33 |
| 516 | 85.54 | 85.19 | 85.17 | 89.46 | 89.48 | 89.31 |
| 515 | 85.47 | 85.11 | 85.08 | 89.36 | 89.37 | 89.25 |
| 514 | 85.40 | 85.00 | 84.98 | 89.29 | 89.27 | 89.19 |
| 513 | 85.31 | 84.91 | 84.89 | 89.20 | 89.17 | 89.08 |
| 512 | 85.23 | 84.83 | 84.77 | 89.10 | 89.09 | 89.00 |
| 511 | 85.14 | 84.75 | 84.71 | 89.00 | 88.95 | 88.91 |
| 510 | 85.08 | 84.68 | 84.69 | 88.90 | 88.85 | 88.84 |
| 509 | 85.02 | 84.59 | 84.60 | 88.80 | 88.80 | 88.76 |
| 508 | 84.92 | 84.53 | 84.50 | 88.74 | 88.76 | 88.73 |
| 507 | 84.82 | 84.43 | 84.38 | 88.67 | 88.67 | 88.65 |
| 506 | 84.71 | 84.32 | 84.25 | 88.63 | 88.57 | 88.56 |
| 505 | 84.61 | 84.21 | 84.15 | 88.60 | 88.51 | 88.50 |
| 504 | 84.52 | 84.12 | 84.07 | 88.52 | 88.42 | 88.40 |
| 503 | 84.38 | 83.96 | 83.95 | 88.45 | 88.34 | 88.31 |
| 502 | 84.27 | 83.84 | 83.83 | 88.33 | 88.26 | 88.22 |
| 501 | 84.16 | 83.70 | 83.75 | 88.18 | 88.17 | 88.10 |
| 500 | 84.01 | 83.55 | 83.62 | 88.06 | 88.07 | 88.01 |
| 499 | 83.87 | 83.43 | 83.51 | 87.92 | 87.97 | 87.90 |
| 498 | 83.74 | 83.30 | 83.38 | 87.83 | 87.88 | 87.80 |
| 497 | 83.58 | 83.14 | 83.21 | 87.78 | 87.79 | 87.74 |
| 496 | 83.48 | 83.01 | 83.13 | 87.73 | 87.67 | 87.66 |
| 495 | 83.34 | 82.87 | 82.99 | 87.66 | 87.57 | 87.59 |
| 494 | 83.23 | 82.75 | 82.87 | 87.55 | 87.47 | 87.49 |
| 493 | 83.06 | 82.56 | 82.71 | 87.44 | 87.37 | 87.37 |
| 492 | 82.92 | 82.38 | 82.56 | 87.31 | 87.23 | 87.22 |
| 491 | 82.77 | 82.27 | 82.43 | 87.16 | 87.15 | 87.09 |
| 490 | 82.64 | 82.18 | 82.34 | 87.03 | 87.08 | 86.95 |
| 489 | 82.47 | 82.05 | 82.22 | 86.94 | 87.01 | 86.85 |
| 488 | 82.36 | 81.97 | 82.09 | 86.83 | 86.92 | 86.75 |
| 487 | 82.25 | 81.84 | 81.96 | 86.73 | 86.79 | 86.61 |
| 486 | 82.09 | 81.66 | 81.73 | 86.61 | 86.64 | 86.50 |
| 485 | 81.95 | 81.51 | 81.53 | 86.41 | 86.45 | 86.34 |
| 484 | 81.75 | 81.31 | 81.35 | 86.26 | 86.26 | 86.22 |
| 483 | 81.55 | 81.11 | 81.16 | 86.09 | 86.09 | 86.10 |
| 482 | 81.36 | 80.94 | 81.03 | 85.93 | 85.93 | 85.95 |
| 481 | 81.17 | 80.79 | 80.87 | 85.78 | 85.79 | 85.85 |
| 480 | 81.00 | 80.65 | 80.70 | 85.64 | 85.68 | 85.72 |
| 479 | 80.81 | 80.47 | 80.52 | 85.51 | 85.58 | 85.57 |
| 478 | 80.69 | 80.29 | 80.36 | 85.38 | 85.44 | 85.38 |
| 477 | 80.57 | 80.13 | 80.16 | 85.20 | 85.30 | 85.22 |
| 476 | 80.45 | 79.98 | 79.99 | 85.05 | 85.13 | 85.05 |
| 475 | 80.27 | 79.77 | 79.80 | 84.90 | 84.95 | 84.90 |
| 474 | 80.08 | 79.58 | 79.63 | 84.73 | 84.79 | 84.76 |
| 473 | 79.85 | 79.38 | 79.47 | 84.61 | 84.62 | 84.62 |
| 472 | 79.58 | 79.14 | 79.25 | 84.45 | 84.46 | 84.48 |
| 471 | 79.40 | 78.93 | 79.05 | 84.23 | 84.28 | 84.29 |
| 470 | 79.18 | 78.71 | 78.88 | 84.02 | 84.07 | 84.09 |
| 469 | 78.93 | 78.50 | 78.68 | 83.84 | 83.83 | 83.87 |
| 468 | 78.69 | 78.31 | 78.50 | 83.64 | 83.60 | 83.66 |
| 467 | 78.50 | 78.13 | 78.35 | 83.39 | 83.37 | 83.43 |
| 466 | 78.23 | 77.91 | 78.11 | 83.15 | 83.15 | 83.19 |
| 465 | 78.00 | 77.68 | 77.87 | 82.92 | 82.97 | 82.95 |
| 464 | 77.78 | 77.45 | 77.66 | 82.68 | 82.74 | 82.70 |
| 463 | 77.54 | 77.18 | 77.39 | 82.37 | 82.53 | 82.44 |
| 462 | 77.27 | 76.93 | 77.12 | 82.09 | 82.26 | 82.15 |
| 461 | 77.02 | 76.67 | 76.86 | 81.80 | 81.96 | 81.87 |
| 460 | 76.76 | 76.39 | 76.60 | 81.49 | 81.61 | 81.55 |
| 459 | 76.45 | 76.10 | 76.33 | 81.15 | 81.18 | 81.18 |
| 458 | 76.06 | 75.75 | 76.00 | 80.80 | 80.81 | 80.84 |
| 457 | 75.74 | 75.39 | 75.69 | 80.40 | 80.45 | 80.43 |
| 456 | 75.38 | 75.02 | 75.35 | 79.92 | 80.06 | 80.01 |
| 455 | 74.99 | 74.61 | 74.91 | 79.46 | 79.60 | 79.56 |
| 454 | 74.59 | 74.23 | 74.53 | 79.02 | 79.16 | 79.15 |
| 453 | 74.16 | 73.84 | 74.11 | 78.53 | 78.74 | 78.70 |
| 452 | 73.63 | 73.38 | 73.64 | 78.02 | 78.23 | 78.18 |
| 451 | 73.14 | 72.92 | 73.20 | 77.46 | 77.65 | 77.61 |
| 450 | 72.66 | 72.49 | 72.74 | 76.90 | 77.06 | 77.01 |
| 449 | 72.15 | 72.02 | 72.31 | 76.27 | 76.43 | 76.39 |
| 448 | 71.57 | 71.50 | 71.80 | 75.59 | 75.72 | 75.69 |

TABLE 14-continued

| wavelength (nm) | transmittance of the 8th comparative example (%) | transmittance of the 9th comparative example (%) | transmittance of the 10th comparative example (%) | transmittance of the 1st example (%) | transmittance of the 2nd example (%) | transmittance of the 3rd example (%) |
|---|---|---|---|---|---|---|
| 447 | 70.98 | 70.96 | 71.29 | 74.92 | 75.00 | 75.02 |
| 446 | 70.41 | 70.38 | 70.73 | 74.22 | 74.29 | 74.29 |
| 445 | 69.74 | 69.78 | 70.13 | 73.45 | 73.51 | 73.50 |
| 444 | 68.97 | 69.06 | 69.44 | 72.70 | 72.77 | 72.77 |
| 443 | 68.18 | 68.31 | 68.74 | 71.86 | 72.00 | 71.95 |
| 442 | 67.36 | 67.56 | 68.02 | 71.00 | 71.22 | 71.14 |
| 441 | 66.48 | 66.73 | 67.21 | 70.05 | 70.31 | 70.25 |
| 440 | 65.54 | 65.89 | 66.37 | 69.02 | 69.28 | 69.30 |
| 439 | 64.49 | 65.00 | 65.44 | 67.91 | 68.25 | 68.25 |
| 438 | 63.40 | 64.03 | 64.49 | 66.77 | 67.17 | 67.12 |
| 437 | 62.18 | 62.90 | 63.43 | 65.46 | 65.88 | 65.88 |
| 436 | 60.84 | 61.70 | 62.21 | 64.06 | 64.53 | 64.49 |
| 435 | 59.42 | 60.42 | 60.96 | 62.60 | 63.14 | 63.11 |
| 434 | 57.91 | 59.06 | 59.58 | 61.05 | 61.66 | 61.62 |
| 433 | 56.28 | 57.60 | 58.09 | 59.43 | 60.07 | 60.04 |
| 432 | 54.54 | 56.00 | 56.48 | 57.66 | 58.32 | 58.39 |
| 431 | 52.63 | 54.32 | 54.73 | 55.80 | 56.53 | 56.65 |
| 430 | 50.60 | 52.49 | 52.87 | 53.83 | 54.62 | 54.77 |
| 429 | 48.46 | 50.54 | 50.88 | 51.71 | 52.59 | 52.70 |
| 428 | 46.21 | 48.47 | 48.80 | 49.47 | 50.45 | 50.53 |
| 427 | 43.87 | 46.28 | 46.63 | 47.19 | 48.22 | 48.35 |
| 426 | 41.47 | 44.07 | 44.37 | 44.79 | 45.91 | 46.09 |
| 425 | 39.01 | 41.77 | 42.03 | 42.35 | 43.54 | 43.73 |
| 424 | 36.53 | 39.46 | 39.66 | 39.96 | 41.16 | 41.35 |
| 423 | 34.06 | 37.07 | 37.26 | 37.59 | 38.73 | 38.97 |
| 422 | 31.57 | 34.69 | 34.82 | 35.18 | 36.31 | 36.52 |
| 421 | 29.15 | 32.35 | 32.44 | 32.79 | 33.92 | 34.14 |
| 420 | 26.89 | 30.11 | 30.21 | 30.54 | 31.65 | 31.85 |
| 419 | 24.82 | 28.01 | 28.15 | 28.45 | 29.50 | 29.65 |
| 418 | 22.90 | 26.06 | 26.25 | 26.46 | 27.49 | 27.65 |
| 417 | 21.18 | 24.28 | 24.49 | 24.70 | 25.73 | 25.91 |
| 416 | 19.69 | 22.75 | 22.96 | 23.13 | 24.20 | 24.39 |
| 415 | 18.40 | 21.40 | 21.62 | 21.81 | 22.88 | 23.06 |
| 414 | 17.25 | 20.20 | 20.41 | 20.66 | 21.74 | 21.86 |
| 413 | 16.25 | 19.12 | 19.30 | 19.75 | 20.79 | 20.92 |
| 412 | 15.42 | 18.25 | 18.38 | 18.98 | 20.02 | 20.16 |
| 411 | 14.73 | 17.47 | 17.60 | 18.35 | 19.39 | 19.52 |
| 410 | 14.10 | 16.79 | 16.87 | 17.84 | 18.86 | 18.99 |
| 409 | 13.53 | 16.14 | 16.22 | 17.44 | 18.42 | 18.55 |
| 408 | 12.99 | 15.50 | 15.58 | 17.08 | 18.06 | 18.17 |
| 407 | 12.46 | 14.89 | 14.94 | 16.71 | 17.69 | 17.78 |
| 406 | 11.91 | 14.24 | 14.27 | 16.33 | 17.31 | 17.36 |
| 405 | 11.35 | 13.55 | 13.57 | 15.93 | 16.85 | 16.90 |
| 404 | 10.72 | 12.81 | 12.84 | 15.45 | 16.34 | 16.42 |
| 403 | 10.09 | 12.05 | 12.09 | 14.99 | 15.81 | 15.86 |
| 402 | 9.44 | 11.29 | 11.32 | 14.46 | 15.26 | 15.28 |
| 401 | 8.75 | 10.49 | 10.53 | 13.88 | 14.65 | 14.67 |
| 400 | 8.05 | 9.69 | 9.72 | 13.26 | 13.99 | 13.96 |

TABLE 15

|  | 1st example | 2nd example | 3rd example |
|---|---|---|---|
| $T_{5459}$ (%) | 90.85 | 90.83 | 90.72 |
| $T_{5254}$ (%) | 90.19 | 90.13 | 90.06 |
| $T_{5354}$ (%) | 90.42 | 90.44 | 90.28 |

|  | 8th comparative example | 9th comparative example | 10th comparative example |
|---|---|---|---|
| $T_{5459}$ (%) | 87.44 | 87.07 | 87.01 |
| $T_{5254}$ (%) | 86.40 | 86.18 | 88.15 |
| $T_{5354}$ (%) | 86.82 | 86.47 | 86.42 |

When the imaging lens assembly 300 has a transmittance decay indicator, and the transmittance decay indicator is corresponding to a number of the lens elements of the imaging lens element assembly and an analog constant of a transmittance decay, wherein the transmittance decay indicator is Tdi; the number of the lens elements of the imaging lens element assembly is E; a light of the imaging lens assembly 300 corresponding to a wavelength range between 540 nm and 590 nm has an average transmittance, and the average transmittance is $T_{5459}$; a light of the imaging lens assembly 300 corresponding to a wavelength range between 520 nm and 540 nm has an average transmittance, and the average transmittance is $T_{5254}$, a simulated transmittance of the imaging lens assembly 300 is $T_{sim}$ and the simulated transmittance is corresponding to the light of the wavelength range between 540 nm and 590 nm; the refractive index of the first lens element (that is, the lens element 312) is n1, the refractive index of the second lens element (that is, the lens element 311) is n2, and a difference between the refractive index of the first lens element and the refractive index of the second lens element is Δn; a total number of the surfaces of the object-side surfaces and the image-side surfaces of the nanostructure layers 330 disposed on the lens elements is $N_{CS}$, the following conditions of the Table 16 are satisfied.

TABLE 16

| 3rd embodiment | | | |
|---|---|---|---|
| Tdi | 0.879 | $T_{5254}$ (%) | 90.15 |
| E | 8 | $T_{sim}$ (%) | 91.29 |
| $N_{CS}$ | 12 | n1 | 1.669 |
| $N_{CS}/2E$ | 0.75 | n2 | 1.545 |
| $T_{5459}$ (%) | 90.8 | Δn | 0.124 |

4th Embodiment

Figure 4:
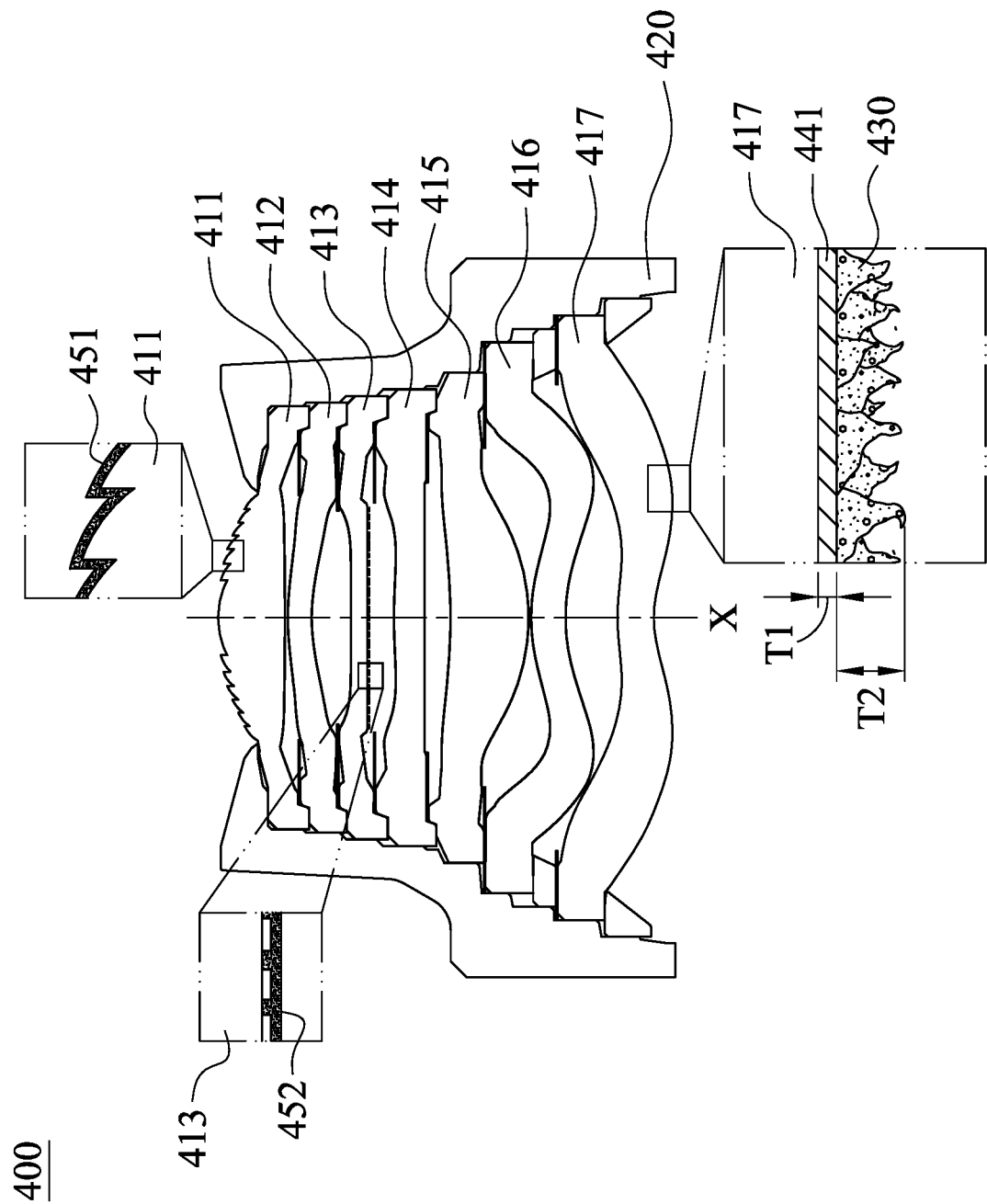
FIG. 4 is a schematic view of an imaging lens assembly according to the 4th embodiment of the present disclosure.

FIG. 4 is a schematic view of an imaging lens assembly 400 according to the 4th embodiment of the present disclosure. In FIG. 4, the imaging lens assembly 400 includes an imaging lens element assembly (its numeral reference is omitted), an optical axis X passes through the imaging lens assembly 400, a visual angle of the imaging lens assembly 400 is 79 degrees, and the imaging lens assembly 400 is the main lens. The imaging lens element assembly includes a plurality of lens elements and a lens barrel 420.

In particular, the imaging lens element assembly, in order from an object side to an image side, includes lens elements 411, 412, 413, 414, 415, 416, 417, and the lens elements 411, 412, 413, 414, 415, 416, 417 are disposed in the lens barrel 420, wherein the optical features such as structures, surface shapes and so on of the lens elements can be disposed according to different imaging demand, and the optical features are not limited thereto.

Each of object-side surfaces and image-side surfaces of the lens elements 411, 413, 415, 416, 417 includes at least one nanostructure layer and at least one structure connection film. Taking the image-side surface of the lens element 417 as the example, the nanostructure layer 430 is irregularly arranged, the nanostructure layer 430 includes an alumina crystal, and a structure dimension T2 of the nanostructure layer 430 is between 98 nm and 420 nm; the structure connection film (its reference numeral is omitted) is disposed between the image-side surface of the lens element 417 and the nanostructure layer 430, the structure connection film includes at least one silica film 441, the silica film 441 is directly contacted with a bottom of the nanostructure layer 430, and a film thickness T1 of the silica film 441 is between 20 nm and 150 nm.

The lens element 411 is a Fresnel lens element, and an anti-reflecting film 451 is disposed on an object-side surface of the lens element 411. Furthermore, the lens element 413 is a Meta lens element, and an anti-reflecting film 452 is disposed on an image-side surface of the lens element 413. In particular, the anti-reflecting films 451, 452 are composed of the nanostructure layer and the structure connection film.

The nanostructure layer 430 can be steadied via the structure connection film, so that the nanostructure layer 430 can be disposed on every lens element made of different materials, and the adhesion stability of the nanostructure layer 430 can be enhanced. In detail, the nanostructure layer 430 has pores so that the equivalent refractive index of the nanostructure layer 430 is gradually changed towards 1.00. Hence, the variety of the refractive index between the interfaces is reduced, and the possibility of light reflection is reduced.

Table 17 lists the refractive index of the lens elements 411, 412, 413, 414, 415, 416, 417, and the measuring light of the refractive index of the lens elements 411, 412, 413, 414, 415, 416, 417 is a light of wavelength of 587.6 nm (d-line).

TABLE 17 the refractive index of the lens elements according to the 4th embodiment

| | lens element | | | |
|---|---|---|---|---|
| | 411 | 412 | 413 | 414 |
| refractive index | 1.545 | 1.66 | 1.545 | 1.66 |
| | lens element | | | |
| | 415 | 416 | 417 | |
| refractive index | 1.545 | 1.545 | 1.545 | |

According to the 4th embodiment, the lens element 412 can be a first lens element, the lens element 411 can be a second lens element, and the refractive index of the first lens element is different from the refractive index of the second lens element.

Moreover, the lens elements 411, 412, 413, 414, 415, 416, 417 of the imaging lens element assembly are separated into a first lens group and a second lens group, wherein the first lens group is closer to the object side than the second lens group to the object side, and a number of the lens elements of the first lens group is less than a number of the lens elements of the second lens group. According to the 4th embodiment, the lens elements 411, 412 are the first lens group, and the lens elements 413, 414, 415, 416, 417 are the second lens group, wherein the first lens group closest to the image side includes one of the lens elements of a high refractive index lens element (that is, the lens element 412), and an adjacent lens element of the high refractive index lens element at the object-side end is a low refractive index lens element (that is, the lens element 411); the second lens group includes the others lens elements of an image-side end of the first lens group (that is, the lens elements 413, 414, 415, 416, 417), and the second lens group includes at least one of the lens elements being a high refractive index lens element (that is, the lens element 414). The possibility of light reflection formed between the interfaces can be reduced by disposing the nanostructure layer 430 on the high refractive index lens element.

In particular, the high refractive index lens element can be the lens element which the refractive index is greater than 1.6, or the lens element which the refractive index is higher than the average refractive index of the imaging lens assembly 400; the low refractive index lens element can be the lens element which the refractive index is smaller than 1.6, or the lens element which the refractive index is smaller than the average refractive index of the imaging lens assembly 400.

When the imaging lens assembly 400 has a transmittance decay indicator, and the transmittance decay indicator is corresponding to a number of the lens elements of the imaging lens element assembly and an analog constant of a transmittance decay, wherein the transmittance decay indicator is Tdi; the number of the lens elements of the imaging lens element assembly is E; a simulated transmittance of the imaging lens assembly 400 is $T_{sim}$, and the simulated transmittance is corresponding to the light of the wavelength range between 540 nm and 590 nm; the refractive index of the first lens element (that is, the lens element 412) is n1, the refractive index of the second lens element (that is, the lens element 411) is n2, and a difference between the refractive index of the first lens element and the refractive index of the second lens element is Δn; a total number of the surfaces of the object-side surfaces and the image-side surfaces of the nanostructure layers 430 disposed on the lens elements is $N_{CS}$, the following conditions of the Table 18 are satisfied.

TABLE 18

4th embodiment

| Tdi | 0.894 | $T_{sim}$ (%) | 92.16 |
|---|---|---|---|
| E | 7 | n1 | 1.66 |
| Ncs | 10 | n2 | 1.545 |
| $N_{CS}/2E$ | 0.71 | Δn | 0.115 |

5th Embodiment

Figure 5:
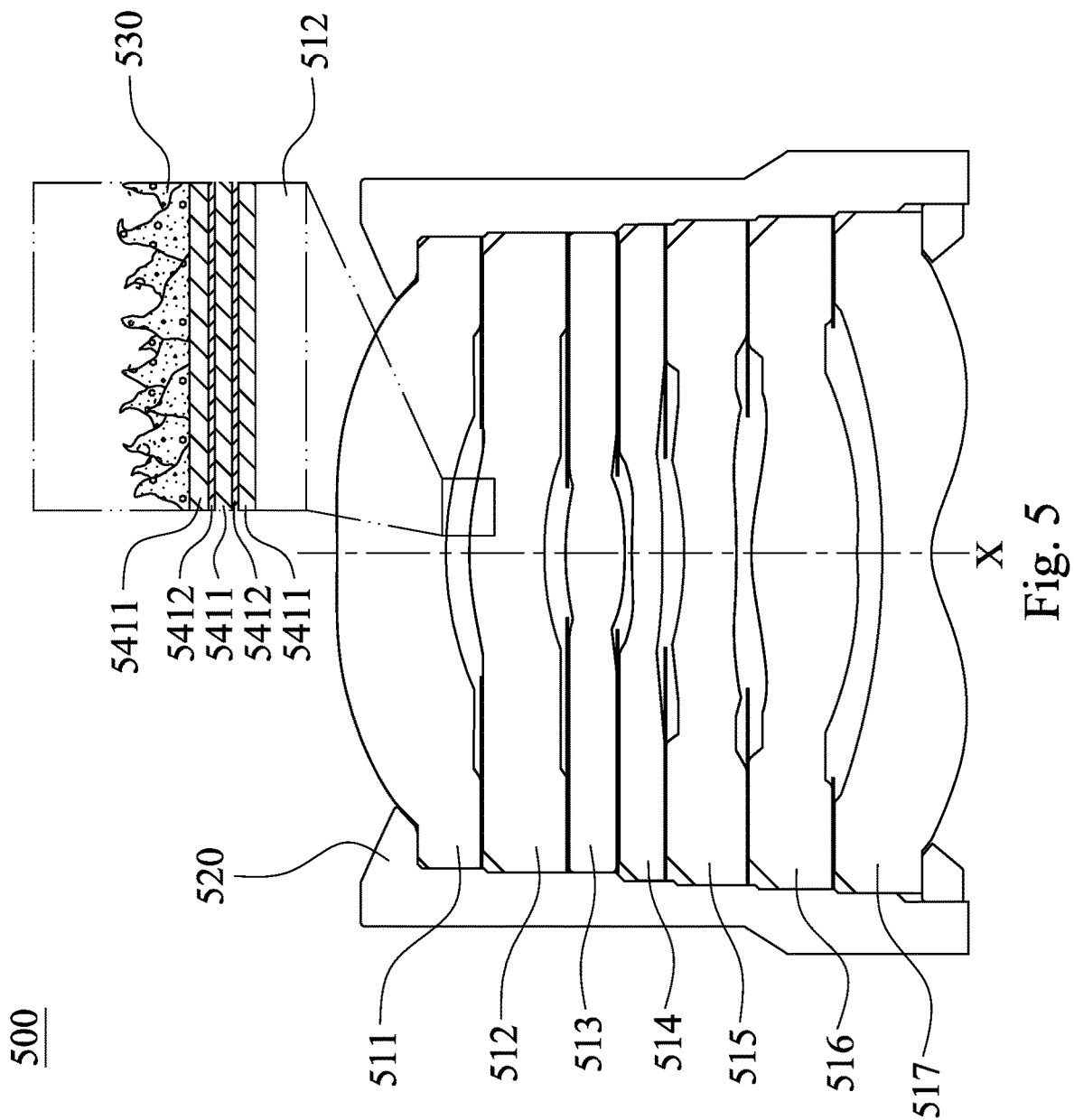
FIG. 5 is a schematic view of an imaging lens assembly according to the 5th embodiment of the present disclosure.

FIG. 5 is a schematic view of an imaging lens assembly 500 according to the 5th embodiment of the present disclosure. In FIG. 5, the imaging lens assembly 500 includes an imaging lens element assembly (its numeral reference is omitted), an optical axis X passes through the imaging lens assembly 500, a visual angle of the imaging lens assembly 500 is 128 degrees, and the imaging lens assembly 500 is the ultra-wide angle lens. The imaging lens element assembly includes a plurality of lens elements and a lens barrel 520.

In particular, the imaging lens element assembly, in order from an object side to an image side, includes lens elements 511, 512, 513, 514, 515, 516, 517, and the lens elements 511, 512, 513, 514, 515, 516, 517 are disposed in the lens barrel 520, wherein the optical features such as structures, surface shapes and so on of the lens elements can be disposed according to different imaging demand, and the optical features are not limited thereto.

Each of object-side surfaces and image-side surfaces of the lens elements 511, 512, 514, 515, 516, 517 includes at least one nanostructure layer and at least one structure connection film. Taking the object-side surface of the lens element 512 as the example, the nanostructure layer 530 is irregularly arranged, and the nanostructure layer 530 includes an alumina crystal; the structure connection film (its reference numeral is omitted) is disposed between the object-side surface of the lens element 512 and the nanostructure layer 530, the structure connection film includes silica films 5411 and titanium dioxide films 5412, and one of the silica films 5411 is directly contacted with a bottom of the nanostructure layer 530.

According to the 5th embodiment, the structure connection film is a film which is formed by alternately stacking high-refractive-index layers and low-refractive-index layers, and the lens element 513 is a molded glass, wherein the titanium dioxide films 5412 are the high-refractive-index layers, the silica films 5411 are the low-refractive-index layers, but the arrangement of the high-refractive-index layers and the low-refractive-index layers is not limited thereto. The anti-reflecting effect can be further enhanced by alternately staking the high-refractive-index layers and the low-refractive-index layers.

The nanostructure layer 530 can be steadied via the structure connection film, so that the nanostructure layer 530 can be disposed on every lens element made of different materials, and the adhesion stability of the nanostructure layer 530 can be enhanced. In detail, the nanostructure layer 530 has pores so that the equivalent refractive index of the nanostructure layer 530 is gradually changed towards 1.00. Hence, the variety of the refractive index between the interfaces is reduced, and the possibility of light reflection is reduced.

Table 19 lists the refractive index of the lens elements 511, 512, 513, 514, 515, 516, 517, and the measuring light of the refractive index of the lens elements 511, 512, 513, 514, 515, 516, 517 is a light of wavelength of 587.6 nm (d-line).

TABLE 19 the refractive index of the lens elements according to the 5th embodiment

| | lens element | | | |
|---|---|---|---|---|
| | 511 | 512 | 513 | 514 |
| refractive index | 1.545 | 1.639 | 1.545 | 1.545 |

| | lens element | | |
|---|---|---|---|
| | 515 | 516 | 517 |
| refractive index | 1.639 | 1.545 | 1.587 |

According to the 5th embodiment, the lens element 512 can be a first lens element, the lens element 511 can be a second lens element, and the refractive index of the first lens element is different from the refractive index of the second lens element.

Moreover, the lens elements 511, 512, 513, 514, 515, 516, 517 of the imaging lens element assembly are separated into a first lens group and a second lens group, wherein the first lens group is closer to the object side than the second lens group to the object side, and a number of the lens elements of the first lens group is less than a number of the lens elements of the second lens group. According to the 5th embodiment, the lens elements 511, 512 are the first lens group, and the lens elements 513, 514, 515, 516, 517 are the second lens group, wherein the first lens group closest to the image side includes one of the lens elements of a high refractive index lens element (that is, the lens element 512), and an adjacent lens element of the high refractive index lens element at the object-side end is a low refractive index lens element (that is, the lens element 511); the second lens group includes the others lens elements of an image-side end of the first lens group (that is, the lens elements 513, 514, 515, 516, 517), and the second lens group includes at least one of the lens elements being a high refractive index lens element (that is, the lens element 515). The possibility of light reflection formed between the interfaces can be reduced by disposing the nanostructure layer 530 on the high refractive index lens element.

In particular, the high refractive index lens element can be the lens element which the refractive index is greater than 1.6, or the lens element which the refractive index is higher than the average refractive index of the imaging lens assembly 500; the low refractive index lens element can be the lens element which the refractive index is smaller than 1.6, or the lens element which the refractive index is smaller than the average refractive index of the imaging lens assembly 500.

When the imaging lens assembly 500 has a transmittance decay indicator, and the transmittance decay indicator is corresponding to a number of the lens elements of the imaging lens element assembly and an analog constant of a transmittance decay, wherein the transmittance decay indicator is Tdi; the number of the lens elements of the imaging lens element assembly is E; a simulated transmittance of the imaging lens assembly 500 is $T_{sim}$, and the simulated transmittance is corresponding to the light of the wavelength range between 540 nm and 590 nm; the refractive index of the first lens element (that is, the lens element 512) is n1, the refractive index of the second lens element (that is, the lens element 511) is n2, and a difference between the refractive index of the first lens element and the refractive index of the second lens element is Δn; a total number of the surfaces of the object-side surfaces and the image-side surfaces of the nanostructure layers 530 disposed on the lens elements is $N_{CS}$, the following conditions of the Table 20 are satisfied.

TABLE 20

5th embodiment

| | | | |
|---|---|---|---|
| Tdi | 0.894 | $T_{sim}$ (%) | 92.72 |
| E | 7 | n1 | 1.639 |
| $N_{CS}$ | 12 | n2 | 1.545 |
| $N_{CS}$/2E | 0.86 | Δn | 0.094 |

6th Embodiment

Figure 6:
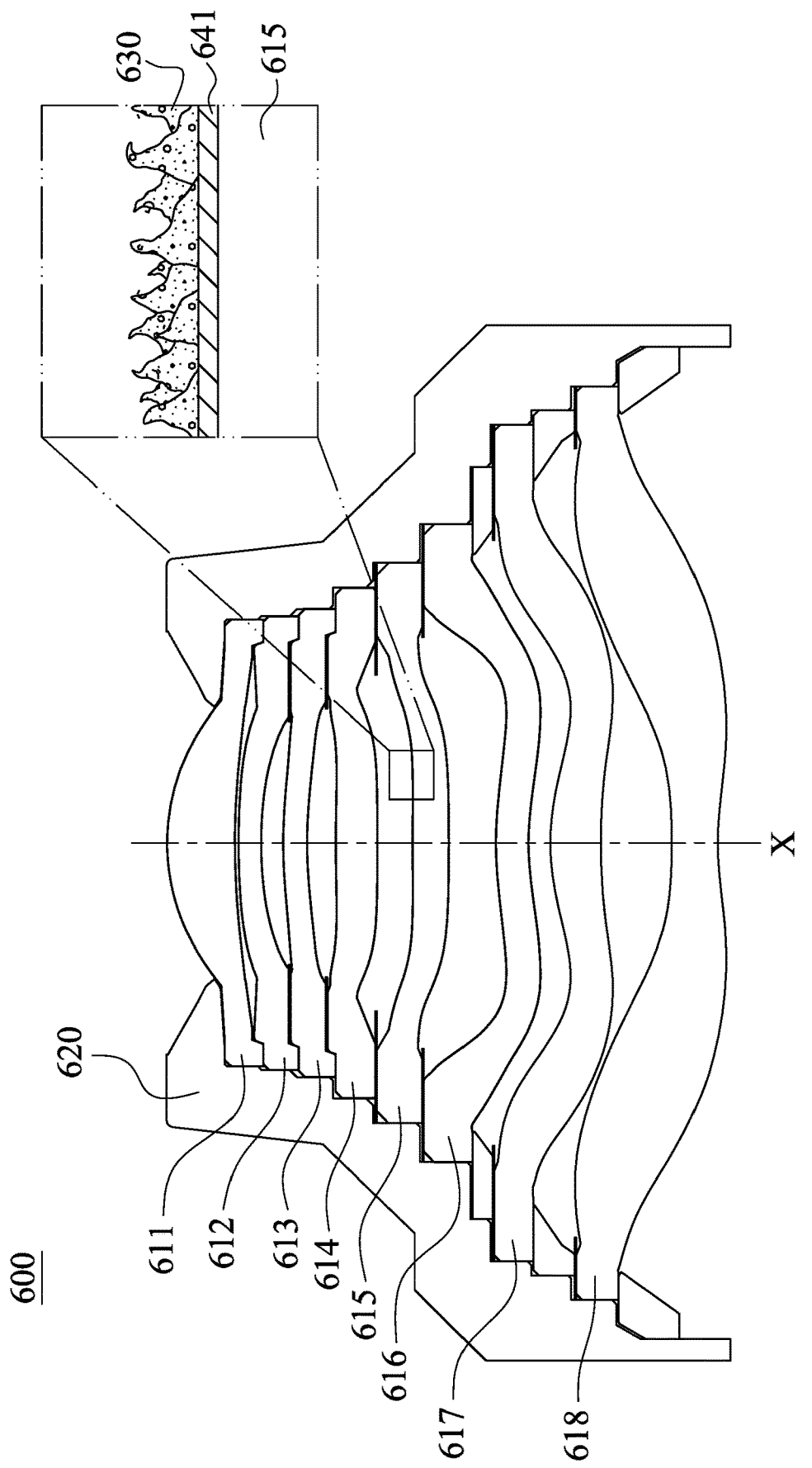
FIG. 6 is a schematic view of an imaging lens assembly according to the 6th embodiment of the present disclosure.

FIG. 6 is a schematic view of an imaging lens assembly 600 according to the 6th embodiment of the present disclosure. In FIG. 6, the imaging lens assembly 600 includes an imaging lens element assembly (its numeral reference is omitted), an optical axis X passes through the imaging lens assembly 600, a visual angle of the imaging lens assembly 600 is 85 degrees, and the imaging lens assembly 600 is the main lens. The imaging lens element assembly includes a plurality of lens elements and a lens barrel 620.

In particular, the imaging lens element assembly, in order from an object side to an image side, includes lens elements 611, 612, 613, 614, 615, 616, 617, 618, and the lens elements 611, 612, 613, 614, 615, 616, 617, 618 are disposed in the lens barrel 620, wherein the optical features such as structures, surface shapes and so on of the lens elements can be disposed according to different imaging demand, and the optical features are not limited thereto.

Each of an image-side surface of the lens element 611, object-side surfaces and image-side surfaces of the lens elements 613, 614, 615, 617 and an object-side surface of the lens element 618 includes at least one nanostructure layer and at least one structure connection film. Taking the object-side surface of the lens element 615 as the example, the nanostructure layer 630 is irregularly arranged, and the nanostructure layer 630 includes an alumina crystal; the structure connection film (its reference numeral is omitted) is disposed between the object-side surface of the lens element 615 and the nanostructure layer 630, the structure connection film includes at least one silica film 641, and the silica film 641 is directly contacted with a bottom of the nanostructure layer 630.

The nanostructure layer 630 can be steadied via the structure connection film, so that the nanostructure layer 630 can be disposed on every lens element made of different materials, and the adhesion stability of the nanostructure layer 630 can be enhanced. In detail, the nanostructure layer 630 has pores so that the equivalent refractive index of the nanostructure layer 630 is gradually changed towards 1.00. Hence, the variety of the refractive index between the interfaces is reduced, and the possibility of light reflection is reduced.

Table 21 lists the refractive index of the lens elements 611, 612, 613, 614, 615, 616, 617, 618, and the measuring light of the refractive index of the lens elements 611, 612, 613, 614, 615, 616, 617, 618 is a light of wavelength of 587.6 nm (d-line).

TABLE 21 the refractive index of the lens elements according to the 6th embodiment

| | lens element | | | |
|---|---|---|---|---|
| | 611 | 612 | 613 | 614 |
| refractive index | 1.545 | 1.686 | 1.686 | 1.544 |
| | lens element | | | |
| | 615 | 616 | 617 | 618 |
| refractive index | 1.544 | 1.566 | 1.544 | 1.534 |

According to the 6th embodiment, the lens element 612 can be a first lens element, the lens element 611 can be a second lens element, and the refractive index of the first lens element is different from the refractive index of the second lens element.

Moreover, the lens elements 611, 612, 613, 614, 615, 616, 617, 618 of the imaging lens element assembly are separated into a first lens group and a second lens group, wherein the first lens group is closer to the object side than the second lens group to the object side, and a number of the lens elements of the first lens group is less than a number of the lens elements of the second lens group. According to the 6th embodiment, the lens elements 611, 612 are the first lens group, and the lens elements 613, 614, 615, 616, 617, 618 are the second lens group, wherein the first lens group closest to the image side includes one of the lens elements of a high refractive index lens element (that is, the lens element 612), and an adjacent lens element of the high refractive index lens element at the object-side end is a low refractive index lens element (that is, the lens element 611); the second lens group includes the others lens elements of an image-side end of the first lens group (that is, the lens elements 613, 614, 615, 616, 617, 618), and the second lens group includes at least one of the lens elements being a high refractive index lens element (that is, the lens element 613). The possibility of light reflection formed between the interfaces can be reduced by disposing the nanostructure layer 630 on the high refractive index lens element.

In particular, the high refractive index lens element can be the lens element which the refractive index is greater than 1.6, or the lens element which the refractive index is higher than the average refractive index of the imaging lens assembly 600; the low refractive index lens element can be the lens element which the refractive index is smaller than 1.6, or the lens element which the refractive index is smaller than the average refractive index of the imaging lens assembly 600.

When the imaging lens assembly 600 has a transmittance decay indicator, and the transmittance decay indicator is corresponding to a number of the lens elements of the imaging lens element assembly and an analog constant of a transmittance decay, wherein the transmittance decay indicator is Tdi; the number of the lens elements of the imaging lens element assembly is E; a simulated transmittance of the imaging lens assembly 600 is $T_{sim}$, and the simulated transmittance is corresponding to the light of the wavelength range between 540 nm and 590 nm; the refractive index of the first lens element (that is, the lens element 612) is n1, the refractive index of the second lens element (that is, the lens element 611) is n2, and a difference between the refractive index of the first lens element and the refractive index of the second lens element is Δn; a total number of the surfaces of the object-side surfaces and the image-side surfaces of the nanostructure layers 630 disposed on the lens elements is $N_{CS}$, the following conditions of the Table 22 are satisfied.

TABLE 22

| 6th embodiment | | | |
|---|---|---|---|
| Tdi | 0.879 | $T_{sim}$ (%) | 90.73 |
| E | 8 | n1 | 1.686 |
| $N_{CS}$ | 10 | n2 | 1.545 |
| $N_{CS}/2E$ | 0.63 | Δn | 0.141 |

7th Embodiment

Figure 7A:
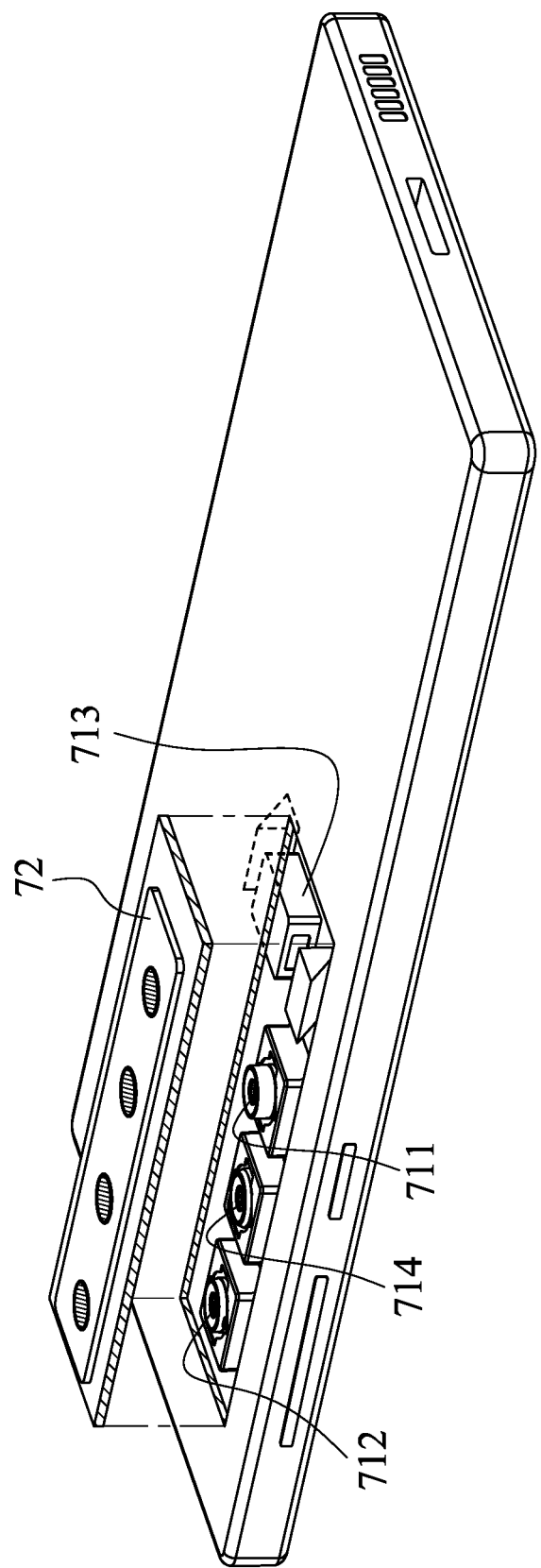
FIG. 7A is a schematic view of an electronic device according to the 7th embodiment of the present disclosure.
Figure 7B:
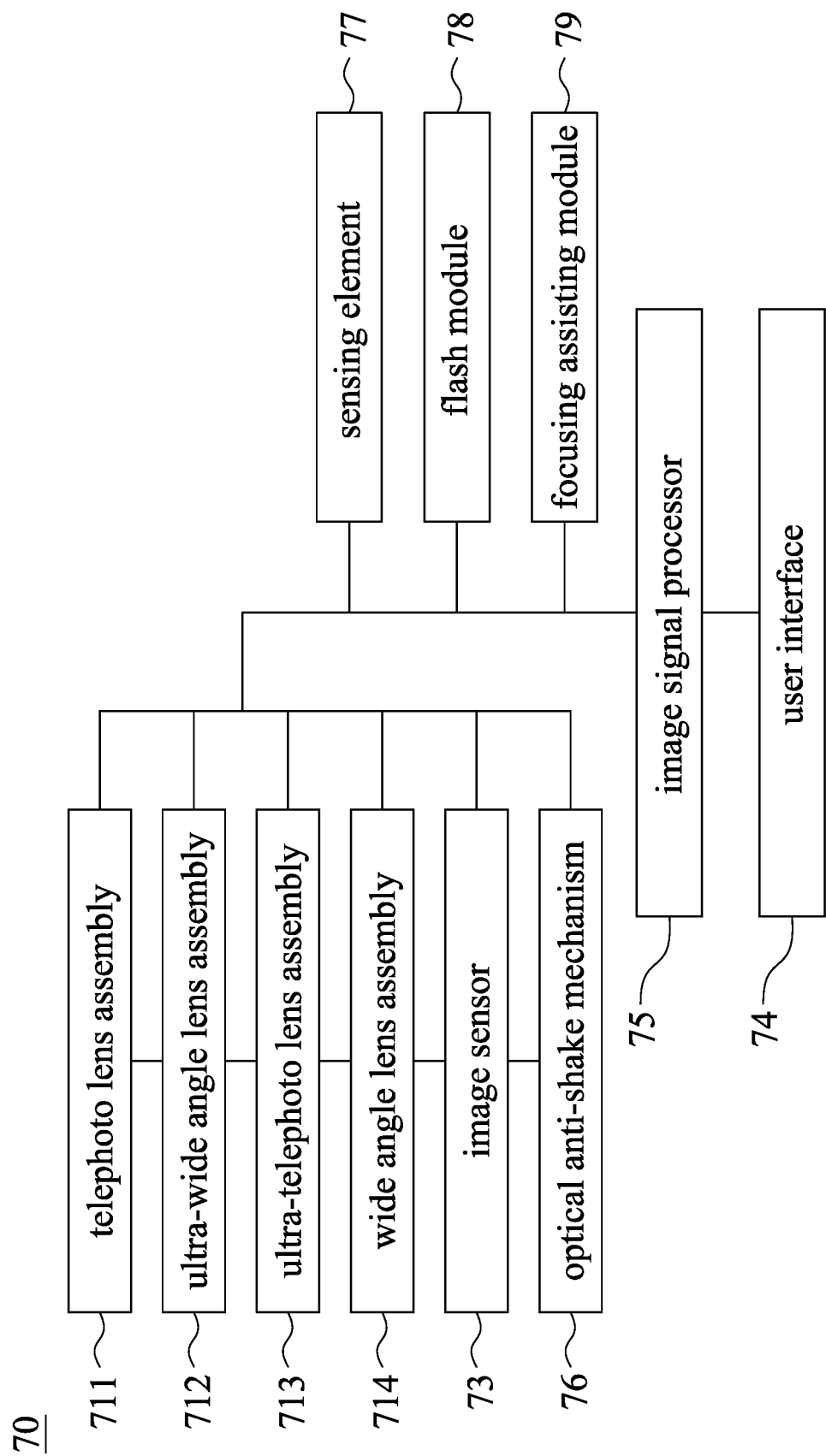
FIG. 7B is a block diagram of the electronic device according to the 7th embodiment in FIG. 7A.

FIG. 7A is a schematic view of an electronic device 70 according to the 7th embodiment of the present disclosure. FIG. 7B is a block diagram of the electronic device 70 according to the 7th embodiment in FIG. 7A. In FIGS. 7A and 7B, the electronic device 70 is a smart phone, and includes an imaging lens assembly (not shown), wherein the imaging lens assembly includes an imaging lens element assembly (not shown), and the imaging lens element assembly includes a plurality of lens elements (not shown). Furthermore, the lens elements includes a first lens element and a second lens element, wherein each of the first lens element and the second lens element includes at least one nanostructure layer (not shown) and at least one structure connection film (not shown); or, each of at least three lens elements of the lens elements includes at least one nanostructure layer and at least one structure connection film. Therefore, by disposing the nanostructure layer on the lens elements, the image quality between the imaging lens assemblies is close to the consistency to reduce the setback during switching the imaging lens assemblies of the electronic device.

According to the 7th embodiment, the electronic device 70 includes four imaging lens assemblies, and the imaging lens assemblies are a telephoto lens assembly 711, an ultra-wide angle lens assembly 712, an ultra-telephoto lens assembly 713 and a wide-angle lens assembly 714. Moreover, the function of optical zoom of the electronic device 70 can be obtained by switching the imaging lens assemblies with the different visual angles. It should be mentioned that a lens cover 72 is only configured to indicate the telephoto lens assembly 711, the ultra-wide angle lens assembly 712, the ultra-telephoto lens assembly 713 and the wide-angle lens assembly 714 disposed in the electronic device 70, and the schematic view is not configured to mean that the lens cover 72 is removable. In particular, the wide-angle lens assembly 714 can be one of the imaging lens assemblies according to the aforementioned 1st embodiment to the 4th embodiment and the 6th embodiment, the ultra-wide angle lens assembly 712 can be the imaging lens assembly according to the aforementioned 5th embodiment, but the present disclosure is not limited thereto.

The electronic device 70 further includes an image sensor 73 and a user interface 74, wherein the image sensor 73 is disposed on an image surface (not shown) of the telephoto lens assembly 711, the ultra-wide angle lens assembly 712, the ultra-telephoto lens assembly 713 and the wide-angle lens assembly 714, the user interface 74 can be a touch screen or a display screen, but the present disclosure is not limited thereto.

Moreover, users enter a shooting mode via the user interface 74 of the electronic device 70. At this moment, the imaging light is gathered on the image sensor 73 via the telephoto lens assembly 711, the ultra-wide angle lens assembly 712, the ultra-telephoto lens assembly 713 and the wide-angle lens assembly 714, and an electronic signal about an image is output to an image signal processor (ISP) 75.

To meet a specification of the electronic device 70, the electronic device 70 can further include an optical anti-shake mechanism 76, which can be an optical image stabilization (OIS). Furthermore, the electronic device 70 can further include at least one auxiliary optical element (its reference numeral is omitted) and at least one sensing element 77. According to the 7th embodiment, the auxiliary optical element is a flash module 78 and a focusing assisting module 79. The flash module 78 can be for compensating a color temperature, and the focusing assisting module 79 can be an infrared distance measurement component, a laser focus module, etc. The sensing element 77 can have functions for sensing physical momentum and kinetic energy, such as an accelerator, a gyroscope, a Hall Effect Element, to sense shaking or jitters applied by hands of the user or external environments. Accordingly, an auto-focusing mechanism and the optical anti-shake mechanism 76 disposed on the imaging lens assembly (that is, the telephoto lens assembly 711, the ultra-wide angle lens assembly 712, the ultra-telephoto lens assembly 713, the wide-angle lens assembly 714) of the electronic device 70 can be enhanced to achieve the superior image quality. Furthermore, the electronic device 70 according to the present disclosure can have a capturing function with multiple modes, such as taking optimized selfies, high dynamic range (HDR) under a low light condition, 4K resolution recording, etc. Furthermore, the users can visually see a captured image of the camera through the touch screen and manually operate the view finding range on the touch screen to achieve the autofocus function of what you see is what you get.

Furthermore, the electronic device 70 can further include, but not be limited to, a display, a control unit, a storage unit, a random access memory (RAM), a read-only memory (ROM), or the combination thereof.

In detail, the telephoto lens assembly 711 has a first visual angle, the ultra-wide angle lens assembly 712 has a second visual angle, the ultra-telephoto lens assembly 713 has a third visual angle, and the wide-angle lens assembly 714 has a fourth visual angle, wherein the first visual angle is FOV1, the second visual angle is FOV2, the third visual angle is FOV3, and the fourth visual angle is FOV4, the following conditions of the Table 23 are satisfied.

TABLE 23

| the 7th embodiment | | | |
|---|---|---|---|
| FOV1 (degree) | 20-50 | FOV3 (degree) | 5-20 |
| FOV2 (degree) | 100-130 | FOV4 (degree) | 65-95 |

Further, all of other structures and dispositions according to the 7th embodiment are the same as the structures and the dispositions according to the 1st embodiment to the 6th embodiment, and will not be described again herein.

The foregoing description, for purpose of explanation, has been described with reference to specific examples. It is to be noted that Tables show different data of the different examples; however, the data of the different examples are obtained from experiments. The examples were chosen and described in order to best explain the principles of the disclosure and its practical applications, to thereby enable others skilled in the art to best utilize the disclosure and various examples with various modifications as are suited to the particular use contemplated. The examples depicted above and the appended drawings are exemplary and are not intended to be exhaustive or to limit the scope of the present disclosure to the precise forms disclosed. Many modifications and variations are possible in view of the above teachings.

What is claimed is:

1. An imaging lens assembly, an optical axis passing through the imaging lens assembly, and comprising:
   an imaging lens element assembly, comprising a plurality of lens elements, and the lens elements comprising:
   a first lens element and a second lens element, wherein a refractive index of the first lens element is different from a refractive index of the second lens element, and each of the first lens element and the second lens element comprises:
   at least one nanostructure layer being irregularly arranged, the at least one nanostructure layer comprising an alumina crystal, and a structure dimension of the at least one nanostructure layer being between 98 nm and 420 nm; and
   at least one structure connection film disposed between a surface of the first lens element and the at least one nanostructure layer and between a surface of the second lens element and the at least one nanostructure layer, wherein the at least one structure connection film comprises at least one silica film, the at least one silica film is directly contacted with a bottom of the at least one nanostructure layer, and a film thickness of the at least one silica film is between 20 nm and 150 nm;
   wherein a top of the at least one structure connection film is partially covered by the at least one nanostructure layer;
   wherein the imaging lens assembly has a transmittance decay indicator, and the transmittance decay indicator is corresponding to a number of the lens elements of the imaging lens element assembly and an analog constant of a transmittance decay;
   wherein the transmittance decay indicator is Tdi, the number of the lens elements of the imaging lens element assembly is E, the analog constant of the transmittance decay is c, a light of the imaging lens assembly corresponding to a wavelength range between 540 nm and 590 nm has an average transmittance, the average transmittance is $T_{5459}$, a difference between the refractive index of the first lens element and the refractive index of the second lens element is $\Delta n$, and the following conditions are satisfied:

$Tdi=[(\pi+c)^2/10]^{2E}$, $c=0.008$;

$0.85 \leq Tdi \leq 0.9$;

$90\% \leq T_{5459}$; and $0.065 \leq \Delta n \leq 0.82$.

2. The imaging lens assembly of claim 1, wherein a light of the imaging lens assembly corresponding to a wavelength range between 520 nm and 540 nm has an average transmittance, the average transmittance is $T_{5254}$, and the following condition is satisfied:

$90\% \leq T_{5254}$.

3. The imaging lens assembly of claim 2, wherein a light of the imaging lens assembly corresponding to a wavelength range between 530 nm and 540 nm has an average transmittance, the average transmittance is $T_{5354}$, and the following condition is satisfied:

$90\% \leq T_{5354}$.

4. The imaging lens assembly of claim 1, wherein the number of the lens elements of the imaging lens element assembly is E, a total number of surfaces of object-side surfaces and image-side surfaces of the at least one nanostructure layer disposed on the lens elements is $N_{CS}$, and the following condition is satisfied:

$0.8 \leq N_{CS/2}E \leq 1$.

5. An electronic device, comprising:
   the imaging lens assembly of claim 1.

6. An imaging lens assembly, an optical axis passing through the imaging lens assembly, and comprising:
   an imaging lens element assembly, comprising a plurality of lens elements, and the lens elements comprising:
   a first lens element and a second lens element, wherein a refractive index of the first lens element is different from a refractive index of the second lens element, and each of the first lens element and the second lens element comprises:
   at least one nanostructure layer being irregularly arranged, the at least one nanostructure layer comprising an alumina crystal, and a structure dimension of the at least one nanostructure layer being between 98 nm and 420 nm; and
   at least one structure connection film disposed between a surface of the first lens element and the at least one nanostructure layer and between a surface of the second lens element and the at least one nanostructure layer, wherein the at least one structure connection film comprises at least one silica film, the at least one silica film is directly contacted with a bottom of the at least one nanostructure layer, and a film thickness of the at least one silica film is between 20 nm and 150 nm;
   wherein a top of the at least one structure connection film is partially covered by the at least one nanostructure layer;
   wherein the imaging lens assembly has a transmittance decay indicator, and the transmittance decay indicator is corresponding to a number of the lens elements of the imaging lens element assembly and an analog constant of a transmittance decay;
   wherein the transmittance decay indicator is Tdi, the number of the lens elements of the imaging lens element assembly is E, the analog constant of the transmittance decay is c, a light of the imaging lens assembly corresponding to a wavelength range between 540 nm and 590 nm has an average transmittance, the average transmittance is $T_{5459}$, the refractive index of the first lens element is n1, the refractive index of the second lens element is n2, and the following conditions are satisfied:

$Tdi=[(\pi+c)^2/10]^{2E}$, $c=0.008$;

$0.85 \leq Tdi \leq 0.9$;

$90\% \leq T_{5459}$;

$n1 > 1.6$; and $n2 < 1.6$.

7. The imaging lens assembly of claim 6, wherein a light of the imaging lens assembly corresponding to a wavelength range between 520 nm and 540 nm has an average transmittance, the average transmittance is $T_{5254}$, and the following condition is satisfied:

$$90\% \leq T_{5254}.$$

8. The imaging lens assembly of claim 7, wherein a light of the imaging lens assembly corresponding to a wavelength range between 530 nm and 540 nm has an average transmittance, the average transmittance is $T_{5354}$, and the following condition is satisfied:

$$90\% \leq T_{5354}.$$

9. The imaging lens assembly of claim 6, wherein the number of the lens elements of the imaging lens element assembly is E, a total number of surfaces of object-side surfaces and image-side surfaces of the at least one nanostructure layer disposed on the lens elements is $N_{CS}$, and the following condition is satisfied:

$$0.8 \leq N_{CS}/2E \leq 1.$$

10. An electronic device, comprising:
the imaging lens assembly of claim 6.

11. An imaging lens assembly, an optical axis passing through the imaging lens assembly, and comprising:
an imaging lens element assembly, comprising a plurality of lens elements, and each of at least three lens elements of the lens elements comprising:
at least one nanostructure layer being irregularly arranged, the at least one nanostructure layer comprising an alumina crystal, and a structure dimension of the at least one nanostructure layer being between 98 nm and 420 nm; and
at least one structure connection film disposed between a surface of each of the lens elements and the at least one nanostructure layer, wherein the at least one structure connection film comprises at least one silica film, the at least one silica film is directly contacted with a bottom of the at least one nanostructure layer, and a film thickness of the at least one silica film is between 20 nm and 150 nm;
wherein the lens elements of the imaging lens element assembly are separated into a first lens group and a second lens group, the first lens group is closer to an object side than the second lens group to the object side, and a number of the lens elements of the first lens group is less than a number of the lens elements of the second lens group;
wherein the first lens group closest to an image side comprises one of the lens elements being a high refractive index lens element, and an adjacent lens element of the high refractive index lens element at an object-side end is a low refractive index lens element;
wherein the second lens group comprises the others lens elements of an image-side end of the first lens group, and the second lens group comprises at least one of the lens elements being a high refractive index lens element;
wherein the imaging lens assembly has a transmittance decay indicator, and the transmittance decay indicator is corresponding to a number of the lens elements of the imaging lens element assembly and an analog constant of a transmittance decay;
wherein the transmittance decay indicator is Tdi, the number of the lens elements of the imaging lens element assembly is E, the analog constant of the transmittance decay is c, a light of the imaging lens assembly corresponding to a wavelength range between 540 nm and 590 nm has an average transmittance, the average transmittance is $T_{5459}$, a total number of surfaces of object-side surfaces and image-side surfaces of the nanostructure layers disposed on the lens elements is $N_{CS}$, and the following conditions are satisfied:

$$Tdi=[(\pi+c)^2/10]^{2E}, c=0.008;$$

$$0.85 \leq Tdi \leq 0.88;$$

$$90\% \leq T_{5459};$$

$$0.5 \leq N_{CS}/2E \leq 1.$$

12. The imaging lens assembly of claim 11, wherein a light of the imaging lens assembly corresponding to a wavelength range between 520 nm and 540 nm has an average transmittance, the average transmittance is $T_{5254}$, and the following condition is satisfied:

$$90\% \leq T_{5254}.$$

13. The imaging lens assembly of claim 12, wherein a light of the imaging lens assembly corresponding to a wavelength range between 530 nm and 540 nm has an average transmittance, the average transmittance is $T_{5354}$, and the following condition is satisfied:

$$90\% \leq T_{5354}.$$

14. The imaging lens assembly of claim 11, wherein the number of the lens elements of the imaging lens element assembly is E, the total number of the surfaces of the object-side surfaces and the image-side surfaces of the nanostructure layers disposed on the lens elements is $N_{CS}$, and the following condition is satisfied:

$$0.8 \leq N_{CS}/2E \leq 1.$$

15. An electronic device, comprising:
the imaging lens assembly of claim 11.

16. An imaging lens assembly, an optical axis passing through the imaging lens assembly, and comprising:
an imaging lens element assembly, comprising a plurality of lens elements, and each of at least three lens elements of the lens elements comprising:
at least one nanostructure layer being irregularly arranged, the at least one nanostructure layer comprising an alumina crystal, and a structure dimension of the at least one nanostructure layer being between 98 nm and 420 nm; and
at least one structure connection film disposed between a surface of each of the lens elements and the at least one nanostructure layer, wherein the at least one structure connection film comprises at least one silica film, the at least one silica film is directly contacted with a bottom of the at least one nanostructure layer, and a film thickness of the at least one silica film is between 20 nm and 150 nm;
wherein the lens elements of the imaging lens element assembly are separated into a first lens group and a second lens group, the first lens group is closer to an object side than the second lens group to the object side, and a number of the lens elements of the first lens group is less than a number of the lens elements of the second lens group;
wherein the first lens group closest to an image side comprises one of the lens elements being a high refractive index lens element, and an adjacent lens element of the high refractive index lens element at an object-side end is a low refractive index lens element;

wherein the second lens group comprises the others lens elements of an image-side end of the first lens group, and the second lens group comprises at least one of the lens elements being a high refractive index lens element;

wherein the imaging lens assembly has a transmittance decay indicator, and the transmittance decay indicator is corresponding to a number of the lens elements of the imaging lens element assembly and an analog constant of a transmittance decay;

wherein the transmittance decay indicator is Tdi, the number of the lens elements of the imaging lens element assembly is E, the analog constant of the transmittance decay is c, a light of the imaging lens assembly corresponding to a wavelength range between 540 nm and 590 nm has an average transmittance, the average transmittance is $T_{5459}$, a total number of surfaces of object-side surfaces and image-side surfaces of the nanostructure layers disposed on the lens elements is $N_{CS}$, and the following conditions are satisfied:

$Tdi=[(\pi+c)^2/10]^{2E}$, $c=0.008$;

$0.81 \leq Tdi \leq 0.84$;

$87.6\% \leq T_{5459} \leq 92\%$; and $0.59 \leq N_{CS}/2E \leq 1$.

17. The imaging lens assembly of claim 16, wherein a light of the imaging lens assembly corresponding to a wavelength range between 520 nm and 540 nm has an average transmittance, the average transmittance is $T_{5254}$, and the following condition is satisfied:

$86\% \leq T_{5254}$.

18. The imaging lens assembly of claim 17, wherein a light of the imaging lens assembly corresponding to a wavelength range between 530 nm and 540 nm has an average transmittance, the average transmittance is $T_{5354}$, and the following condition is satisfied:

$86\% \leq T_{5354}$.

19. The imaging lens assembly of claim 16, wherein the number of the lens elements of the imaging lens element assembly is E, the total number of the surfaces of the object-side surfaces and the image-side surfaces of the nanostructure layers disposed on the lens elements is $N_{CS}$, and the following condition is satisfied:

$0.9 \leq N_{CS}/2E \leq 1$.

20. An electronic device, comprising:
the imaging lens assembly of claim 16.

21. An imaging lens assembly, an optical axis passing through the imaging lens assembly, and comprising:
an imaging lens element assembly, comprising a plurality of lens elements, and each of at least three lens elements of the lens elements comprising:
at least one nanostructure layer being irregularly arranged, the at least one nanostructure layer comprising an alumina crystal, and a structure dimension of the at least one nanostructure layer being between 98 nm and 420 nm; and
at least one structure connection film disposed between a surface of each of the lens elements and the at least one nanostructure layer, wherein the at least one structure connection film comprises at least one silica film, the at least one silica film is directly contacted with a bottom of the at least one nanostructure layer, and a film thickness of the at least one silica film is between 20 nm and 150 nm;

wherein the lens elements of the imaging lens element assembly are separated into a first lens group and a second lens group, the first lens group is closer to an object side than the second lens group to the object side, and a number of the lens elements of the first lens group is less than a number of the lens elements of the second lens group;

wherein the first lens group closest to an image side comprises one of the lens elements being a high refractive index lens element, and an adjacent lens element of the high refractive index lens element at an object-side end is a low refractive index lens element;

wherein the second lens group comprises the others lens elements of an image-side end of the first lens group, and the second lens group comprises at least one of the lens elements being a high refractive index lens element;

wherein the imaging lens assembly has a transmittance decay indicator, and the transmittance decay indicator is corresponding to a number of the lens elements of the imaging lens element assembly and an analog constant of a transmittance decay;

wherein the transmittance decay indicator is Tdi, the number of the lens elements of the imaging lens element assembly is E, the analog constant of the transmittance decay is c, a light of the imaging lens assembly corresponding to a wavelength range between 540 nm and 590 nm has an average transmittance, the average transmittance is $T_{5459}$, a total number of surfaces of object-side surfaces and image-side surfaces of the nanostructure layers disposed on the lens elements is $N_{CS}$, and the following conditions are satisfied:

$Tdi=[(\pi+c)^2/10]^{2E}$, $c=0.008$, $0.78 \leq Tdi \leq 0.80$;

$86\% \leq T_{5459} \leq 91\%$; and $0.67 \leq N_{CS}/2E \leq 1$.

22. The imaging lens assembly of claim 21, wherein a light of the imaging lens assembly corresponding to a wavelength range between 520 nm and 540 nm has an average transmittance, the average transmittance is $T_{5254}$, and the following condition is satisfied:

$84\% \leq T_{5254}$.

23. The imaging lens assembly of claim 22, wherein a light of the imaging lens assembly corresponding to a wavelength range between 530 nm and 540 nm has an average transmittance, the average transmittance is $T_{5354}$, and the following condition is satisfied:

$84\% \leq T_{5354}$.

24. The imaging lens assembly of claim 21, wherein the number of the lens elements of the imaging lens element assembly is E, the total number of the surfaces of the object-side surfaces and the image-side surfaces of the nanostructure layers disposed on the lens elements is $N_{CS}$, and the following condition is satisfied:

$0.96 \leq N_{CS}/2E \leq 1$.

25. An electronic device, comprising:
the imaging lens assembly of claim 21.

\* \* \* \* \*